United States Patent
Bishop et al.

(10) Patent No.: US 8,880,682 B2
(45) Date of Patent: Nov. 4, 2014

(54) INTEGRATED FORENSICS PLATFORM FOR ANALYZING IT RESOURCES CONSUMED TO DERIVE OPERATIONAL AND ARCHITECTURAL RECOMMENDATIONS

(75) Inventors: Anthony Bennett Bishop, Charlotte, NC (US); Paul John Wanish, Concord, NC (US); Alexis Salvatore Pecoraro, Huntersville, NC (US); Sheppard David Narkier, Charlotte, NC (US)

(73) Assignee: EMC Corporation, Hopkinton, MA (US)

( * ) Notice: Subject to any disclaimer, the term of this patent is extended or adjusted under 35 U.S.C. 154(b) by 1031 days.

(21) Appl. No.: 12/899,435

(22) Filed: Oct. 6, 2010

(65) Prior Publication Data

US 2011/0145657 A1    Jun. 16, 2011

Related U.S. Application Data

(60) Provisional application No. 61/278,359, filed on Oct. 6, 2009.

(51) Int. Cl.
| | | |
|---|---|---|
| *G06F 15/16* | (2006.01) | |
| *G06F 15/173* | (2006.01) | |
| *G06Q 10/06* | (2012.01) | |
| *G06F 11/34* | (2006.01) | |

(52) U.S. Cl.
CPC ............ *G06Q 10/06* (2013.01); *G06F 11/3495* (2013.01); *G06F 11/3447* (2013.01); *G06F 2201/865* (2013.01); *G06F 11/3409* (2013.01); *G06F 2201/815* (2013.01); *G06F 11/3442* (2013.01)
USPC ............ 709/224; 709/203; 709/226; 709/229

(58) Field of Classification Search
USPC ................................ 709/203, 224; 726/3, 22
See application file for complete search history.

(56) References Cited

U.S. PATENT DOCUMENTS

| | | | |
|---|---|---|---|
| 7,162,427 B1 | 1/2007 | Myrick et al. | |
| 2002/0087497 A1 | 7/2002 | Troianova et al. | |
| 2004/0260733 A1 * | 12/2004 | Adelstein et al. | ............. 709/224 |
| 2006/0242261 A1 | 10/2006 | Piot et al. | |
| 2007/0033221 A1 | 2/2007 | Copperman et al. | |
| 2007/0157165 A1 | 7/2007 | Kim | |
| 2008/0040364 A1 | 2/2008 | Li | |
| 2008/0209517 A1 * | 8/2008 | Nightingale et al. | ............. 726/3 |
| 2009/0241191 A1 * | 9/2009 | Keromytis et al. | ........... 709/224 |
| 2009/0288164 A1 * | 11/2009 | Adelstein et al. | ............... 726/22 |
| 2011/0087704 A1 | 4/2011 | Bishop et al. | |
| 2012/0221633 A1 * | 8/2012 | Adelstein et al. | ............. 709/203 |

OTHER PUBLICATIONS

Information Disclosure Statement (IDS) Letter Regarding Common Patent Application(s), dated May 15, 2013.
Information Disclosure Statement (IDS) Letter Regarding Common Patent Application(s), dated Jul. 18, 2012.
Information Disclosure Statement (IDS) Letter Regarding Common Patent Application(s), dated Mar. 21, 2012.

* cited by examiner

*Primary Examiner* — Quang N Nguyen
(74) *Attorney, Agent, or Firm* — Krishnendu Gupta; Joseph D'Angelo

(57) ABSTRACT

A method for facilitating forensic analysis of operational data for an IT infrastructure includes deriving performance data from a plurality of physical systems, network elements and storage devices in an IT infrastructure via a toolset comprising a plurality of IT monitoring and metrics tools, importing the performance data into an integrated forensics platform, aggregating the imported data, and analyzing the aggregated data to determine resources consumed. Each tool is communicatively interfaced with one or more of the physical systems, network elements and storage devices.

18 Claims, 108 Drawing Sheets

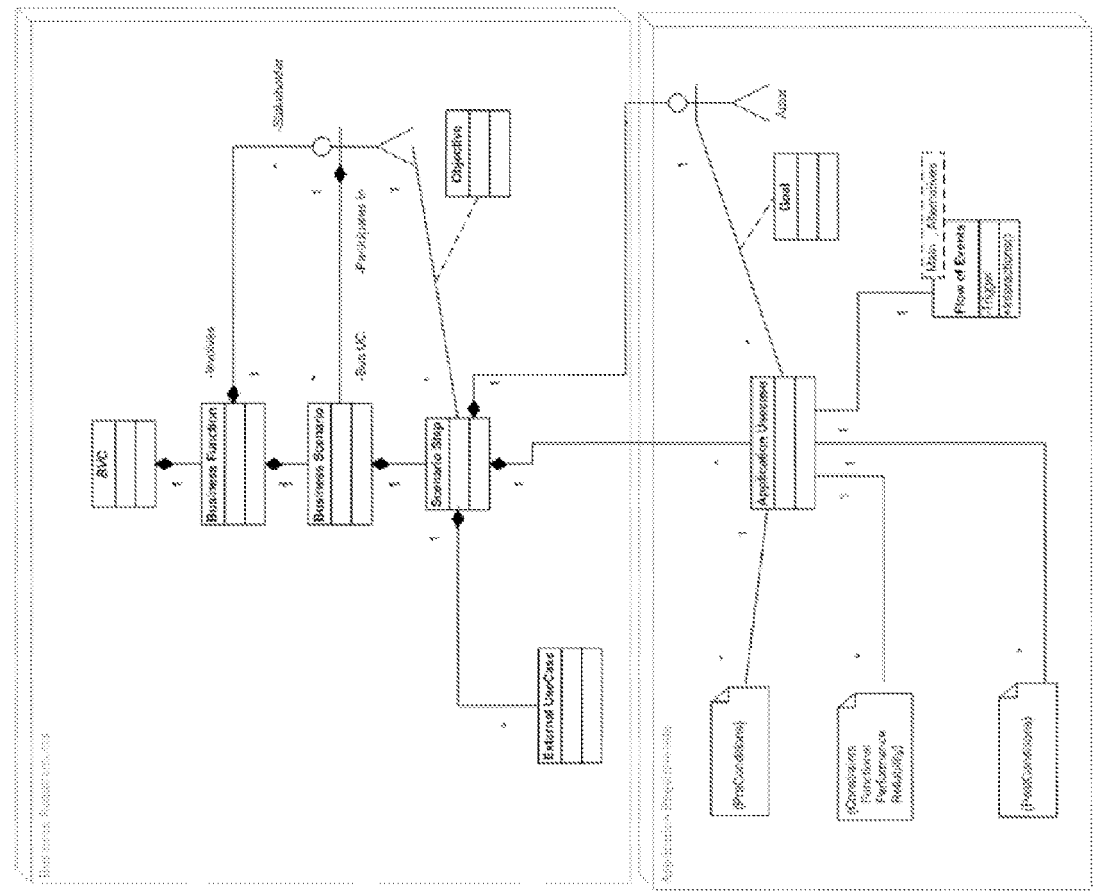
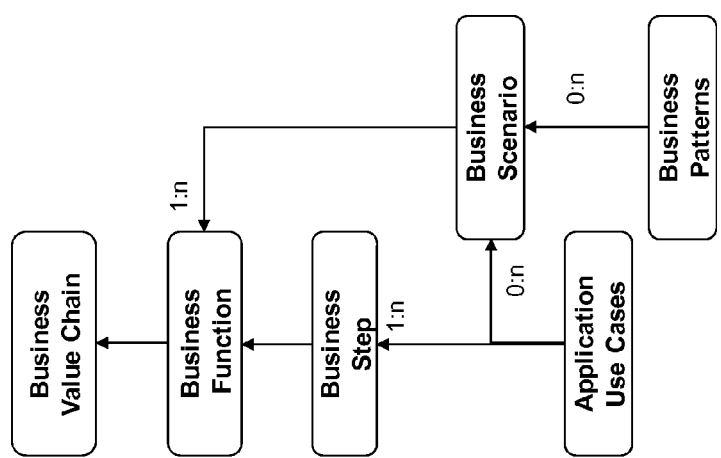
FIG. 6

FIG. 10

|  |  | Answer 1 High | Answer 2 Medium | Answer 3 Low |
|---|---|---|---|---|
| PERFORMANCE SELECTION VALUES | RIA | Peak # of Concurrent Users | 200k to 50k | 50k to 10k | Less than 10k |
| | | Peak Transaction Size (bytes/transaction) | 25kB to 5kB | 5kB to 1kB | Less than 1kB |
| | | Peak Response Size (bytes/transaction) | 2MB to 1MB | 1MB to 100kB | Less than 100kB |
| | | Peak Interval Between Transactions per User(s) | Less than 1 s | 3s to 1s | 3s to 6s |
| | ETL | Total # of Records (#) | 600M to 300M | 100M to 300M | Less than 100M |
| | | Runtime SLA (hours) | Less than 3 hrs | 3 hrs to 6 hrs | 6 hrs to 8 hrs |
| | | Total Data Load (TB) | 1TB to 500GB | 500GB to 250GB | Less than 250GB |
| | | Total Records Processed per Second (MB/s) | 8MB/s to 4MB/s | 4MB/s to 2MB/s | Less than 2MB/s |
| | BI | Total # of Records (#) | 900M to 450M | 150M to 450M | Less than 150M |
| | | Runtime SLA (hours) | Less than 4 hrs | 4 hrs to 8 hrs | 6 hrs to 10 hrs |
| | | Total Data Load (TB) | 1.5TB to 750GB | 750GB to 400GB | Less than 400GB |
| | | Total Records Processed per Second (MB/s) | 12MB/s to 6MB/s | 6MB/s to 3MB/s | Less than 3MB/s |

|  |  | Dominant Affect | Units | H | M | L |
|---|---|---|---|---|---|---|
| PERFORMANCE DATA | RIA | Peak # of Concurrent Users | Network | Gbps | 1,000 | 250 | 50 |
| | | Peak Transaction Size (bytes/transaction) | Memory | GB | 512 | 128 | 32 |
| | | Peak Response Size (bytes/transaction) | Disk | GB | 6,000 | 3,000 | 1,000 |
| | | Peak Interval Between Transactions per User(s) | Compute | GHz | 200 | 67 | 33 |
| | ETL | Total # of Records (#) | Network | Gbps | 36 | 18 | 6 |
| | | Runtime SLA (hours) | Compute | GHz | 42 | 21 | 7 |
| | | Total Data Load (TB) | Disk | GB | 1,000 | 500 | 250 |
| | | Total Records Processed per Second (MB/s) | Memory | GB | 128 | 64 | 32 |
| | BI | Total # of Records (#) | Network | Gbps | 54 | 27 | 9 |
| | | Runtime SLA (hours) | Compute | GHz | 63 | 32 | 11 |
| | | Total Data Load (TB) | Disk | GB | 1,500 | 750 | 375 |
| | | Total Records Processed per Second (MB/s) | Memory | GB | 192 | 96 | 48 |

FIG. 14

| Functional Pattern | Pattern Component | Compute | Memory | Disk | Network |
|---|---|---|---|---|---|
| Rich Internet Application | Business Logic | 17.0 | 34.4 | 384.6 | 69.8 |
| Rich Internet Application | Data Distribution Manager | 13.2 | 34.4 | 230.8 | 69.8 |
| Rich Internet Application | Data Source Communicator | 5.7 | 19.1 | 384.6 | 69.8 |
| Rich Internet Application | Edge Cache Repository | 9.4 | 26.7 | 384.6 | 69.8 |
| Rich Internet Application | Garbage Collector | 5.7 | 34.4 | 0.0 | 0.0 |
| Rich Internet Application | Media Repository | 17.0 | 34.4 | 692.3 | 69.8 |
| Rich Internet Application | Namespace Manager | 13.2 | 26.7 | 384.6 | 69.8 |
| Rich Internet Application | Non-Rich Media Transformation Engine | 17.0 | 34.4 | 384.6 | 69.8 |
| Rich Internet Application | Page Builder | 13.2 | 34.4 | 153.8 | 69.8 |
| Rich Internet Application | Personalization Repository | 9.4 | 34.4 | 538.5 | 69.8 |
| Rich Internet Application | Publish/Subscribe Manager | 13.2 | 34.4 | 538.5 | 69.8 |
| Rich Internet Application | Request Representation Mapper | 13.2 | 26.7 | 384.6 | 69.8 |
| Rich Internet Application | Rich Media Transformation Engine | 17.0 | 34.4 | 692.3 | 69.8 |
| Rich Internet Application | Service Request Manager | 13.2 | 34.4 | 230.8 | 69.8 |
| Rich Internet Application | Session Page Based Repository | 9.4 | 34.4 | 230.8 | 23.3 |
| Rich Internet Application | Targeted Source & Request Update Builder | 13.2 | 34.4 | 384.6 | 69.8 |
| | | 200.0 | 512.0 | 6000.0 | 1000.0 |

*FIG. 15*

| Functional Pattern | Pattern Component | High | | | |
|---|---|---|---|---|---|
| | | Compute | Memory | Disk | Network |
| Business Intelligence | Ad Hoc Report Output Renderer | 5.5 | 9.6 | 28.0 | 3.4 |
| Business Intelligence | Ad-Hoc Connection Pool Manager | 2.4 | 17.3 | 98.1 | 3.4 |
| Business Intelligence | Ad-Hoc Query Engine | 2.4 | 9.6 | 42.1 | 3.4 |
| Business Intelligence | Cube Data Aggregator/Dimensioner | 7.1 | 13.4 | 98.1 | 1.5 |
| Business Intelligence | Data Cube Publisher | 2.4 | 9.6 | 126.2 | 4.4 |
| Business Intelligence | Information Warehouse | 2.4 | 9.6 | 126.2 | 4.4 |
| Business Intelligence | Production Report Connection Pool Manager | 5.5 | 17.3 | 126.2 | 4.4 |
| Business Intelligence | Production Report Output Renderer | 5.5 | 17.3 | 126.2 | 1.5 |
| Business Intelligence | Production Report Query Engine | 7.1 | 17.3 | 126.2 | 4.4 |
| Business Intelligence | Report Authoring & Administration | 1.6 | 3.8 | 28.0 | 1.0 |
| Business Intelligence | Report Distribution Manager | 2.4 | 9.6 | 126.2 | 4.4 |
| Business Intelligence | Report Request Manager | 2.4 | 9.6 | 126.2 | 4.4 |
| Business Intelligence | Report Scheduler | 1.6 | 3.8 | 28.0 | 1.0 |
| Business Intelligence | Report Selector, Viewer, Filter | 2.4 | 9.6 | 42.1 | 3.4 |
| Business Intelligence | Standard Report Connection Pool Manager | 5.5 | 17.3 | 126.2 | 4.4 |
| Business Intelligence | Standard Report Query Engine | 7.1 | 17.3 | 126.2 | 4.4 |
| | | 63.0 | 192.0 | 1500.0 | 54.0 |

*FIG. 16*

| | | | | | | | | | | | |
|---|---|---|---|---|---|---|---|---|---|---|---|
| Transaction Monitoring | Application Monitoring | Application Data Service Monitoring | Security Service Monitoring | Middleware Monitoring | Operating System Monitoring | Hardware and Storage Monitoring | IP Connectivity Monitoring | Network Monitoring | Powering Monitoring | Heat Dissipation Monitoring |
| Execution Monitoring | | Service Monitoring | | | Resource Monitoring | | | | Environmental Monitoring | |

| Transaction Monitoring (e.g. Optier, CoreFirst) | Application Monitoring (e.g. Precise) | Application Data Service Monitoring (e.g. Hawk) | Security Service Monitoring (e.g. Cisco XML Gateway) | Middleware Monitoring (for App Server, DB, Grid, etc.) (e.g. Precise) | Operating System Monitoring (e.g. MOM) | Hardware and Storage Monitoring (e.g. Director, Insight) | IP Connectivity Monitoring (for LAN/WAN) (e.g. Cisco, OpNet, NetScout) | Powering Monitoring (e.g. APC, Schnieder, Rariton) | Heat Dissipation Monitoring (e.g. Honeywell) |
|---|---|---|---|---|---|---|---|---|---|

FIG. 30

| Business Demand Characteristics | High | Medium | Low |
|---|---|---|---|
| Availability Requirements | Continuous Availability 24/7 | Extended Business Hours | Normal Business Hours |
| Compliance Requirements | Compliance / Regulatory / Audit requirements determine workflow or data volumes | Compliance/Regulatory/Audit requirements significantly affect workflow or data volumes | Little compliance or regulatory requirements |
| Computational Requirements | Significant usage and/or Fast growing usage | Average or Moderate ( < 20% utilization) | Below Average |
| Extent of Visualization and Personalization | Increasing or high need for visual models and/or graphics or high need for usability | Some visualization or multidimensional or personalization requirements | Little use of visualization or graphics, low need for personalization |
| Scalability Requirements | Growth in data or processing volume > 20%; Growth in volume less than 20% per annum | | Little growth in volumes |
| Shape of Demand Profile | Unpredictable and Fluctuating | Predictable but fluctuating by time and/or volume | Predictable with Little Variation |
| Unit of Work Latency Sensitive | Extreme low latency or real time sensitive - milliseconds | Online financial transactions or Bounded operating windows | No latency sensitive processing |
| Extent of Change in Business Rules | Increasing or frequent need for business rule flexibility | Moderate change to business rules annually | Little annual change to business rules |
| Intensity of I/O | High I/O Rates or sustained periods of heavily fluctuating I/O rates | Intermittently fluctuating or generally flat periods of I/O rates | Low or few periods of increased I/O rate |
| Unit of Work Complexity | Multi-phase commit or long-lived transactions involving high degree of collaboration | Transactional but short lived or Moderate level of collaboration on non-transactional work | Non-transactional, low-collaboration processing |
| Data Distribution Requirements | Diverse sources of data or geographically dispersed set of consumers | Typical quantity of data sources or data distribution | Limited use of data sources or distribution required |
| Data Retention Requirements | Increasing or above average data retention requirements in terms of duration or types of data | Typical data retention requirements | No specific or limited data retention requirements |
| Data Transformation Requirements | Significant aggregation/translation required across diverse or dispersed data sources during data processing cycle | Periodic rollup / summarization or fixed-format translation of data during data processing cycle | No summarization / aggregation required other than for reporting or limited fixed-format translations |
| Data Volume & Throughput Requirements | Rapidly growing or large data volumes and storage requirements | Typical data volume and slow growing storage | Small volume |
| Reporting Requirements | Ad hoc, OLAP, Predefined Management, and Operational/Statement Reporting requirements | Predefined Management & Operational Reports only | Little reporting or Operational Reports and/or Customer Statements only |
| Unit of Work Data Granularity | Fine Grain (Transactional, Record-Oriented, Messages) | Mixed Granularity (Structured Documents, Logs, Mixed Multimedia, Email) | Coarse Grain (Unstructured Documents, File-Oriented, MultiMedia, Scanned Image) |
| Extent of access to data across applications / services | Location Transparent Access | Broad Access Required | Localized Access Only |
| Mobility requirements | Increasing need for mobility | Some or limited mobile requirements | No mobile requirements |
| Security Requirements | Increased Security Access and Authentication required | Typical Security access and authentication | Not security sensitive |

*FIG. 35A*

| Application | Business Activities | Workload | | | | | | | | | |
|---|---|---|---|---|---|---|---|---|---|---|---|
| | | Availability Requirements | Compliance Requirements | Computational Requirements | Extent of Visualization and Personalization | Scalability Requirements | Shape of Demand Profile | Unit of Work Latency Sensitive | Extent of Change in Business Rules | Unit of Work Complexity | Intensity of I/O |
| GenSUB | Primary Business Activity | N/A | N/A | Medium | High | Medium | Medium | N/A | High | N/A | Medium |
| | Secondary Business Activity | N/A | N/A | Medium | High | N/A | N/A | N/A | High | High | Medium |
| | Tertiary Business Activity | N/A | High | N/A | Low | N/A | Low | N/A | Low | Medium | N/A |

| Application | Business Activities | Data Management | | | | | | Access | | |
|---|---|---|---|---|---|---|---|---|---|---|
| | | Unit of Work Data Granularity | Data Transformation Requirements | Data Distribution Requirements | Data Retention Requirements | Data Volume & Throughput Requirements | Reporting Requirements | Extent of access across applications / services | Mobility requirements | Security Requirements |
| GenSUB | Primary Business Activity | Medium | High | Medium | N/A | Medium | N/A | High | High | Medium |
| | Secondary Business Activity | Medium | High | High | High | Medium | N/A | High | High | Medium |
| | Tertiary Business Activity | N/A | Medium | N/A | N/A | N/A | Medium | N/A | N/A | N/A |

Profile Attributes for Quantity of Each Type of Ensemble

Profile Attributes for Make/Model of Equipment

Profile Attributes for Logical Configuration Supplied

Profile Attributes for Physical Configuration Supplied

| Resources Configured (RCD) | | | Product Realization | | | | Software Dependencies | | | | Resource Supplied | | | |
|---|---|---|---|---|---|---|---|---|---|---|---|---|---|---|
| Capability Type | Ensemble Requirement | Mgmt Level | Units Configured | Technical Capability | Standards Compliance | Product Name | Product Version | Operating System | OS Version | Other Software | Software Versions | Configuration Restrictions | Notes | CPU (GHz) | Memory (MB) | Disk (GB) | Network (Mbps) | Configuration Restrictions |
| Management | N/A | Resource Unit | 1.00 | Router | Strategic | Cisco | 3400 | IOS | | | | | | | | | | |
| Management | N/A | Resource Unit | 2.00 | Network Switch | Strategic | Cisco | 1200 | IOS | | | | | Dual Processor | | | | | |
| Complex Transaction | | Resource Unit | 1.00 | Memory Appliance | Evaluation | Acrd | Vega 3 3310B | AIX | | | | RTPA configured | 2x 1.66 GHz | 48 GB | N/A | 2x 1 GBps | |
| Complex Transaction Report | | Resource Unit | 20.00 | Compute Blade Server | Evaluation | HP Integrity | Rx2660 | HP-UX | v11 | HA-OE | v3 | | | Itanium | 32 GB | 500 GB | 1 GBps + 4GB FC | |
| Management Processing | | Resource Unit | 1.00 | Storage Appliance | Strategic | NetApp | FAS3160 | NFS | v4 | | | MetroCluster configured | Dual Controller 16 BG 2x 1.66 GHz | | | 6 TB | 10x 4GB FC | |
| Report Management Processing | | Resource Unit | 2.00 | Compute Blade Server | Evaluation | HP Integrity | Rx2660 | HP-UX | v11 | HA-OE | v3 | | Itanium | 32 GB | 500 GB | 1 GBps + 4GB FC | |

| Maturity Level | Core | | | Integrated | | Autonomic | |
|---|---|---|---|---|---|---|---|
| CMM Level | Chaotic / Ad Hoc | Rationalized / Repeatable | Stabilized / Defined | Stabilized / Managed | Optimized | Enabling |
| Management | Inconsistent - every situation is unique | Project-based approach | Process-Based approach using enterprise-wide standard processes | Processes are measured and managed by metrics | Processes are continually improving | Processes are self-aligning |
| Engineered Quality of Experience | Difficulty correlating Cost, User Experience, & Efficiency | Reactive Improvements to Cost, User Experience, or Efficiency | Remediation to Improve Cost, User Experience, or Efficiency | Proactive Improvements to Cost, User Experience, or Efficiency | Balanced improvements to Cost versus User Experience and Efficiency | Predictive improvements to Cost, User Experience, or Efficiency |
| Architectural Model | None or Incomplete | Role exists on a project-by-project basis Architecture documentation exists but is inconsistent | Role exists on LoB basis Architecture standards exist | Role exists across all LoB, coordinated by Architecture Council | Architecture is an integral part of IT strategy Architectural benefits are tracked across enterprise | Architecture teams collaborate to respond to new business opportunities & challenges |
| Operating Model | High cost and slow to react | Reactive but instrumentation provides basis for improvements | Reactive but instrumentation guides pre-failure remediation | Proactive driven by architecture, strategy & governance | Proactive and pre-emptive based on correlation to past experiences/issues | Proactive and predictive based on predictive trending |

*FIG. 42*

| | Criteria Assessment | | | | |
|---|---|---|---|---|---|
| | None | Few | Some | Most | All |
| Process | | | | | |
| % Relevant Units | < 5% | 5 – 35% | 35 – 65% | 65 – 95% | > 95% |
| % Cases followed | < 5% | 5 – 35% | 35 – 65% | 65 – 95% | > 95% |
| Technical | | | | | |
| Feature Level | None | Basic | Typical | Well Featured | Full Featured |
| Applicability | No Cases | Few | Some | Most | All Cases |
| Competency | | | | | |
| Skill Level | None | Beginner | Average | Advanced | Expert |
| % People in Role | < 5% | 5 – 35% | 35 – 65% | 65 – 95% | > 95% |

*FIG. 43*

| All | 0 | .25 | .50 | .75 | 1 | All |
|---|---|---|---|---|---|---|
| Most | 0 | .15 | .35 | .50 | .75 | Most |
| Some | 0 | .10 | .25 | .35 | .50 | Some |
| Few | 0 | .05 | .10 | .15 | .25 | Few |
| None | 0 | 0 | 0 | 0 | 0 | None |
| | All | Few | Some | Most | All | |

*FIG. 44*

| Degree of Assessment | Level of Presence |
|---|---|
| Capability is almost certainly present | >95% |
| Capability is most likely present | 66 - 95% |
| Capability is equally likely present or absent | 36 - 65% |
| Capability is most likely absent | 5 - 35% |
| Capability is almost certainly absent | <5% |

FIG. 45

Conditional Probability Matrix = p(A | B)

| | | B = Dependency | | | |
|---|---|---|---|---|---|
| | | Absent | Few | Some | Most | Present |
| A = Constructed Capability | Present | - | 0.25 | 0.50 | 0.75 | 1.00 |
| | Absent | 1.00 | 0.75 | 0.50 | 0.25 | - |
| | | - | - | - | - | - |
| | | - | - | - | - | - |
| | Subtotal | 1 | 1 | 1 | 1 | 1 |

P(B) = Equally Likely = 0.20 0.20 0.20 0.20 0.20

*FIG. 48*

Conditional Probability Matrix = p(B | A)

| | | B= Dependency | | | | Subtotal |
|---|---|---|---|---|---|---|
| | | Absent | Few | Some | Most | Present | |
| A = Constructed Capability | p(Present) | - | 0.10 | 0.20 | 0.30 | 0.40 | 1.00 |
| | p(Absent) | 0.40 | 0.30 | 0.20 | 0.10 | - | 1.00 |
| | | - | - | - | - | - | - |
| | | - | - | - | - | - | - |

FIG. 49

Workload Pattern

| Resource | Influence Type | Quality or Quality Calculation |
|---|---|---|
| Processing | Latency | Degree of Exception Based Processing |
| Processing | Latency | Latency |
| Processing | Latency | Latency (increasing) |
| Processing | Latency | Response Time (increasing) |
| Processing | Latency | Wrkflw QoS (Time, Vol) - specifics in performance |
| Processing | Quality | Batch Procesing Time |
| Processing | Variation | Peak Duration |
| Processing | Variation | Peak Frequency |
| Processing | Variation | Peak Size |
| Processing | Variation | Wkflw- Degree of Concurrency |
| Processing | Volume | # Concurrent Users |
| Messaging | Latency | Asynchronus Message Delivery |
| Messaging | Latency | Increasing requirement for Guaranteed Delivery of Messages |
| Messaging | Latency | Wrkflw QoS (Time, Vol) - specifics in performance |
| Messaging | Quality | Latency |
| Messaging | Quality | Incr Rment for Guaranteed Delivery |
| Messaging | Variation | Event Driven |
| Messaging | Volume | Session Oriented (degree of user intervention) |
| Memory | Quality | Inverse of Scalability- Stateful- (Partitioned, Affinity), Stateless, Transparent |
| Memory | Volume | Calculation Size (increasing number of records/transactions per calculation) |
| Memory | Volume | Session Oriented (degree of user intervention) |
| Data | Latency | Calculation Data Requirement (increasing size of calc load - KB to GB) |
| Data | Latency | Calculation Size (increasing number of records/transactions per calculation) |
| Data | Latency | Wrkflw QoS (Time, Vol) - specifics in performance |
| Data | Quality | Data Storage - Time |
| Data | Volume | Data Source Integration |
| Data | Volume | Throughput Volume |
| Availability | MTBF | Availability Requirement- Days of Operation |
| Availability | MTBF | Availability Requirement- Hours of Operation within a day |
| Availability | MTBF | Availability Target % Uptime |
| Availability | MTTR | Availability Requirement- Maximum failover time |
| Availability | MTTR | Availability Requirement- MTTR- max time to repair |

34 of 50 Qualities Rearranged

FIG. 51

| Pr( KP \| Workload Pattern, Pattern Sensitivity ) | | Workload Pattern Quality Value | | | |
|---|---|---|---|---|---|
| | | High | Medium | Low | Not Defined |
| Pattern Quality Value | High | 0.85 | 0.75 | 0.35 | 0 |
| | Medium | 0.75 | 0.5 | 0.25 | 0 |
| | Low | 0.35 | 0.25 | 0.1 | 0 |
| | Not Defined | 0 | 0 | 0 | 0 |

*FIG. 52*

| X | Operation | Y | Result |
|---|-----------|---|--------|
| H | - | H | L |
| H | - | M | M |
| H | - | L | H |
| M | - | H | L |
| M | - | M | L |
| M | - | L | M |
| L | - | H | L |
| L | - | M | L |
| L | - | L | L |

| X | Operation | Y | Result |
|---|-----------|---|--------|
| H | x | H | H |
| H | x | M | H |
| H | x | L | M |
| M | x | H | H |
| M | x | M | M |
| M | x | L | L |
| L | x | H | M |
| L | x | M | L |
| L | x | L | L |

FIG. 53

Workload Pattern

| Quality Type | Resource | Influence Type | Quality or Quality Calculation |
|---|---|---|---|
| Base | Processing | Volume | # Concurrent Users |
| Calculated | Processing | Volume | Throughput Volume / Degree of Concurrency |
| Base | Processing | Variation | Peak Duration |
| Base | Processing | Variation | Peak Frequency |
| Calculated | Processing | Variation | Peak Frequency x Size / Duration |
| Base | Processing | Variation | Peak Size |
| Base | Processing | Variation | Wkflw- Degree of Concurrency |
| Base | Processing | Quality | Batch Procesing Time |
| Base | Processing | Latency | Degree of Exception Based Processing |
| Base | Processing | Latency | Latency |
| Base | Processing | Latency | Latency (increasing) |
| Base | Processing | Latency | Response Time (increasing) |
| Base | Processing | Latency | Wrkflw QoS (Time, Vol)- specifics in performance |
| Base | Messaging | Volume | Session Oriented (degree of user intervention) |
| Calculated | Messaging | Volume | Throughput Volume x Calculation Data Requirement |
| Base | Messaging | Variation | Event Driven |
| Calculated | Messaging | Variation | Variation |
| Base | Messaging | Quality | Incr Rment for Guaranteed Delivery |
| Base | Messaging | Quality | Latency |
| Base | Messaging | Latency | Asynchronus Message Delivery |
| Base | Messaging | Latency | Increasing requirement for Guaranteed Delivery of Messages |
| Calculated | Messaging | Latency | Latency / Calculation Size |
| Base | Messaging | Latency | Wrkflw QoS (Time, Vol)- specifics in performance |
| Base | Memory | Volume | Calculation Size (increasing number of records/transactions per calculation) |
| Base | Memory | Volume | Session Oriented (degree of user intervention) |
| Calculated | Memory | Volume | Throughput Volume x Calc Size |
| Base | Memory | Quality | Inverse of Scalability- Stateful- (Partitioned, Affinity), Stateless, Transparent |
| New | Facility | Volume | Space Footprint |
| New | Facility | Quality | Heat Generated |
| New | Facility | Quality | Power Consumed |
| Base | Data | Volume | Data Source Integration |
| Calculated | Data | Volume | Data Storage - Retention Size x Time |
| Base | Data | Volume | Throughput Volume |
| Calculated | Data | Variation | Peak Frequency x Peak Size x Calc Size / Duration |
| Base | Data | Quality | Data Storage - Time |
| Base | Data | Latency | Calculation Data Requirement (increasing size of calc load - KB to GB) |
| Base | Data | Latency | Calculation Size (increasing number of records/transactions per calculation) |
| Calculated | Data | Latency | Latency / Calculation Size |
| Base | Data | Latency | Wrkflw QoS (Time, Vol)- specifics in performance |
| Base | Availability | MTTR | Availability Requirement- Maximum failover time |
| Base | Availability | MTTR | Availability Requirement- MTTR- max time to repair |
| Base | Availability | MTBF | Availability Requirement- Days of Operation |
| Base | Availability | MTBF | Availability Requirement- Hours of Operation within a day |
| Base | Availability | MTBF | Availability Target % Uptime |

Calculating Optimal Quality Profile (Business Activity)

Overview
This is the process whereby the Quality Profile of a Business Activity is edited to match its underlying KPI Model. This can be visually represented by a Spider/Radar chart diagram.

Database Objects
- KPI
- KPI_QoE_Attributes_Mappings
- Profile_Business_Activities
- Profile_Business_Activity_Quality_Profile

Pseudo Code
Executed for each row in Profile_Business_Activities

*Create Target KPI Model Data Points*
FIND THE BUSINESS_FUNCTION_ID FROM PROFILE_BUSINESS_ACTIVITIES TABLE
FILTER PROFILE_BUSINESS_FUNCTION_KPI_MAPPING BY BUSINESS_FUNCTION_ID FROM ABOVE
FOR EACH ROW IN PROFILE_BUSINESS_FUNCTION_KPI_MAPPING
    FIND MATCH WITH KPI_TARGETS USING KPI_TARGET_ID
    IF FOUND
        PUSH INTO ARRAY PROFILE_BUSINESS_FUNCTION_KPI_MAPPING.KPI_ID
        PUSH INTO ARRAY KPI_TARGETS.TARGET_RELATIVE_RATING
    END IF
END FOR
USE ARRAY AS INPUT FOR PLOTTING TARGET SERIES OF DATA

*Create Current KPI Model Data Points (derived from Business Activity Quality Profile)*
FILTER PROFILE_BUSINESS_ACTIVITY_QUALITY_PROFILE BY BUSINESS_ACTIVITY_ID FORM THE ROW ABOVE
DECLARE QoEMIN, QoEMAX, QoEVALUE
FOR EACH ROW IN KPI TABLE
    FOR EACH ROW IN KPI_QOE_ATTRIBUTES_MAPPING TABLE
        FIND MATCH WITH PROFILE_BUSINESS_ACTIVITY_QUALITY_PROFILE ROW USING QOE_ATTRIBUTE_ID
        IF FOUND
            QoEMIN = QoEMIN + MINIMUM (KPI_QOE_ATTRIBUTES_MAPPING.HIGH, KPI_QOE_ATTRIBUTES_MAPPING.MEDIUM, KPI_QOE_ATTRIBUTES_MAPPING.LOW)
            QoEMAX = QoEMAX + MAXIMUM (KPI_QOE_ATTRIBUTES_MAPPING.HIGH, KPI_QOE_ATTRIBUTES_MAPPING.MEDIUM, KPI_QOE_ATTRIBUTES_MAPPING.LOW)
            SELECT CASE PROFILE_BUSINESS_ACTIVITY_QUALITY_PROFILE.VALUE_ID
                CASE "HIGH"
                    QoEVALUE = QoEVALUE + KPI_QOE_ATTRIBUTES_MAPPING.HIGH
                CASE "MEDIUM"
                    QoEVALUE = QoEVALUE + KPI_QOE_ATTRIBUTES_MAPPING.MEDIUM
                CASE "LOW"
                    QoEVALUE = QoEVALUE + KPI_QOE_ATTRIBUTES_MAPPING.LOW
                CASE ELSE
                    QoEVALUE = QoEVALUE + 0
            END SELECT
        END IF
    END FOR
    KPI_CURRENT_VALUE = System.Math.Round( ( ( ( QoEVALUE - QoEMIN ) / (2 * (QoEMAX - QoEMIN) ) ) + 0.25) * 100, 2)
    PUSH INTO ARRAY KPI.KPI_ID, KPI_CURRENT_VALUE
END FOR
USE ARRAY AS INPUT FOR PLOTTING TARGET SERIES OF DATA

*FIG. 59*

Calculating Optimization Suggestions

*Overview*
This is the process used to optimize a Profile Business Activity Quality Profile or a Project Quality Profile

*Database Objects*
- Profile Business Activity Quality Profile or Project Quality Profile depending on the context
- KPI QoE Attributes Mapping

*Pseudo Code*
Step 1:
For Each Optimization Target KPI
    For Each QoE Attribute
        Calculate and Store the Best Fit Score When QoE Attribute Value = 'High' (only change the value of QoE Attribute from outer loop and all other QoE Attribute values remain the same)
        Calculate and Store the Best Fit Score When QoE Attribute Value = 'Medium' (only change the value of QoE Attribute from outer loop and all other QoE Attribute values remain the same)
        Calculate and Store the Best Fit Score When QoE Attribute Value = 'Low' (only change the value of QoE Attribute from outer loop and all other QoE Attribute values remain the same)
    Next
Next This step creates the map of best fit scores corresponding to every possible combination of changes to a QoE Attribute Value for any Optimization Target KPI.

Step 2:
For Each Optimization Target KPI
    Update Best Fit Score = Absolute Value of (Target KPI Value – Best Fit Score)
Next This step sets up the best fit scores that are the closest to the Target KPI values for any Optimization Target KPI Step 3:
Calculate and store the Geometric Mean for each combination of QoE Attribute and Value
For Each QoE Attribute
    Select and Output the Value which corresponds to the minimum Best Fit Score
Next This step eliminates the KPIs out of the equation and then selects QoE Attribute and Value combination that has the lowest Best Fit Score. Given the update done in step 2 this means that these particular Values for QoE Attributes will optimize the QoE Profile closest Optimization Target KPI

Calculating Optimal Quality Profile (Project)

Overview
This is the process whereby the Quality Profile of an Application is edited to match its underlying KPI Model. This can be visually represented by a Spider/Radar chart diagram.

Database Objects
KPI
KPI_QoE_Attributes_Mappings
Project_Quality_Profile

Pseudo Code

*Create Target KPI Model Data Points*
FOR EACK ROW IN PROJECT_KPI_MAPPINGS
    FIND MATCH WITH KPI_TARGETS USING KPI_TARGET_ID
    IF FOUND
    PUSH INTO ARRAY PROJECT_KPI_MAPPINGS.KPI_ID
        PUSH INTO ARRAY KPI_TARGETS.TARGET_RELATIVE_RATING
    END IF
END FOR
USE ARRAY AS INPUT FOR PLOTTING TARGET SERIES OF DATA

*Create Current KPI Model Data Points (derived from Project Quality Profile)*
DECLARE QoEMIN, QoEMAX, QoEVALUE
FOR EACH ROW IN KPI TABLE
    FOR EACH ROW IN KPI_QOE_ATTRIBUTES_MAPPING TABLE
    FIND MATCH WITH PROJECT_QUALITY_PROFILE ROW USING QOE_ATTRIBUTE_ID
    IF FOUND
        QoEMIN = QoEMIN + MINIMUM (KPI_QOE_ATTRIBUTES_MAPPING.HIGH, KPI_QOE_ATTRIBUTES_MAPPING.MEDIUM, KPI_QOE_ATTRIBUTES_MAPPING.LOW)
        QoEMAX = QoEMAX + MAXIMUM (KPI_QOE_ATTRIBUTES_MAPPING.HIGH, KPI_QOE_ATTRIBUTES_MAPPING.MEDIUM, KPI_QOE_ATTRIBUTES_MAPPING.LOW)
        KPI_QOE_ATTRIBUTES_MAPPING.MEDIUM, KPI_QOE_ATTRIBUTES_MAPPING.LOW)
    SELECT CASE
    PROFILE_BUSINESS_ACTIVITY_QUALITY_PROFILE.VALUE_ID
        CASE "HIGH"
            QoEVALUE = QoEVALUE + KPI_QOE_ATTRIBUTES_MAPPING.HIGH
        CASE "MEDIUM"
            QoEVALUE = QoEVALUE + KPI_QOE_ATTRIBUTES_MAPPING.MEDIUM
        CASE "LOW"
            QoEVALUE = QoEVALUE + KPI_QOE_ATTRIBUTES_MAPPING.LOW
        CASE ELSE
            QoEVALUE = QoEVALUE + 0
    END SELECT
END IF
    END FOR
    KPI_CURRENT_VALUE = System.Math.Round((((QoEVALUE - QoEMIN) / (2 * (QoEMAX - QoEMIN))) + 0.25) * 100, 2)
    PUSH INTO ARRAY KPI.KPI_ID, KPI_CURRENT_VALUE
END FOR
USE ARRAY AS INPUT FOR PLOTTING TARGET SERIES OF DATA

*FIG. 65*

Calculating Ensemble Best Fit (Project)

Overview

This is the process whereby the Quality Profile of an Application is matched to all Ensembles available in the system. This can be visually represented by a Spider/Radar chart diagram

Database Objects

- Ensembles
- Ensemble_QoE_Attributes_Mappings
- Project_Quality_Profile

Pseudo Code

```
FOR EACH ROW IN ENSEMBLE TABLE
    FILTER ENSEMBLE_QOE_ATTRIBUTES_MAPPING BY ENSEMBLE_ID FROM ABOVE ROW
    FOR EACH ROW IN ENSEMBLE_QOE_ATTRIBUTES_MAPPING TABLE
        FIND MATCH WITH PROJECT_QUALITY_PROFILE ROW USING QOE_ATTRIBUTE_ID
        IF FOUND
            SELECT CASE PROJECT_QUALITY_PROFILE.VALUE_ID
                CASE "HIGH"
                    PUSH INTO ARRAY1 ENSEMBLE_QOE_ATTRIBUTES_MAPPING.HIGH
                CASE "MEDIUM"
                    PUSH INTO ARRAY1 ENSEMBLE_QOE_ATTRIBUTES_MAPPING.MEDIUM
                CASE "LOW"
                    PUSH INTO ARRAY1 ENSEMBLE_QOE_ATTRIBUTES_MAPPING.LOW
                CASE ELSE
                    PUSH INTO ARRAY1 0
            END SELECT
        END IF
    END FOR
    PUSH INTO ARRAY2 ENSEMBLE.ENSEMBLE, GEOMETRIC MEAN (Array1)
END FOR
```

*FIG. 66*

Calculating Ensemble Best Fit (Business Activity)

Overview

This is the process whereby the Quality Profile a Business Activity is matched to all Ensembles available in the system. This can be visually represented by a Spider/Radar chart diagram.

Database Objects
- Ensembles
- Ensemble_QoE_Attributes_Mappings
- Profile_Business_Activity_Quality_Profile

Pseudo Code

```
FOR EACH ROW IN ENSEMBLE TABLE
    FILTER ENSEMBLE_QOE_ATTRIBUTES_MAPPING BY ENSEMBLE_ID FROM ABOVE ROW
    FOR EACH ROW IN ENSEMBLE_QOE_ATTRIBUTES_MAPPING TABLE
        FIND MATCH WITH PROFILE_BUSINESS_ACTIVITY_QUALITY_PROFILE ROW USING QOE_ATTRIBUTE_ID
        IF FOUND
            SELECT CASE PROFILE_BUSINESS_ACTIVITY_QUALITY_PROFILE.VALUE_ID
                CASE "HIGH"
                    PUSH INTO ARRAY1 ENSEMBLE_QOE_ATTRIBUTES_MAPPING.HIGH
                CASE "MEDIUM"
                    PUSH INTO ARRAY1 ENSEMBLE_QOE_ATTRIBUTES_MAPPING.MEDIUM
                CASE "LOW"
                    PUSH INTO ARRAY1 ENSEMBLE_QOE_ATTRIBUTES_MAPPING.LOW
                CASE ELSE
                    PUSH INTO ARRAY1 0
            END SELECT
        END IF
    END FOR
    PUSH INTO ARRAY2 ENSEMBLE.ENSEMBLE, GEOMETRIC MEAN (Array1)
END FOR
```

*FIG. 68*

- By IT Function
  - | Score | Maturity Level
  - Management ............................ 25% ............ Core
  - Engineering ............................. 57% ............ Integrated
  - Operations .............................. 76% ............ Autonomic

- By IT Process Area
  - | Score | Maturity Level
  - Business Capability Mgmt ..................... 15% ............ Core
  - Application & Service Development ........ 23% ............ Core
  - Resource Planning ................................ 85% ............ Autonomic
  - Customer Mgmt .................................... 56% ............ Integrated
  - Service Delivery Operations ................... 36% ............ Core
  - Resource Mgmt ..................................... 68% ............ Autonomic
  - Supply Chain Mgmt ............................... 43% ............ Integrated

- By Utiltiy Focus Area
  - | Score | Maturity Level
  - Service Governance ........... 88% ............ Autonomic
  - Service Automation ............ 64% ............ Integrated
  - Service Virtualization .......... 58% ............ Integrated
  - Service Infrastructure ......... 24% ............ Core
  - Service Monitoring .............. 12% ............ Core

*FIG. 74*

| | | | |
|---|---|---|---|
| Application | Home Banking | | |
| Deployment | N-Tier | | |
| Component | Database Server | | Date |
| Hostname | PTWWWAPS0003 | | 2-Oct-10 |
| Normalized Resource Metrics | | | |
| Resource-Type | Metric | Condition | Impact |
| Processing | CPU Occupancy | High | High |
| Processing | Not Defined | Not Defined | Not Defined |
| Processing | CPU Fluctuation | Low | Medium |
| Processing | Response Time | High | High |
| Processing | Class of CPU | Medium | Medium |
| Messaging | Packets per Sec | Medium | High |
| Messaging | Bandwidth Occupancy | Medium | Medium |
| Messaging | Bandwidth Burstiness | Low | Low |
| Messaging | Jitter | High | High |
| Messaging | Network QoS Level | Medium | High |
| Memory | Not Defined | Not Defined | Not Defined |
| Memory | Memory Utilization | Medium | Medium |
| Memory | Paging or Swapping | Medium | Low |
| Memory | Not Defined | Not Defined | Not Defined |
| Memory | Class of Memory | Low | Low |
| Data | I/O Rate | Medium | Medium |
| Data | Disk I/O Volume | High | High |
| Data | I/O Burstinesss | Low | Medium |
| Data | Access Time | Medium | Medium |
| Data | Type of Storage | Low | Low |
| Availability | Percent Uptime | High | High |
| Availability | Not Defined | Not Defined | Not Defined |
| Availability | Not Defined | Not Defined | Not Defined |
| Availability | Time to Recover | Low | High |
| Availability | Class of Facility | Low | High |

FIG. 83

| Resource Types | Metric Types | | | | |
|---|---|---|---|---|---|
| | Frequency | Throughput | Delay | Variation | Quality |
| Processing | ✓ | | ✓ | ✓ | ✓ |
| Memory | | ✓ | | ✓ | ✓ |
| Data | ✓ | ✓ | ✓ | ✓ | ✓ |
| Network | ✓ | ✓ | ✓ | ✓ | ✓ |
| Availability | ✓ | | ✓ | | |

FIG. 86

| Resource-Type | Metric-Type | Metric |
|---|---|---|
| Processing | Frequency | CPU Occupancy |
| Processing | Throughput | Not Defined |
| Processing | Variation | CPU Fluctuation |
| Processing | Delay | Response Time |
| Processing | Quality | Class of CPU |
| Messaging | Frequency | Packets per Sec |
| Messaging | Throughput | Bandwidth Occupancy |
| Messaging | Variation | Bandwidth Burstiness |
| Messaging | Delay | Jitter |
| Messaging | Quality | Network QoS Level |
| Memory | Frequency | Not Defined |
| Memory | Throughput | Memory Utilization |
| Memory | Variation | Paging or Swapping |
| Memory | Delay | Not Defined |
| Memory | Quality | Class of Memory |
| Data | Frequency | I/O Rate |
| Data | Throughput | Disk I/O Volume |
| Data | Variation | I/O Burstinesss |
| Data | Delay | Access Time |
| Data | Quality | Type of Storage |
| Availability | Frequency | Percent Uptime |
| Availability | Throughput | Not Defined |
| Availability | Variation | Not Defined |
| Availability | Delay | Time to Recover |
| Availability | Quality | Class of Facility |

*FIG. 87*

| Resource Types | Throughput | Frequency |
|---|---|---|
| Processing | | CPU Occupancy |
| Memory | Memory Usage (MB) | |
| Data | Disk I/O (MB) | IOPs |
| Network | N/W I/O (KB) | Packets/Sec |
| Availability | | |

FIG. 88

| Resource Condition | Criteria | Interpretation |
|---|---|---|
| High | Q3 Value > Threshold | 25% of samples are over Threshold |
| Medium | Max Value > Threshold | At least one sample is over Threshold |
| Low | Max Value < Threshold | All samples within Threshold |
| Not Defined | Data Not Available | N/A |

*FIG. 92A*

| Resource Impact | Criteria | Interpretation |
|---|---|---|
| High | Pr(Max Value > Threshold) > 0.25 | Many busy hours impacted |
| Medium | Pr(Max Value > Threshold) > .10 | Some busy hours impacted |
| Low | Pr( Max > Threshold) < .10 | None or few busy hours impacted |
| Not Defined | Data Not Available | N/A |

*FIG. 92B*

Example: Investment Bank Incident Data (2009)

| | July | Aug | Sep | Oct | Total | Frequency |
|---|---|---|---|---|---|---|
| TDM | 21 | 19 | 14 | 18 | 72 | 46% |
| Network/Citrix/OLAP/Hardware | 13 | 14 | 9 | 3 | 39 | 25% |
| QRM Framework | 8 | 11 | 6 | 2 | 27 | 17% |
| User | 1 | 6 | 1 | 0 | 8 | 5% |
| Intex/ADCO | 1 | 4 | 1 | 0 | 6 | 4% |
| RTE | | | | 2 | 2 | 1% |
| Process Improvements | | | | 2 | 2 | 1% |
| Misc (Kill sessions) | | | | 2 | 2 | 1% |
| | 44 | 54 | 31 | 29 | 158 | |

| | | | Frequency |
|---|---|---|---|
| TDM | KDCPQRMSQL01 | 57 | 79% |
| TDM | PDCDRCOFCTX01 | 3 | 4% |
| TDM/BSM | KDCPQRMSQL01/SQL03 | 1 | 1% |
| TDM | PDCQQRMOLA01 | 1 | 1% |
| TDM | PDCQQRMOLA02 | 1 | 1% |
| TDM | PDCQQRMSQL01 | 1 | 1% |
| | No Server Identified | 8 | 11% |
| | Q3 Total | 72 | |

*FIG. 94*

| System1 Condition | Other Sys Condition | Pr(R2\|R1) |
|---|---|---|
| High | High | .50 |
| High | Medium | .75 |
| High | Low | .95 |
| Medium | High | 0 |
| Medium | Medium | .25 |
| Medium | Low | .65 |
| Low | High | 0 |
| Low | Medium | 0 |
| Low | Low | 0.1 |

FIG. 95

| Hour 1 | System1 | System2 | System3 | System4 |
|---|---|---|---|---|
| CPU | Low | Low | Low | Low |
| RAM | Low | Low | Low | Low |
| Disk IOPS | Medium | Low | Low | Low |
| Disk MB | High | Low | Low | Low |
| N/W Packets | Low | Low | Low | Low |
| N/W KB | Low | Low | Low | Low |

| Hour 2 | System1 | System2 | System3 | System4 |
|---|---|---|---|---|
| CPU | Low | Low | High | Medium |
| RAM | Low | Low | Medium | Low |
| Disk IOPS | Low | Low | Low | Low |
| Disk MB | Low | Low | Low | Low |
| N/W Packets | Low | Low | Low | Low |
| N/W KB | Low | Low | Low | Low |

*FIG. 96*

```
<Application Name=[AppName]>
    <Deployment Pattern=[Pattern Name]/> Deployment-
    Component Name
    <Element Name=[SysName]>
      <Resource Type=[CPU, NW, Disk, RAM, Facility] RName=
    [Latency, Occupancy]/> [H, M, L, N]
      ....
      <Resource Type=[CPU, NW, Disk, RAM, Facility] RName=
    [Latency, Occupancy]/> [H, M, L, N]
    </Element>
</Application>
```

*FIG. 97*

| Affinity Table | SI-1 | SI-2 | SI-3 | SI-4 | SI-5 |
|---|---|---|---|---|---|
| SI-1 | H | M | M | L | 0 |
| SI-2 | M | H | M | M | L |
| SI-3 | M | M | H | L | 0 |
| SI-4 | L | M | L | H | M |
| SI-5 | 0 | L | 0 | M | H |

Misfits
SI-4 + SI-1,
SI-4 + SI-3,
SI-5 + SI-2.

| Conditional Probabilities | IBM DB2 DB Svr | IBM WebSphere App svr deployment | IBM WebSphere app svr node | Java virtual | Lotus Notes Domino svr | MS .NET Runtime | MS SQL svr | RIM BlackBerry Ent Dispatcher | RIM BlackBerry Ent Router | Symantec AntiVirus | Symantec ESM Agent | Symantec ESM Mgr |
|---|---|---|---|---|---|---|---|---|---|---|---|---|
| IBM DB2 Database Svr | 1.00 | | | 0.11 | | | | | | | | 0.17 |
| IBM FileNet Image Svc | | 1.00 | | 0.04 | | | | | | | | 0.06 |
| IBM HACMP Cluster Svr | 0.67 | | | 0.15 | | | | | | | | 0.22 |
| IBM HTTP Server | | 1.00 | | 0.15 | | | | | | | | 0.22 |
| IBM InforSphere Replication Svr | 1.00 | | | 0.11 | | | | | | | | 0.17 |
| IBM Tivoli Monitoring DB2 Mon. Agent | 1.00 | | | 0.11 | | | | | | | | 0.17 |
| IBM Tivoli Monitoring SQL Svr Mon. Agent | | | | 0.04 | 0.08 | | 1.00 | | | 0.09 | | - |
| IBM Tivoli Mon. Unix OS Mon. Agent | 1.00 | 1.00 | 1.00 | 0.67 | | | | | | | | 1.00 |
| IBM Tivoli Mon. Windows OS Mon. Agent | | | | 0.33 | 0.92 | 1.00 | 1.00 | 1.00 | 1.00 | 0.91 | 0.91 | - |
| IBM Tivoli Remote Control Client | | | | 0.33 | 1.00 | 1.00 | 1.00 | 1.00 | 1.00 | 1.00 | 1.00 | - |
| IBM WebSphere Appl. Svr | | | 1.00 | 0.30 | | | | | | | | 0.44 |
| IBM WebSphere Appl. Svr | | | 1.00 | 0.30 | | | | | | | | 0.44 |
| IBM WebSphere Appl. Svr deploy. mgr | 0.67 | 1.00 | | 0.07 | | | | | | | | 0.11 |
| IBM WebSphere Appl. Svr Node Agent | | | 1.00 | 0.22 | | | | | | | | 0.33 |
| Java Virtual Machine | 1.00 | 1.00 | 1.00 | 1.00 | 0.75 | 1.00 | 1.00 | 1.00 | 1.00 | 0.82 | 0.73 | 1.00 |
| Lotus Notes Domino Svr | | | | 0.33 | 1.00 | 1.00 | 1.00 | 1.00 | 1.00 | 1.00 | 1.00 | - |
| Microsoft .NET Runtime | | | | 0.15 | 0.33 | 1.00 | 1.00 | 1.00 | 1.00 | 0.36 | 0.27 | - |
| Microsoft SQL Svr | | | | 0.04 | 0.08 | 0.25 | 1.00 | 1.00 | 1.00 | 0.09 | | - |
| RIM BlackBerry Enterprise Dispatcher | | | | 0.04 | 0.08 | 0.25 | 1.00 | 1.00 | 1.00 | 0.09 | | - |
| RIM BlackBerry Enterprise Router | | | | 0.04 | 0.08 | 0.25 | 1.00 | 1.00 | 1.00 | 0.09 | | - |
| Symantec AntiVirus | | | | 0.33 | 0.92 | 1.00 | 1.00 | | | 1.00 | 0.91 | - |
| Symantec ESM Agent | | | | 0.30 | 0.92 | 0.75 | 1.00 | | | 0.91 | 1.00 | - |
| Symantec ESM Manager | 1.00 | 1.00 | 1.00 | 0.67 | | | | | | | | 1.00 |

FIG. 102

INTEGRATED FORENSICS PLATFORM FOR ANALYZING IT RESOURCES CONSUMED TO DERIVE OPERATIONAL AND ARCHITECTURAL RECOMMENDATIONS

CROSS-REFERENCE TO RELATED APPLICATION

This application is entitled to the benefit of, and claims priority to, provisional U.S. Patent Application Ser. No. 61/278,359, filed Oct. 6, 2009 and entitled "ANALYSIS OF RESOURCES CONSUMED (ARC) TO DERIVE OPERATION AND ARCHITECTURAL RECOMMENDATIONS (ARCHEOLOGIST)," the entirety of which is incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

The present invention relates generally to systems, methods and software for capturing metrics associated with information technology, and, in particular, to facilitating analysis of information technology resources consumed to derive operation and architecture recommendations.

2. Background

Information Technology ("IT"), which as used herein generally refers to the computer equipment, systems, processes and other infrastructure that support all business activities within a company or other organization, has become increasingly important to each such company. Nearly always, each company's IT must perform numerous specific business processing functions, sometimes referred to herein as business applications, in which particular business problems are solved. The IT elements necessary to fulfill a particular business processing requirement are sometimes collectively referred to hereinafter as a business application and include both physical (e.g., computer hardware and other equipment) and non-physical elements. The non-physical elements include programs, which include the computer code (including both coding and configuration parameters) deployed on IT equipment to solve the applicable business problems.

Computer programs are complex algorithms applied to business problems. They can be purely mathematical, such as wave form analysis. Or, they may be finance management, such as home banking. All of these are developed and deployed with specification and testing before being put into production. There have been many documents that prescribe how to invent and create the necessary algorithms and processes, but all have left it to the technologists to evaluate the problem space and independently work through the selection process for technologies that are relevant for the computer algorithms that will be employed. Historically, program designers and developers have had to use generalized guidance, and create and deploy the application based on personal experience and insight. This process lacks rigor and does not prove "completeness" in the design, providing the opening for erroneous implementation and defective delivery. Furthermore, it also lacks definitive linkage to a comprehensive set of business requirements that include operational requirements. Often these requirements are discovered after that application is deployed, causing delays, errors and, loss of money and reputation.

Integrating all of the physical and non-physical elements of a given business application creates many further complexities, from the design and development of the various elements through deployment and maintenance of the complete business application. Unfortunately, aside from limited individualized guidance for particular elements, as described above, it has traditionally been difficult to find cohesive, methodical, or customized assistance in implementing the various tasks associated with a business application life cycle.

Some assistance in conceptualizing the relationship between IT and business needs was provided by work done by Michael Porter in 1985. He introduced the concept of a Business Value Chain (BVC), which is a generic value chain model that comprises a sequence of activities found to be common to a wide range of firms. Porter identified key activities, including policies and decisions, interrelationships, integration and scale that strongly apply to the general function(s) required of IT. However, a need remained for a systematic approach, dedicated tools and platforms, and the like to assist in the actual design and management of IT. Without these things a recurring cycle of typical problems hamper day to day operations including: significantly oversized IT configurations (under utilization causes waste in both the investment and the environment, through excess energy and space consumption); unidentified constraints, which significantly limit the constraints that the business application must run with and limit most growth or change factors; the inability to identify the root cause of an operational incident; a failure to identify configuration changes to redeploy resource to other programs; and many others.

The credit crisis and a struggling economic climate have radically altered every industry, resulting in tightening of corporate budgets and generating a renewed interest in operational efficiency. Other key factors that have increased this interest include increasing globalization, which creates both opportunities and threats to any size business, and an increasing level of regulatory pressures. All of these factors have increased the need for businesses to carefully consider what strategic investments should be made and have forced businesses to be more adaptive to their changing surroundings in order to compete successfully.

The organizational element of the business that has functional responsibility for IT operations ("IT Operations") is responsible for the delivery of the services necessary to fulfill the business application. Currently, the available tools are strongly focused on capacity and availability measurements for individual pieces of equipment which produce data. Unfortunately, these tools are not effective in using that data to create knowledge which enables the practitioner to identify opportunities for change and to make informed decisions about how to effectively change and otherwise manage their IT infrastructure. A need exists for more effective systems, methods and tools for achieving these and other functions.

SUMMARY OF THE PRESENT INVENTION

Broadly defined, the present invention according to one aspect is a method for facilitating forensic analysis of operational data for an IT infrastructure, including: deriving performance data from a plurality of physical systems, network elements and storage devices in an IT infrastructure via a toolset comprising a plurality of IT monitoring and metrics tools, wherein each tool is communicatively interfaced with one or more of the physical systems, network elements and storage devices; importing the performance data into an integrated forensics platform; aggregating the imported data; and analyzing the aggregated data to determine resources consumed.

In a feature of this aspect, the toolset includes third party tools. In further features, the third party tools include a plurality of tools from different providers; and/or the third party tools include at least a first tool provided by the owner or manager of the IT infrastructure and at least a second tool provided by an entity other than the owner or manager of the IT infrastructure.

In another feature of this aspect, the method further includes producing a forensic heat map setting forth a collection of metrics and at least one aspect of resource consumption for each metric.

In further features, the at least one aspect of resource consumption for each metric includes a current condition of the respective metric; the condition of the respective metric is described on a scale having at least three values; and the condition of the respective metric is described textually and/or graphically.

In still further features, the at least one aspect of resource consumption for each metric includes a current impact of the respective metric; the impact of the respective metric is described on a scale having at least three values; the impact of the respective metric is described textually and/or graphically; and the at least one aspect of resource consumption for each metric also includes a current condition of the respective metric.

In still further features, a type of resource to which the metric pertains is included in the forensic heat map for each metric; and the resource types are selected from a group that includes processing, messaging, memory, data and availability.

In still further features, a metric type is included in the forensic heat map for each metric; and the resource types are selected from a group that includes variability of consumption (variation), latency of consumption, intensity of consumption (quality) and occupancy of the resource (volume).

In still further features, the step of producing a forensic heat map includes producing a collection of forensic heat maps, each for a separate application; the method further includes selectively displaying the collection forensic heat maps to a user via the archaeologist platform; and/or the method further includes providing the collection of forensic heat maps to an infrastructure correlation engine for use in deriving operational or architectural recommendations.

In still further steps, the step of analyzing the aggregated data to determine resources consumed is carried out in a secure environment, and wherein the step of producing a forensic heat map is carried out in a less-secure thin client; the method further includes receiving incident information from an incident tracking system, and wherein the step of producing a forensic heat map is carried out at least partly on the basis of the incident information; the method further includes receiving configuration data from a configuration management database, and wherein the step of producing a forensic heat map is carried out at least partly on the basis of the configuration data; the method further includes receiving facilities data from a information database, and wherein the step of producing a forensic heat map is carried out at least partly on the basis of the facilities data; and/or the method further includes generating software anomaly risk information.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 6 illustrates how a business scenario is in essence a higher level expression of a use case that contains one or more business steps;

FIG. 10 illustrates exemplary information patterns for storage and access;

FIG. 14 illustrates an exemplary service profile detailing peak period related qualities for rich internet application, business intelligence, and extract, translate, load functional patterns;

FIG. 15 illustrates an exemplary service profile showing resource consumption qualities of each element of a rich internet application functional pattern;

FIG. 16 illustrates an exemplary service profile showing workload allocation qualities of each element of a business intelligence functional pattern;

FIG. 22 facilitates understanding that an integrated monitoring pattern can be used to define technology used within a common monitoring deployment pattern;

FIG. 26 illustrates how a technology pattern can be used to describe the end to end characteristics of an entire enterprise architecture;

FIG. 30 illustrates an exemplary technology stack;

FIG. 35A illustrates generic business demand characteristics that can be utilized in a workload profile;

FIG. 35B illustrates an exemplary workload profile utilizing the generic business demand characteristics of FIG. 35A;

FIG. 37 illustrates an exemplary QoE profile;

FIG. 38 illustrates data usage patterns charted utilizing a detailed policy set of their service profiles;

FIG. 40 illustrates second tier qualities for use in dimensioning storage for a processing execution destination;

FIG. 41 illustrates an example of provisioning a processing execution destination;

FIG. 42 illustrates exemplary maturity levels that can be utilized;

FIG. 43 illustrates an exemplary capability assessment table for process, technical, and competency capabilities;

FIG. 44 illustrates an exemplary scoring matrix which might be utilized in one or more implementations;

FIG. 45 illustrates an exemplary range table which might be utilized in one or more implementations;

FIGS. 48-49 illustrate conditional probability matrices;

FIG. 51 illustrates an exemplary workload pattern that represents a subset quality profile having thirty four of fifty qualities rearranged;

FIG. 52 illustrates how a pattern quality value can be correlated to a workload pattern quality value;

FIG. 53 illustrates exemplary fuzzy logic tables;

FIG. 54 illustrates a workload pattern having both base qualities and calculated qualities derived therefrom;

FIGS. 55A and 55B collectively illustrate an exemplary performance heat map predicting how well an ensemble meets workload requirements;

FIGS. 59-60 illustrate pseudo control instructions;

FIG. 61 illustrates the similarity of quality profiles for business activities of a sales business function and the identification of a fit for purpose network ensemble for these business activities;

FIGS. 65-66 illustrate pseudo control instructions;

FIG. 68 illustrates pseudo control instructions;

FIG. 74 illustrates exemplary capability summary scorecards;

FIG. 83 is a first exemplary depiction of a forensic heat map of FIG. 82;

FIG. 86 is a tabular illustration detailing exemplary metric types and resource types;

FIG. 87 is a tabular illustration detailing exemplary normalized resource metrics generated from the resource and metric types detailed in the table of FIG. 86;

FIG. 88 is a tabular illustration of a subset of the metrics of FIGS. 86 and 87;

FIGS. 92A and 92B are tabular depictions of the criteria for resource condition classification and resource impact classification, respectively, as high, medium, or low;

FIG. 94 illustrates exemplary incident data for an investment bank example;

FIG. 95 is a tabular representation of exemplary bottleneck probability values based on a system condition (R1) and other system conditions (R2);

FIG. 96 is a tabular representation of bottleneck probabilities in an exemplary four-system environment during two sample hours;

FIG. 97 is an exemplary XML fragment for use in importing data in accordance with one or more preferred embodiments of the present invention;

FIG. 100 is a tabular representation illustrating exemplary affinities between five software items;

FIG. 101 is an exemplary chart illustrating software items on various servers; and FIG. 102 is a conditional probability table showing conditional probabilities for pairs of software items.

DETAILED DESCRIPTION

Figure 1:
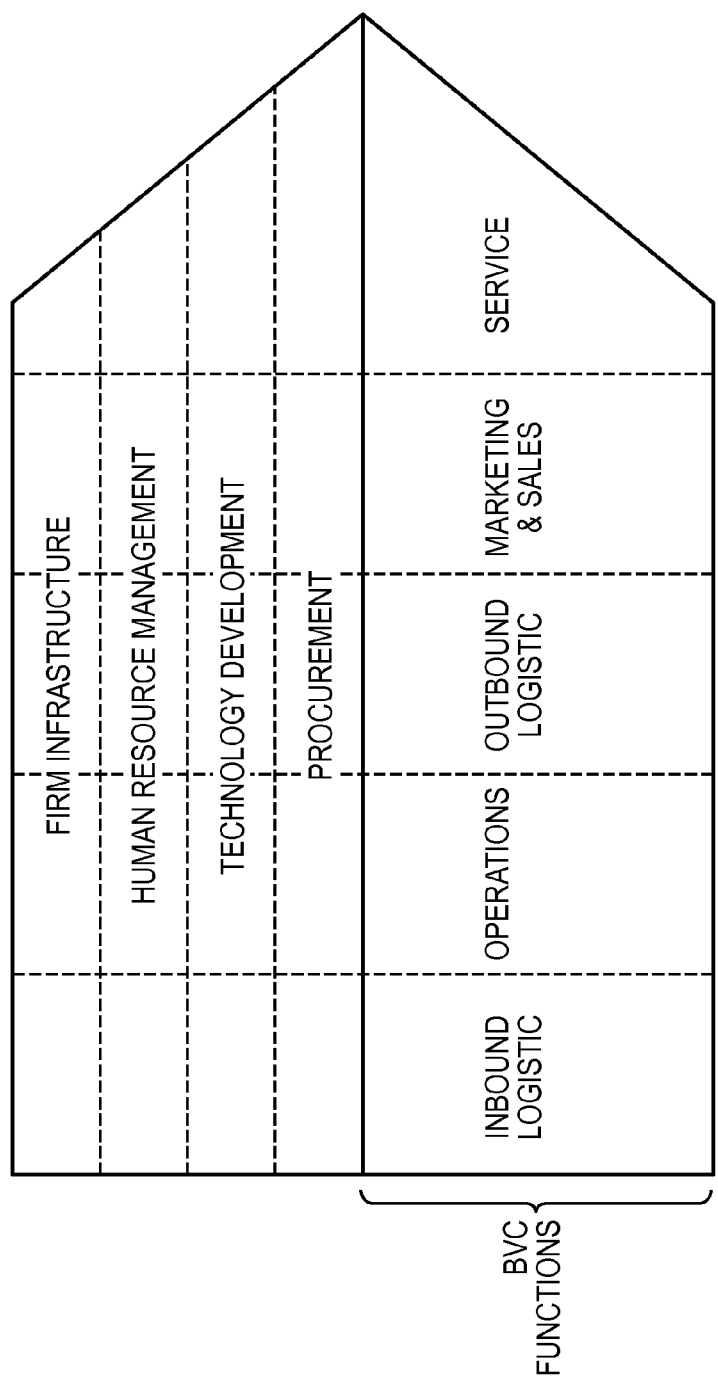
FIG. 1 illustrates a generic business value chain model that includes inbound logistics, operations, outbound logistics, marketing and sales, and service business functions.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

As used in this application, the terms "component" and "system" may refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" may refer generally to the process of reasoning about or inferring states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used herein, the terms "infrastructure" and "architecture" shall generally each be construed as potentially enveloping both hardware and software, excepting only those situations where a particular characterization would be impossible.

Referring now to the drawings, in which like numerals represent like components throughout the several views, the preferred embodiments of the present invention are next described. The following description of one or more preferred embodiment(s) is merely exemplary in nature and is in no way intended to limit the invention, its application, or uses.

INTRODUCTION

Inter alia, systems and methods for leveraging expert knowledge in advanced IT architecture, engineering and real-time operational management are described herein. One or more aspects of the present invention relate to such systems or methods, or software implementing, embodying, or facilitating such systems or methods.

At least some such software can be characterized as a system or platform to carry out analysis of resources consumed (ARC) to derive operation and architecture recommendations. Such software is sometimes characterized herein as an "archeologist" platform. In preferred implementations, an archeologist platform is utilized in combination with other software for IT design and management, such as, for example, software utilizing or representing an infrastructure correlation engine as disclosed in U.S. patent application Ser. No. 12/899,456, titled "INFRASTRUCTURE CORRELATION ENGINE AND RELATED METHODS", naming as inventors Sheppard David Narkier, Anthony Bennett Bishop, Paul Edward Renaud, Alexis Salvatore Pecoraro, and Paul John Wanish, filed concurrently herewith on Oct. 6, 2010, which application and any publications thereof and patents issuing therefrom are hereby incorporated herein by reference. An infrastructure correlation engine (ICE) represents a tool that combines expert knowledge in advanced IT architecture, engineering, and real-time operational management to enable users to create optimized real time infrastructure designs that respect workload and physics in a repeatable manner across industries. Such users might include, for example, architects, system engineers, and systems management personnel.

In order to properly support and enable the business, IT Operations must advance the data analysis provided to determine if various criteria (more fully described hereinbelow) are being achieved. By using ARC, IT Operations can identify and surface recommendations to management on opportunities to optimize the Digital Supply Chain (DSC), tailoring configurations to meet these business demands.

Business Demand

Figure 2:
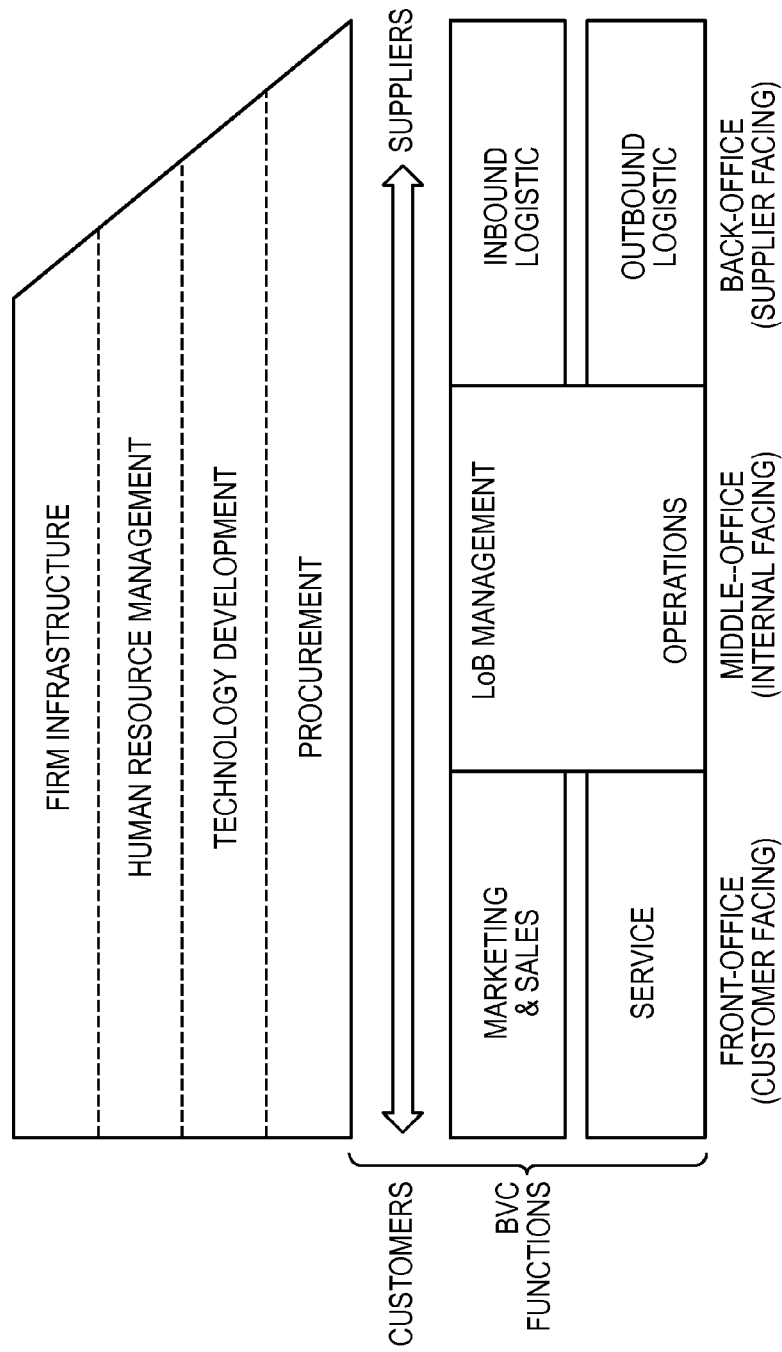
FIG. 2 illustrates a rearrangement of the business value chain model of FIG. 1.

A common methodology for describing the creation of economic value for an organization involves the utilization of business value chains. A business value chain can be characterized as being comprised of a plurality of links, each of which represents a major business function of the organization. FIG. 1 illustrates a generic business value chain model that includes inbound logistics, operations, outbound logistics, marketing and sales, and service business functions. The generic business value chain model can be rearranged to organize links by whether they are customer facing (front office), internal facing (middle office), or supplier facing (back office). FIG. 2 illustrates such a rearrangement.

Figure 3:
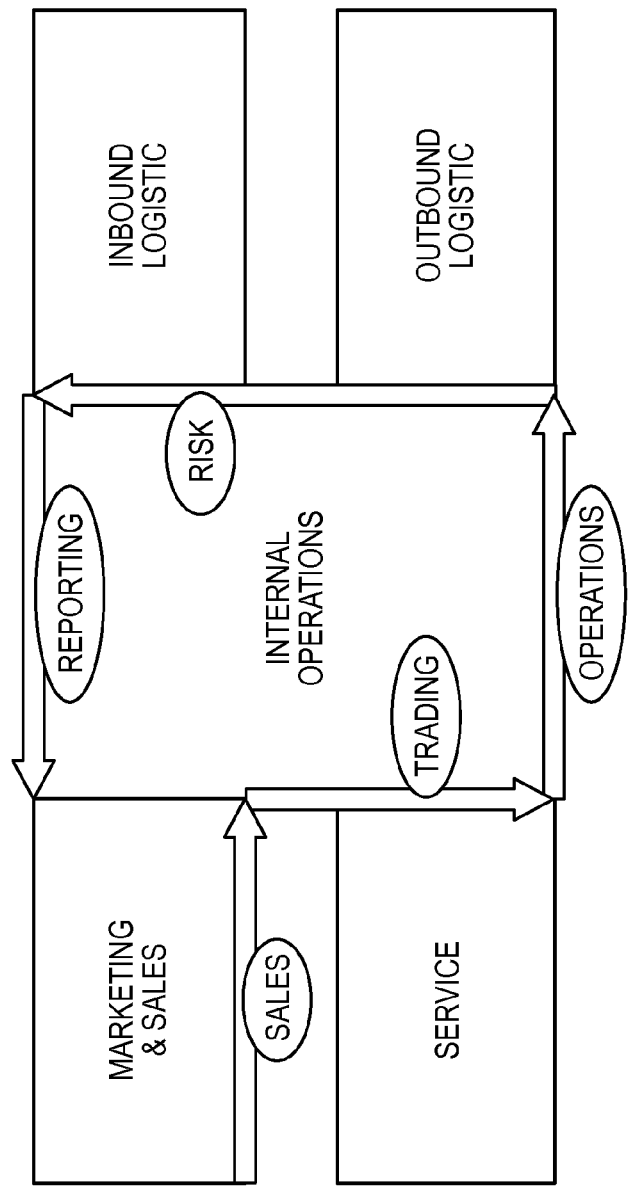
FIG. 3 illustrates business functions as links in a business value chain.

A more concrete example would be a capital markets business value chain which includes sales, trading, operations, risk, and reporting business functions. FIG. 3 illustrates these business functions as links in a business value chain.

Notably, a business value chain and the business functions within a business value chain usually span multiple stakeholders. Each business function has a primary set of stakeholders with specific business objectives. The fulfillment of a stakeholder objective represents a business scenario. Business scenarios can be identified by first identifying each stakeholder in a business function, and, thereafter, for each stakeholder, identifying each objective that that stakeholder has in that business function. Any specific requirements for meeting a stakeholder's objective should be identified so as to be included in a service level agreement (described hereinbelow).

Each stakeholder-objective combination for a business function is the point of departure for a business scenario. For each business scenario, a trigger event can be identified that initiates the scenario. A main sequence of interactions can then be described that represents the main scenario. Business exceptions can be captured as alternative flows through the scenario, i.e., as alternative scenarios. Each alternative scenario can be identified by describing each variation in the flow of events for the main scenario. Each alternative scenario can be described as a sequence of interactions.

An example of a business scenario is a business scenario for a car accident claim. The stakeholder in such a business scenario would be the claimant. The stakeholder's objective would be to get paid for his or her claim. A service level agreement (described in more detail hereinbelow) might specify that a stakeholder is to be paid within two weeks. The trigger for this scenario would be the submission of a claim by the claimant.

The main scenario would involve steps of the claimant submitting a claim with substantiating data, an insurance company verifying that claimant owns a valid policy, the insurance company assigning an agent to examine the case, the insurance company verifying all details are within policy guidelines, and the insurance company paying claimant and closing the file.

A first alternative scenario would encompass the situation where the submitted data from the first step was incomplete. This alternative scenario would include steps of the insurance company requesting missing information, and the claimant supplying the missing information.

A second alternative scenario would encompass the situation where the claimant does not own a valid policy. This alternative scenario would include the step of the insurance company denying the claim, notifying the claimant, and terminating the claim process.

A third alternative scenario would encompass the situation where no agent was available to examine the case. This alternative scenario would include the step of queuing the case for examination. Those familiar with the U.S. Patent and Trademark Office should be very familiar with this "alternative" scenario.

A fourth alternative scenario would encompass the situation where an accident associated with the claim violates basic policy guidelines. This alternative scenario would involve the insurance company declining the claim, notifying the claimant, and terminating the claim process.

A fifth alternative scenario would encompass the situation where an accident associated with the claim violates minor policy guidelines. This alternative scenario would involve the insurance company beginning negotiations with the claimant as to the degree of payment to be made.

Figure 4:
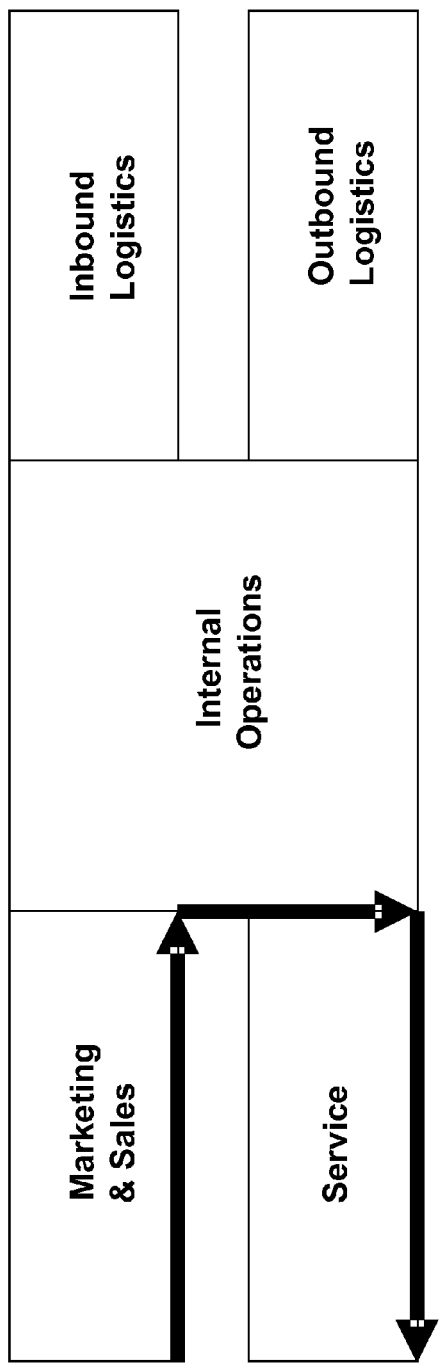
FIGS. 4-5 illustrate exemplary business scenarios.
Figure 5:
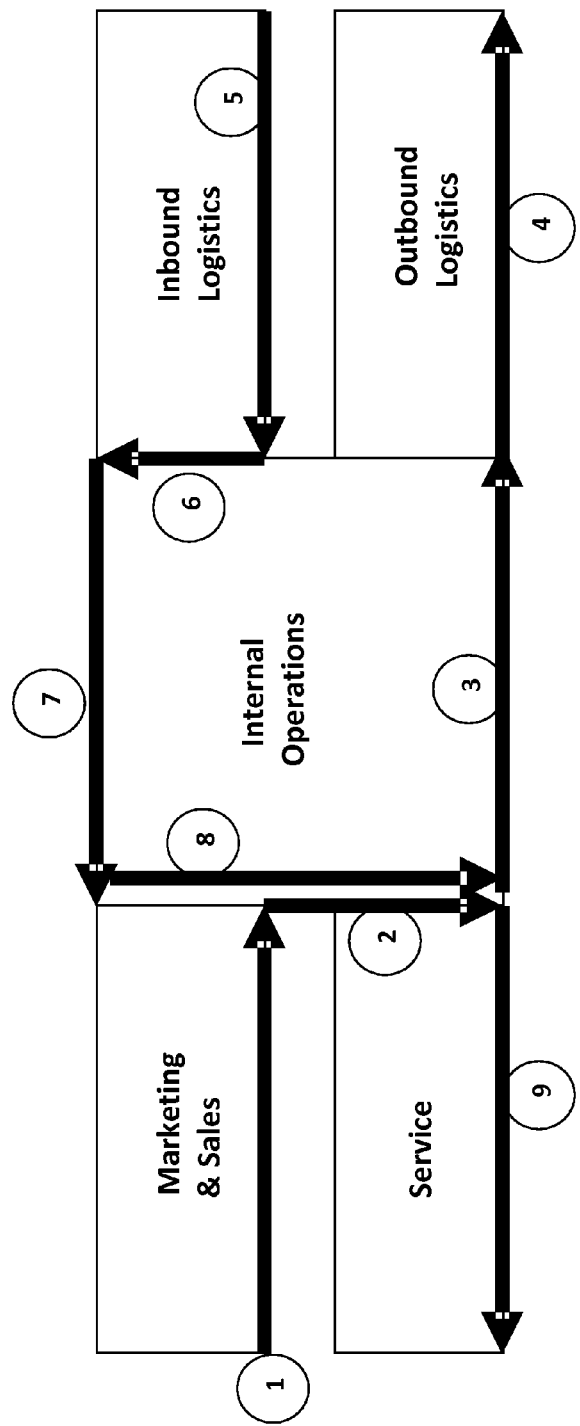

FIG. 4 and FIG. 5 illustrate additional exemplary business scenarios. Specifically, FIG. 4 illustrates a basic customer sale and installation scenario, and FIG. 5 illustrates an exemplary order fulfillment scenario utilizing just in time manufacturing and a field install.

Each business function in a business value chain comprises a series of business steps. Each business step involves a subset of stakeholders of the business function it is part of Business steps represent a process view of a business value chain. For example, a risk business function could be broken down into steps of calculating counterparty risk, generating counterparty reports, establishing a value of portfolios, calculating a value at risk for each portfolio, comparing the calculated value at risk to risk thresholds and compliance requirements, determining portfolio adjustments to reduce risk, generating portfolio adjustment reports, and generating overnight trades to rebalance portfolio risk.

A use case describes functionality of a business step by expounding on part of a business scenario.

Specifically, a business scenario is in essence a higher level expression of a use case that contains one or more business steps, and each of these business steps can be elaborated by one or more use cases, as illustrated in FIG. 6.

For example, a "process trade" business step within a trade execution business scenario might include a "cancel a trade" use case. A use case is written to describe "what" a system or application must do to fulfill a user request. Use cases might have multiple steps (not to be confused with business steps), and each step can be characterized as having an actor, e.g., a user or a user's surrogate. A use case further has pre-conditions which must be fulfilled before the use case can start, as well as at least one post-condition, which can guarantee a certain outcome. An "e" flag can be utilized to determine whether an error occurs during execution of a use case. A use case can be composite, where each step in a higher level use case can be decomposed into separate multi-step use cases.

With respect to the exemplary "cancel a trade" use case, the actor for this use case would be a trader. The goal of this use case would be to reverse a prior trade prior to execution. The triggering event for this use case would be that the trader decides that the trade is no longer favorable. The frequency/repetition/concurrency of this trade would be once per day. A main flow of events for this use case would include steps of a trader checking that the trade has no prior fills, the system confirming no prior fill, the trader issuing a trade cancellation, the system removing the trade from an order book, and the trader receiving confirmation of the trade cancellation. The pre-conditions for this use case would require an initial state of the trade being unfulfilled and authentication by the trader. The post-conditions for this use case would specify that the trade is canceled and that the trade is subsequently historical for data integrity purposes. This use case would include constraints on performance (a check for prior fills must execute within half a second and removal from order book must complete within one second), reliability (a cancel trade transaction must be recovered if the system fails after confirming no prior fill), security (it is only possible for a trader to cancel trades belonging to the trader), and business rules (trade cancellation of a trade cannot be completed if the trade is filled prior to completion, and concurrent trade execution fails after a trade issues a trade cancellation). In an alternative flow of events, the trader discovers that a trade has already been filled and abandons the cancel trade attempt, or the trader discovers that a trade has been partially filled and issues cancellation of an unfulfilled balance of the trade.

Figure 7A:
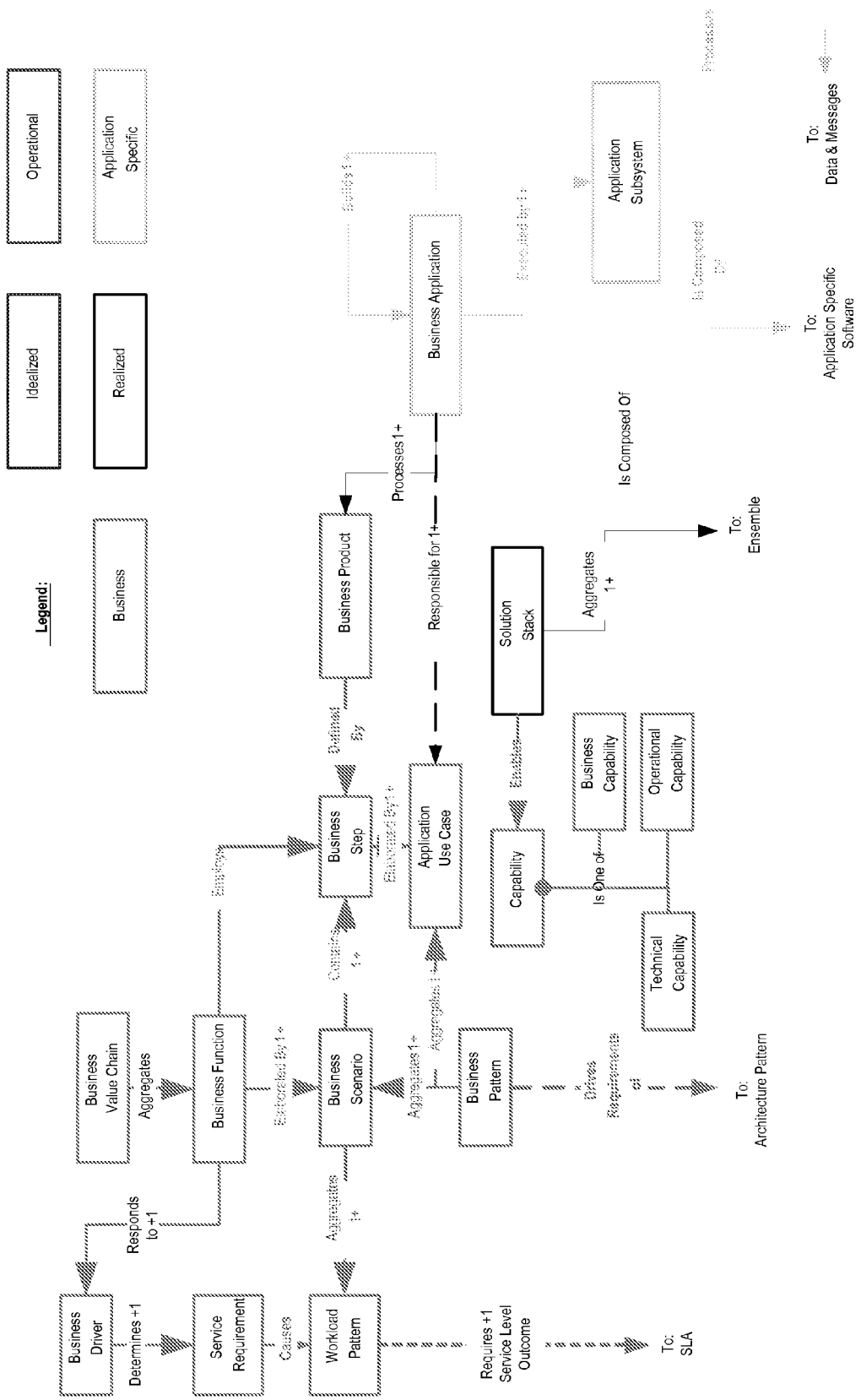
FIG. 7 illustrates exemplary relationships of various concepts and elements described herein.
Figure 7B:
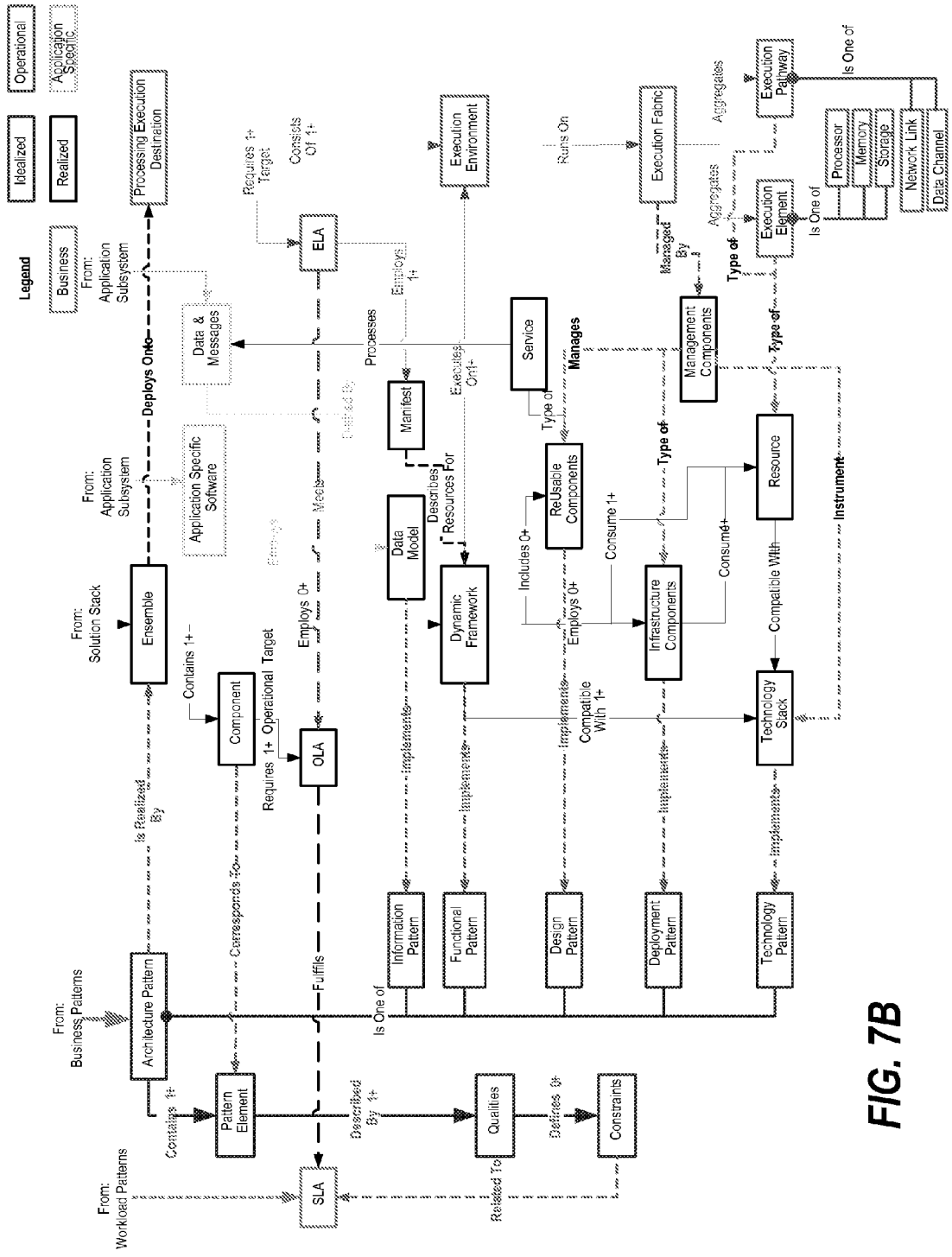

A business application processes one or more business products defined by business steps and is responsible for one or more application use cases. Such a business application is executed by an application subsystem composed of one or more assemblies of infrastructure capabilities configured to optimize a certain workload profile. These assembles can be characterized as ensembles. These relationships are illustrated in FIG. 7, together with relationships of other conceptualizations described herein in accordance with some preferred systems and methodologies.

Notably, a business value chain and the business functions within a business value chain usually span multiple business applications. Similarly, business scenarios may transcend applications. A business step, in contrast, typically involves a primary application in combination with secondary applications from adjacent business steps. A use case is specified in a manner similar to a scenario, but corresponds to only a single business application.

Figure 8:
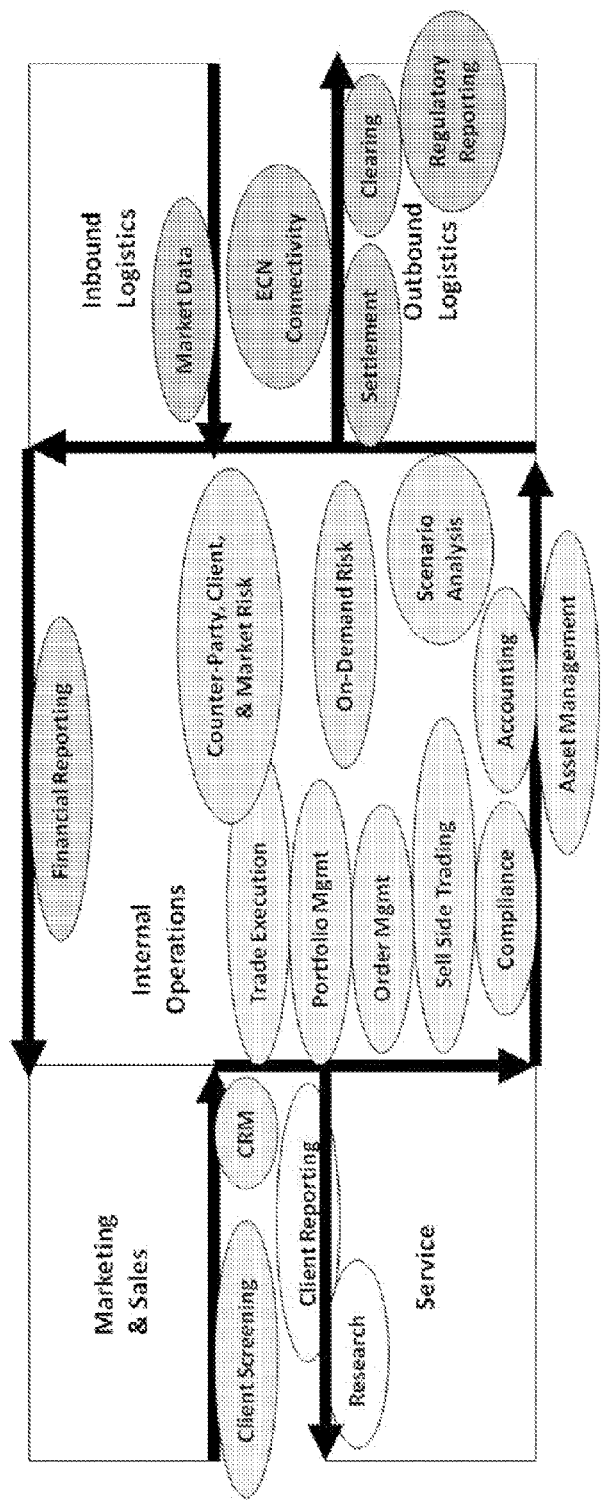
FIG. 8 illustrates exemplary business activities that underpin a straight through processing capital markets business value chain.

Business steps can be organized around common business activities that combine related business steps. Thus, business activities represent an organizational sub-grouping within a business function. For example, the illustrated ovals in FIG. 8 represent exemplary business activities that underpin a straight through processing capital markets business value chain.

Business Patterns

In walking through various business scenarios across varying business functions, recurring functionality can be found. Such recurring functionality within business activities can be characterized as business patterns.

Specifically, a business pattern represents recurring functionality from one or more business scenarios or application use cases. A business application is responsible for providing the IT functionality required for such application use cases.

For example, a business pattern might represent the common situation where a request is put in for service. This business pattern would include the steps of receiving a request from a customer, recording the customer request, collecting information necessary to satisfy the customer request, processing the request, recording information required to respond to the request, providing a response to the customer, and following up to ensure the response to the request was satisfactory. Such a business pattern might apply, for example, to a request for account information, a request to update a customer profile, a request to open a new account, or a request for a new loan for an existing account. Furthermore, since business patterns are shaped by the forces of business operating on the organization, business drivers and business demand characteristics can be identified which shape the nature of business demand into distinct workloads. Recurring types of business forces result in recurring workload patterns.

Architecture Patterns

Because these business patterns are themselves recurring, enterprise IT architecture that Because these business patterns are themselves recurring, enterprise IT architecture can be utilized to address these recurring business patterns because recurring business patterns frequently result in a recurring set of architectural requirements. It is believed that such systems and methods for interrelating business patterns and architecture patterns provide advantages previously unrealized by other systems and methodologies.

Because enterprise IT architecture can quickly become very complex, just as it is advantageous when endeavoring to fully describe a building or structure to utilize multiple viewpoints (e.g., an electrical plan, mechanical plan, etc.), so too is it advantageous in describing enterprise IT architecture to utilize multiple viewpoints. For example, enterprise IT architecture can be described from an information viewpoint (e.g., via a data model), a functional viewpoint (e.g., processing structure), a design viewpoint (e.g., engineering implementations), a deployment viewpoint (e.g., operations and management of architecture), and a technology viewpoint (e.g., platform standards/conventions). Preferably, these viewpoints are systematically synthesized into a single engineering ensemble of systems, storage, and networks. It is believed that such systems and methods for such systematic analysis provide advantages previously unrealized by other systems and methodologies.

A collection of requirements in accordance with one of these viewpoints driven by a business pattern represents an architecture pattern. Each viewpoint thus gives rise to a corresponding architecture pattern family (e.g., information, functional, deployment, technology, and design families). For example, a set of requirements regarding the information viewpoint can be described by an information pattern, while a set of requirements regarding the design viewpoint can be described by a design pattern. These architecture patterns describe enduring abstract patterns that are independent of any particular set of products or technology, and can be implemented differently as technology changes without altering the architecture pattern itself.

One or more aspects of the present invention relate to guiding a user in selecting better or more optimal operational platforms to run applications on. Preferably, this allows for performance improvement, waste reduction, throughput increase, and monetary savings. However, many IT practitioners feel that their applications are too unique to characterize using broad demand driven analysis, so there can be resistance to optimization techniques.

Most practitioners can now agree, though, that their applications, as unique as they are, can be characterized by decomposing them into sub-assemblies called patterns. Patterns have distinct operational behavior that manifests in specific resource consumption finger prints. These finger prints can be characterized by a set of detailed qualities that characterize consumption behavior and operational requirements. Preferably, these qualities are utilized to identify optimal infrastructure to run classes of applications on, removing the need to treat each application as a special case.

Thus, patterns can be described utilizing qualities, which represent categorical metrics, attributes, or constraints relating to the pattern. In general, patterns can be described in terms of a set of qualities called a quality profile. Specifically, the qualities of a business pattern, which are expressed in terms of business demand characteristics, can be described by a type of quality profile called a workload demand profile. The qualities of a workload pattern can be described by a different type of quality profile called a quality of experience (QoE) profile. The qualities of an architecture pattern can be described in a service profile. Since architecture patterns describe different viewpoints of enterprise architecture, different types of architecture patterns will have different content in their service profiles. Thus, information pattern service profiles will be different than design pattern service profiles. Similarly, different pattern families of the same architecture pattern may also have different content in their service profiles.

In one or more preferred implementations, architecture patterns are associated with known problems (described in more detail hereinbelow) related to implementations of those patterns. For example, such information might be stored in a knowledgebase.

Architecture Patterns—Information Patterns

Analyzing enterprise architecture from an information viewpoint allows for the use of several organizing principles. First, it is preferred that an information model be defined for all applications, as using the right information is key to business competitiveness. Further, it is preferred that a common vocabulary be utilized for all database and message elements, as this ensures that all applications speak the same language from a data perspective. Similarly, it is preferred that standard message formats are used in communications, as this is key to unlocking the sharing of application services and events. Still further, the sharing of transactional events between applications is preferred, as this unlocks cross business unit synergies. Lastly, it is preferable that defined information patterns for data representation, storage and access, and manipulation be utilized, as this unlocks reuse and minimizes design and maintenance efforts.

A first of these, information patterns for data representation relate, as their name implies, to how data is represented. Information patterns allow for the separation of user needs in viewing data from the complexity of source and format variation. This supports abstraction and promotes decoupling of divergent application needs.

Exemplary information patterns for data representation include a static representation pattern associated with common information that can be shared, such as, for example, a customer or product; a varying attributes pattern associated with common information that varies by business function, such as, for example, load data, which has attributes in common across business functions as well as attributes which vary by business function; a dynamic representation pattern associated with information that can be rendered only at a point in time, such as, for example, market data, trade transactions, and positions; a time series pattern associated with information that can be analyzed across time, that might, for example, be based on sample timing, an interval, and duration; and an unstructured data pattern associated with information that can be tagged and/or searched, that might, for example, be based on XML namespaces and/or tags.

Figure 9:
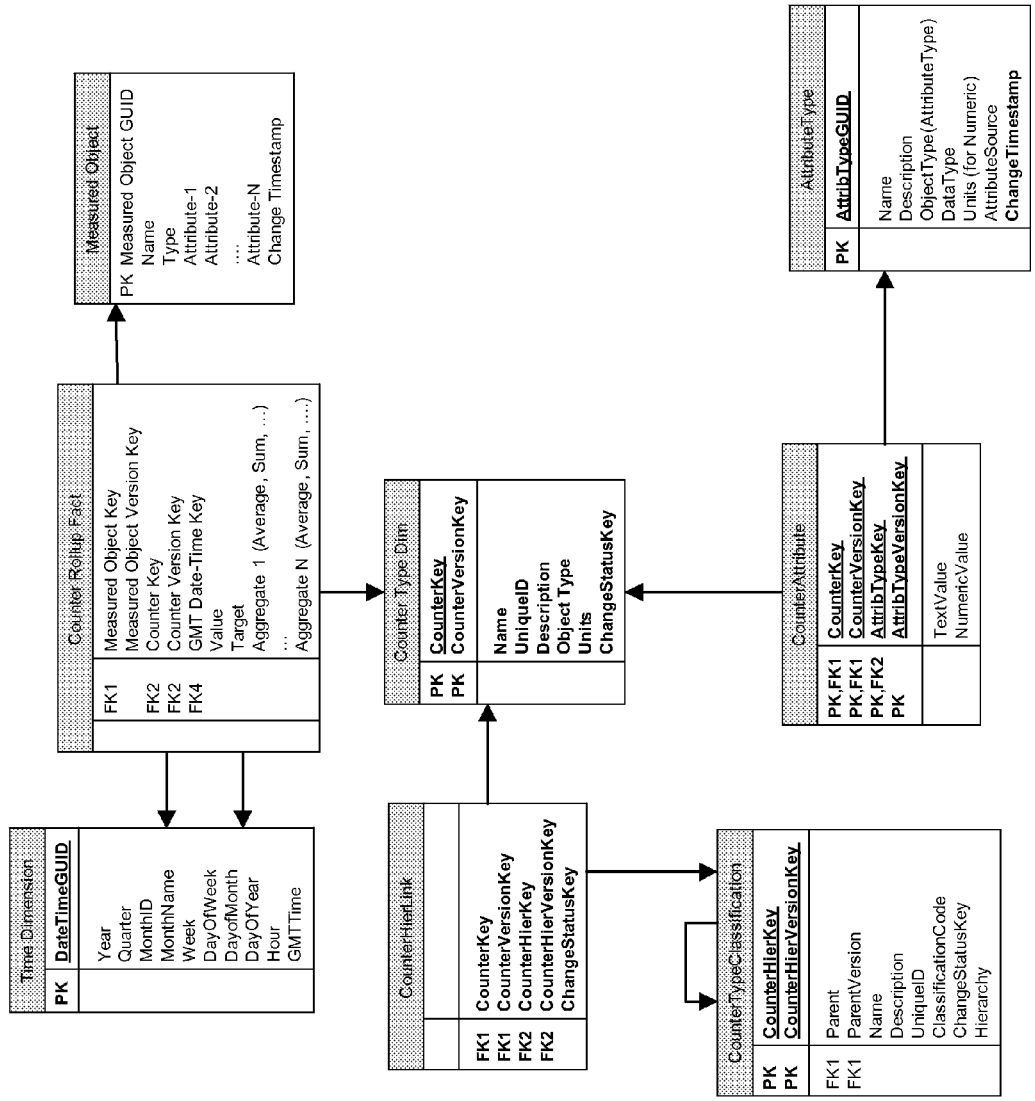
FIG. 9 illustrates a counter aggregation pattern.

A second group of information patterns, information patterns for data manipulation, can be further classified into various sub-families. A first of these is grouping patterns, such as, for example: summary aggregation type information patterns which calculate a sum, average, max or min, or similar aggregation value; or structural association type information patterns, which relate to an industry or sector the data is associated with. A second of these sub-families is utility patterns that encode rules needed for understanding data, which might be necessary for understanding information at a fundamental information level. Thus, information patterns for data manipulation might be used to define special calendar periods for data or functions operable on the data, such as defined aggregations or functions associated with the start and/or end of a period. For example, a counter aggregation pattern is an information pattern that is a member of the summary aggregation grouping pattern family. This pattern models measured values that are summarized across a time period, and might be applicable to any sales or operational metrics. FIG. 9 illustrates such a counter aggregation pattern.

Figure 10:
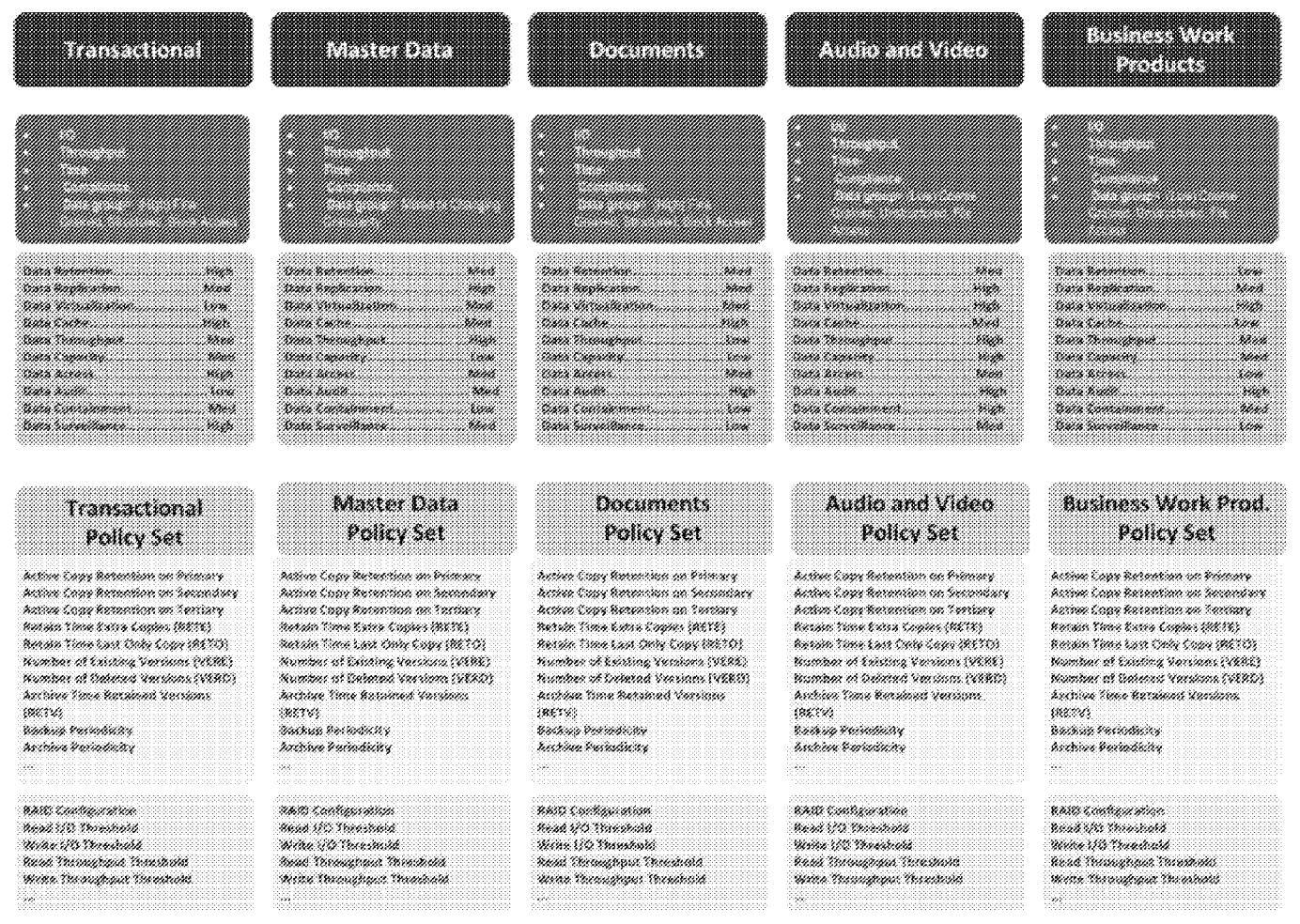

A third group of information patterns, information patterns for data storage and access (or data usage), can likewise be further classified into various sub-families. A first of these sub-families pertains to storage type patterns, such as, for example, storage type patterns for transactional data, master data, documents, audio and/or video, or business work products. A second of these sub-families pertains to policy set patterns, which define policies for accessing data securely and reliably. FIG. 10 illustrates exemplary information patterns for storage and access. For example, the first column of FIG. 10 provides properties for transactional data and a corresponding transactional policy set. Preferably, this policy set is manifested in operational rules that run against the data. These rules might be derived directly from predictable demand patterns as understood by typical patterns of usage. This preferably shapes how the infrastructure is configured.

Preferably, with respect to an information viewpoint, enterprise architecture design utilizes entity-relationship diagrams, data dictionaries, transaction matrices, data manipulation patterns, data storage patterns, and storage policy set patterns. It is believed that systems and methods incorporating data manipulation, data storage, and storage policy set patterns provide advantages previously unrealized by other systems and methodologies.

Turning to description of information patterns via qualities, a service profile for an information pattern in the data representation sub-family describes qualities relating to the semantic nature of information represented in the pattern. A service profile for an information pattern in the data manipulation sub-family describes qualities relating to the algorithmic nature of manipulating information within the pattern. A service profile for an information pattern in the data usage sub-family of information patterns describes policy sets for data access performance and security, which have profound implications for characterizing infrastructure consumption when synthesizing patterns into an engineered ensemble for configuration of IT infrastructure comprised of systems, networks, and storage.

In a preferred implementation, service profiles are implemented utilizing a two tier approach. A first tier of policy set qualities are used to organize high level policy attributes. With respect to a service profile for an information pattern in the data usage family, first tier policy qualities might include a data group quality (answering the question "What type of data is this?"), an I/O quality (answering the question "What does I/O rate look like?"), a throughput quality (answering the question "What does I/O throughput look like?"), a time quality (answering the question "How much delay in getting to the data is tolerable?"), a compliance quality (answering the question "How tightly controlled does access to data have to be?"), and a data retention quality (answering the question "How long does data need to be retained?" with either short term, which corresponds to a "low" retention value, near-term, which corresponds to a "med" retention value, or long-term, which correspond to a "high" retention value.

A second tier of a service profile corresponds to detailed policy attributes. Returning to the above example, the first tier data retention quality can be elaborated with more detailed policy attributes for active copy retention on primary, active copy retention on secondary, active copy retention on tertiary, retain time extra copies (RETE), retain time last only copy (RETO), number of existing versions (VERE), number of deleted versions (VERD), archive time retained versions (RETV), backup periodicity, and archive periodicity. Preferably, this concept of tiered qualities guides a systematic method of configuration choices for ensembles.

Architecture Patterns—Functional Patterns

A second point of view to utilize to analyze enterprise architecture is a functional viewpoint that describes the nature of computation to be performed. As with the information viewpoint, analyzing enterprise architecture from a functional viewpoint allows for the use of several organizing principles.

First, it is preferable to maximize the macro-level re-use of common business services, for example because this accelerates the delivery of new services to business users. Similarly, it is preferable to maximize the micro-level re-use of infrastructure services and components, as this eliminates unnecessary cost while avoiding constant re-invention of the wheel. Separation of data, data manipulation, data representation, and data presentation is desirable as this minimizes sustaining costs while enabling the ability to provide a common look and feel between applications. Likewise, use of a common messaging API is preferable to unlock sharing of application services and events. Finally, functional decomposition down to smallest units of work is desirable. This is preferably accomplished via use of functional patterns organized by scale and scope that describe the structure of processing required to implement a business pattern. Use of these functional patterns enables sufficient understanding of scalability, concurrency, and performance so as to allow for the automation of systematic methods of ensemble configuration. It is believed that such use of functional patterns provides advantages previously unrealized by other systems and methodologies.

Functional patterns always have a static rendition and acquire a dynamic rendition only when mapped onto an adaptive infrastructure ensemble (described hereinbelow).

IT for meeting the needs of a business value chain can be characterized as an IT supply chain (ITSC), or digital supply chain (DSC). Functional patterns are organized by a scale of the pattern based on how much of an IT supply chain it affects. An enterprise functional pattern crosses links in the IT supply chain, while a business function functional pattern applies to an entire link in the IT supply chain. Similarly, a cross business activity functional pattern crosses business activities within a business function, while a sub-activity functional pattern is used to implement a single business activity. Lastly, a solution functional pattern is a stock solution pattern for common applications or infrastructure.

Figure 11:
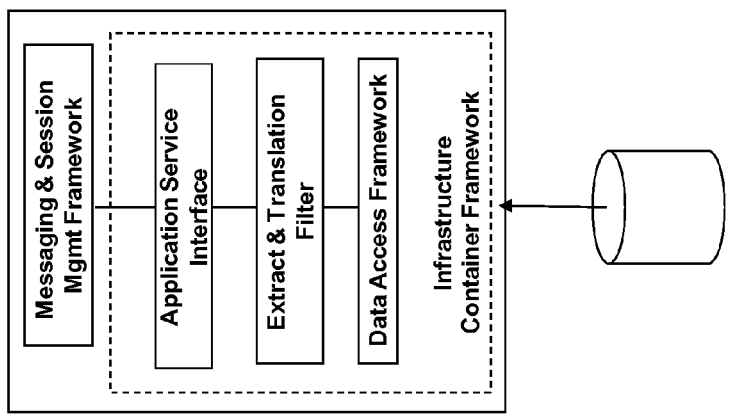
FIGS. 11-12 illustrate exemplary functional patterns.
Figure 12:
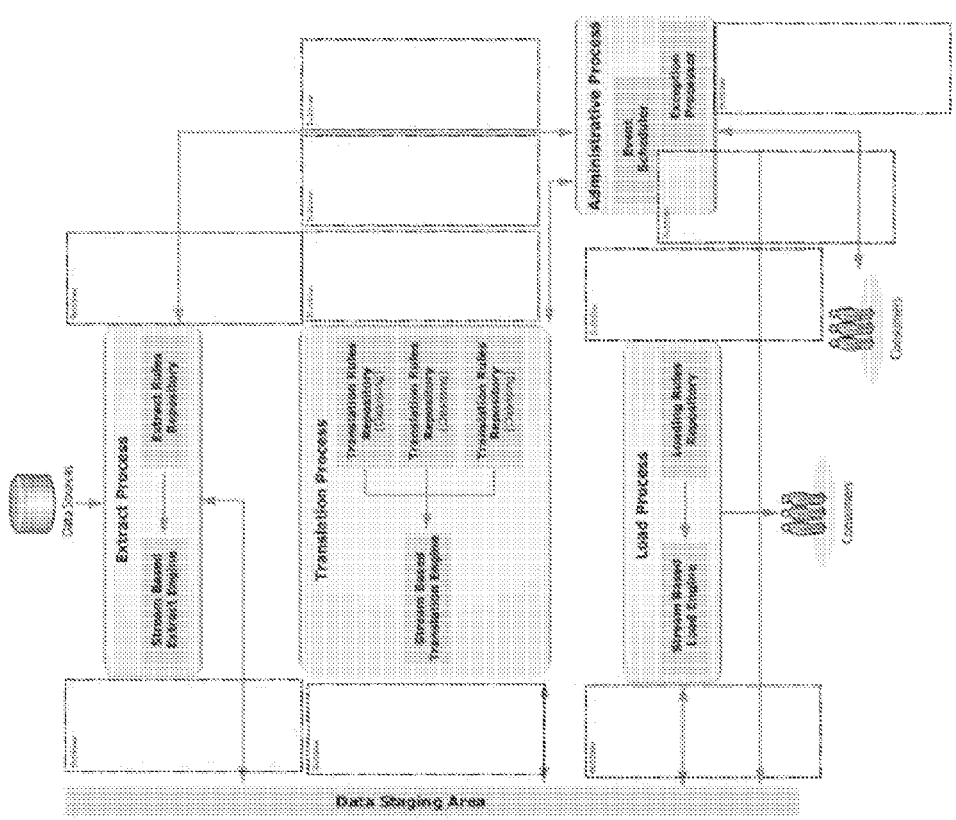

FIG. 11 illustrates an exemplary functional pattern which is a sub-activity scale pattern that utilizes a filter design pattern (as described hereinbelow) in combination with messaging and data access frameworks. FIG. 12 illustrates a second exemplary functional pattern which is an extract, translate and load pattern that is business function wide in scale.

Figure 13:
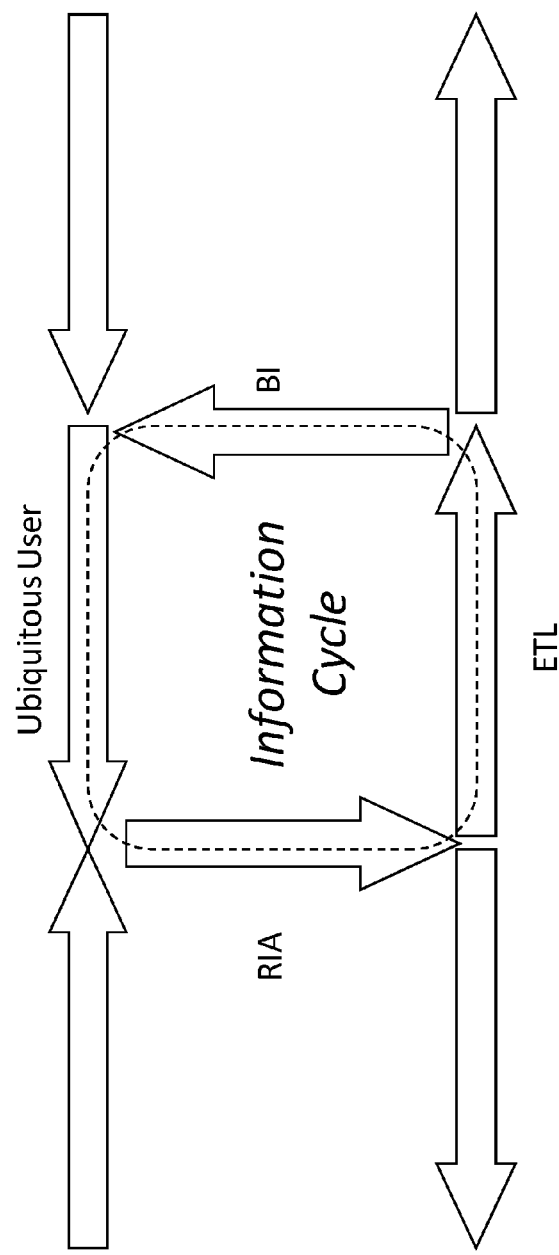
FIG. 13 illustrates the mapping of several application patterns onto links in an IT supply chain.

One special type of functional patterns is application patterns. Although, typically, multiple functional patterns are needed to define an application, application patterns are large scale functional patterns that can be utilized to define a complete application within a single pattern. Application patterns often dominate an entire leg in an IT supply chain. Exemplary application patterns might include a ubiquitous user pattern, a rich internet application pattern, an extract, translate, and load pattern, a business intelligence pattern, and an electronic mail pattern. FIG. 13 illustrates the mapping of several of these application patterns onto links in an IT supply chain.

Preferably, with respect to a functional viewpoint, enterprise architecture design utilizes UML class diagrams, sequence diagrams, a logical service BUS, client frameworks, application services, and scale-appropriate functional patterns.

Turning to description of functional patterns via qualities, a service profile for a functional pattern describes the allocation and resource demand of each of the elements that comprises the pattern. For example, the service profile preferably takes into consideration how a unit of work is dispersed among each element.

The qualities in a service profile applied to each element in a functional pattern are workload resource consumption (e.g., CPU, I/O, memory, storage occupancy and variability), workload allocation related (e.g., parallel or serial dispersion of workload), or peak period related (e.g., number of concurrent users, throughput load, and transaction load).

FIG. 14 illustrates an exemplary service profile detailing peak period related qualities for rich internet application, business intelligence, and extract, translate, load functional patterns.

FIG. 15 illustrates an exemplary service profile showing resource consumption qualities of each element of a rich internet application functional pattern. FIG. 16 similarly is an exemplary service profile showing workload allocation qualities of each element of a business intelligence functional pattern. Specifically, the allocation of resource impact per unit of work onto each functional component is described by workload allocation qualities. Notably, workload allocation qualities are often closely related to the graphical layout of the pattern. A quality can be characterized as serial if workload is the same for all elements of a functional pattern, or as parallel if workload is divided among the elements.

Architecture Patterns—Design Patterns

A third point of view to utilize to analyze enterprise architecture is a design viewpoint. As with the information and functional viewpoints, analyzing enterprise architecture from a design viewpoint allows for the use of re-usable patterns, which, in this case, are design patterns. Design patterns represent re-usable techniques that find common use in an industry.

It is preferable to maximize the re-use of common techniques via the use of design patterns. Similarly, it is preferable to separate implementation from higher level function. It is also preferred to expose major components and interrelationships, but not overly constrain implementation. Likewise, it is preferable that modularity, information hiding, and information coupling be utilized, and design scale be kept in mind.

Preferably, design patterns are utilized to facilitate the engineering of applications, software frameworks, and functional patterns. Similarly to functional patterns, design patterns are subject to scale and scope along the same scales as functional patterns. That is, an enterprise design pattern crosses links in the IT supply chain, while a business function design pattern applies to an entire link in the IT supply chain. Similarly, a cross business activity design pattern crosses business activities within a business function, while a sub-activity design pattern is used to implement a single business activity. Lastly, a solution design pattern is a stock solution pattern for common applications or infrastructure.

Some design patterns might be on the scale of a single element or module. For example, various factory design patterns, structural design patterns, and behavioral design patterns might be on such a scale. Exemplary factory design patterns that could be on the scale of an element or module include a builder design pattern, a prototype design pattern, and a singleton design pattern. Exemplary structural design patterns that could be on the scale of an element or module include an adaptor design pattern, a bridge design pattern, a composite design pattern, a decorator design pattern, a façade design pattern, a flyweight design pattern, and a proxy design pattern. Exemplary behavioral design patterns that could be on the scale of an element or module include a command design pattern, an interpreter design pattern, an iterator design pattern, a mediator design pattern, an observer design pattern, a state design pattern, a visitor design pattern, and a model view controller design pattern.

While design patterns may represent reusable code, the act of running such reusable code causes infrastructure consumption. Thus, design patterns can provide insight into how applications are organized and thus how quality profiles can be defined.

Figure 17:
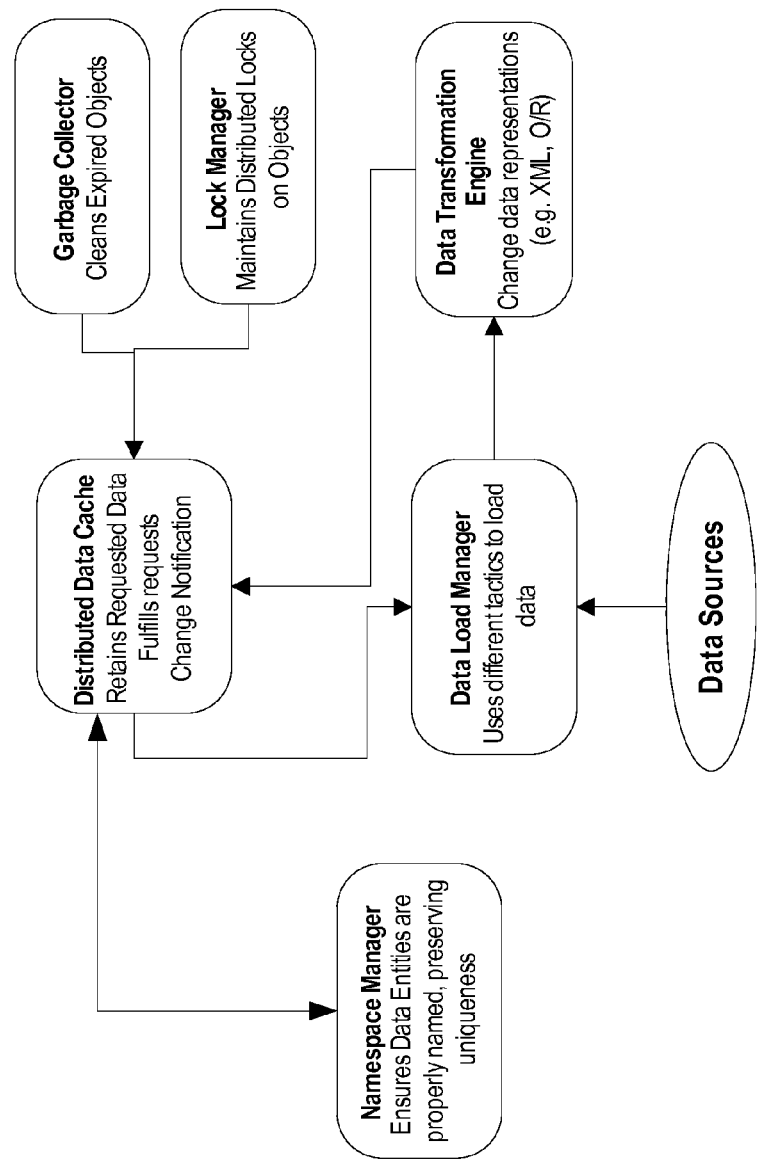
FIG. 17 illustrates an exemplary distributed data cache design pattern.

FIG. 17 illustrates an exemplary distributed data cache design pattern that can be used to maintain a shared state between multiple instances of a processing entity. This design pattern is an application scale design pattern in that it is intended to be utilized on an application-scale across subsystems.

Turning to description of design patterns via qualities, a service profile for a design pattern describes characteristics and tradeoffs of the pattern. Qualities for design pattern service profiles can be grouped into general categories of performance, design, and adaptation. The use of qualities for organization for the purpose of predicting the performance of engineered ensembles which embody them enables the realization of systematic and automated methods of configuring such ensembles. It is believed that such use provides advantages previously unrealized by other systems and methodologies.

Performance might include the qualities of efficiency (e.g., the effectiveness of communications/processing/storage), integrity (e.g., accessibility), reliability (which might include sub-properties for accuracy, anomaly management, and simplicity), survivability (which might include sub-properties for autonomy, distributiveness, modularity, reconfigurability, and anomaly management), and usability (e.g., operability training).

Design might include the qualities of correctness (which might include sub-properties for completeness, consistency, and traceability), maintainability (which might include sub-properties for modularity, consistency, simplicity, self-descriptiveness, and visibility), verifiability (which might include sub-properties for modularity, self-descriptiveness, simplicity, and visibility).

Adaptation might include expandability (which might include sub-properties for modularity, self-descriptiveness, simplicity, augmentability, generality, and virtuality), flexibility (which might include sub-properties for modularity, self-descriptiveness, simplicity, augmentability, and generality), interoperability (which might include sub-properties for modularity, commonality, functional overlap, system compatibility, and independence), portability (which might include sub-properties for independence, modularity, and self-descriptiveness), and reusability (which might include sub-properties for modularity, self-descriptiveness, simplicity, generality, generality, independence, application independence, document accessibility, functional scope, and system clarity).

Many of these have direct implications for how infrastructure is chosen and configured, including a variety of service capabilities and management capabilities that need to be added and run in conjunction with essential functions of an application.

Architecture Patterns—Deployment Patterns

Another point of view to utilize to analyze enterprise architecture is a deployment viewpoint. As with other viewpoints, analyzing enterprise architecture from a deployment viewpoint allows for the use of several organizing principles.

First, it is preferable that client services be deployed separately from application services, as this allows for multiple client types across applications while still promoting the re-usability of application services. Preferably, all services are deployed on a virtualized platform, as this lowers provisioning costs by maximizing application transportability. Notably, this does not imply that virtual machines are the only potential solution, as the use of virtual service pools to provide alternative virtualization at the application layer is also preferred.

Preferably, common instrumentation and a common management framework are utilized, as this simplifies troubleshooting and promotes consistency of operations. Further, data is preferably placed close to where it is used so as to minimize latency in accessing information. Best practices preferably include the use of application manifests and system maps.

As with the other viewpoints, analyzing enterprise architecture from a deployment viewpoint allows for the use of re-usable patterns, which, in this case, are deployment patterns, which are used to characterize different types of distribution and deployment architectures.

Deployment patterns can be grouped into several families, including patterns for high availability tactics, patterns for offload tactics, client/server patterns, and patterns for enterprise application integration tactics.

Patterns for high availability might include, for example, a single instance pattern (notably, use of a single instance pattern by itself likely implies that there is little concern for high availability; however, single instance patterns can be composed in a variety of arrangements to create high availability patterns that can achieve very high availability targets), a proxy server pattern, an appliance pattern, a high availability cluster pattern, a tight-processor array pattern, a computational grid pattern, and an application service virtualization/service pool pattern. Patterns for offloading might include, for example, a pattern for desktop virtualization, a pattern for server operating system virtualization, a pattern for data virtualization, a pattern for network virtualization, a pattern for front-end processor virtualization, and a pattern for back-end processor virtualization. Patterns for enterprise application integration might include, for example, a pattern for a service bus, a hub and spoke pattern, a pull pattern, and a push pattern. Client/server patterns might include, for example, a 2-tier client/server pattern, a 3-tier client/server pattern, a proxy server pattern, a remote proxy pattern, and a reverse proxy pattern.

Figure 18:
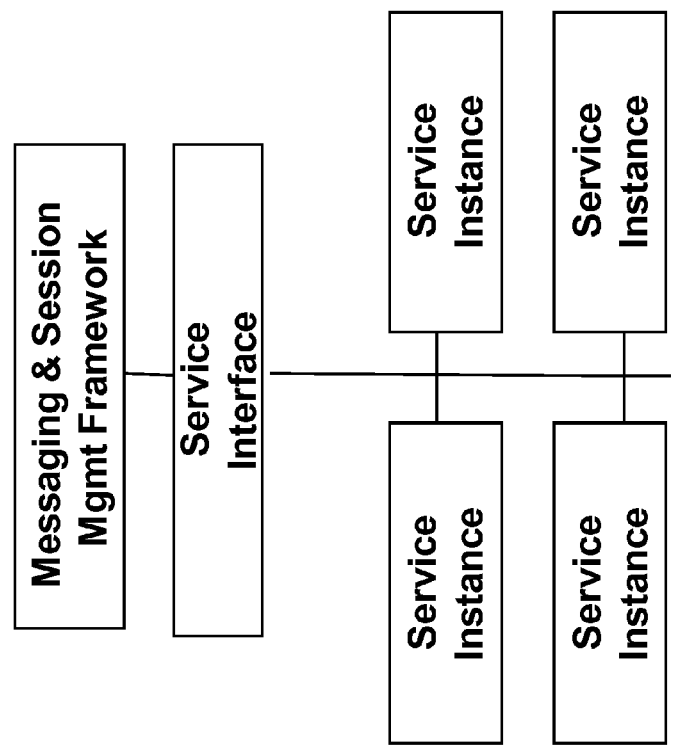
FIG. 18 illustrates an exemplary deployment pattern.

FIG. 18 illustrates an exemplary deployment pattern. Specifically, FIG. 18 illustrates an application service virtualization deployment pattern. In accordance with this pattern, a service is replicated onto multiple servers within a pool as multiple instances, with each instance being active. A service interface provides service registration so that the service can be located once it is started. A load balancer is utilized to select the most appropriate instance for service when the service is needed, thus the service location can be characterized as dynamic. This strategy is appropriate for stateless services that require high scalability and high reliability, such as, for example, reference data servers or a computational grid.

Figure 19:
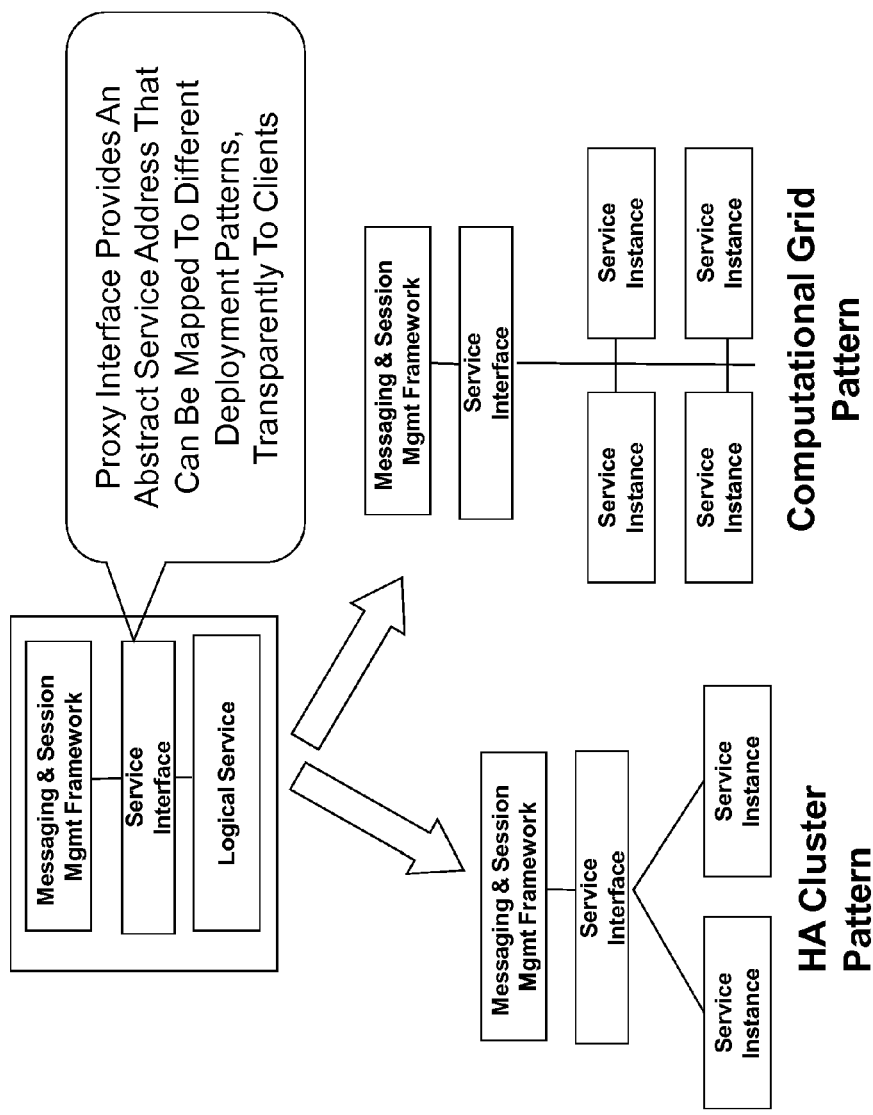
FIG. 19 illustrates an exemplary proxy server pattern.

FIG. 19 illustrates another exemplary pattern, a proxy server pattern. The proxy server pattern includes a proxy interface that provides an abstract service address that can be mapped to different deployment patterns transparently to clients. FIG. 19 illustrates how this service address could be mapped to utilize a high availability cluster pattern or a computational grid pattern.

Figure 20:
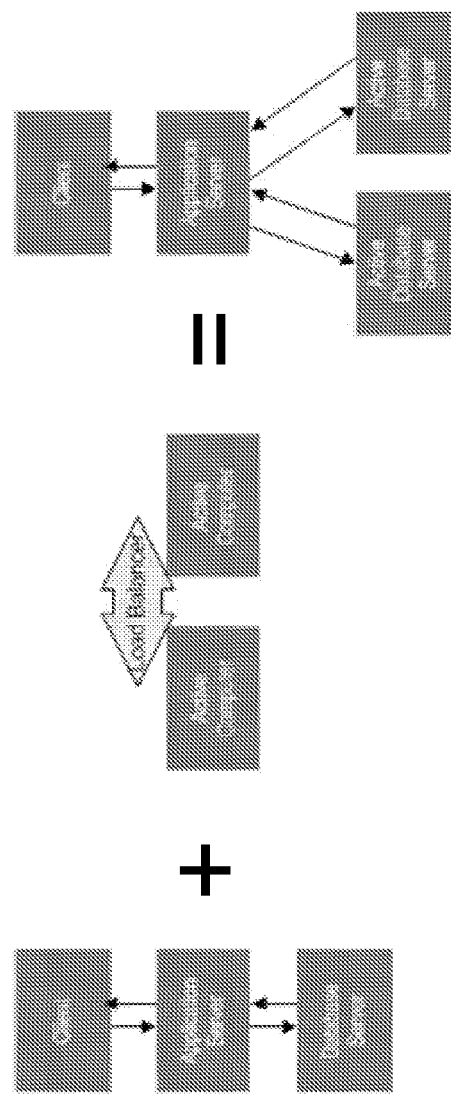
FIG. 20 illustrates how replacing a database server element in a three tier client/server pattern with a Hot high availability pattern results in a three tier client/server pattern that includes a Hot high availability database server.

The proceeding deployment patterns are atomic but do not have to be utilized in isolation, instead they can be combined together to compose new and more complex deployment patterns in a manner similar to atoms being combined to form complex molecules in chemistry. Notably, a new deployment pattern composed of two constituent patterns would inherit the characteristics of the constituent patterns. A new pattern can be composed by replacing an element in a first pattern with a second pattern. For example, with reference to FIG. 20, replacing the database server element in the illustrated three tier client/server pattern with the illustrated Hot high availability pattern results in a three tier client/server pattern that includes a Hot high availability database server, as illustrated. Notably, where deployment patterns are aggregated, the potential known problems associated with the constituent patterns are aggregated as well, i.e., the known problems for the newly formed deployment pattern represents a union of known problems for the constituent patterns.

Deployment patterns can be used to support the deployment of one or more functional patterns. Sometimes, one or more functional patterns will be deployed onto one or more deployment patterns. For example, elements of a rich internet application functional pattern (which may include, for example, ten elements) can be deployed onto the three elements of a three tier client/server deployment pattern. This is the basis for an application manifest that will determine how functionality is to be deployed when systematically configuring one or more ensembles to ultimately execute the deployment.

Elements in a deployment can be replicated in order to accommodate a greater workload volume. For example, a three tier client/server pattern might require several application server instances in order to accommodate greater workload volume. Notably, larger functional patterns might require multiple instances of a single deployment pattern, and/or a combination of different deployment patterns.

The functional pattern that is to be executed on a deployment pattern determines a "shape" of a service profile and is closely related to a corresponding workload profile because it characterizes how resources will be consumed by the elements in the deployment pattern. For example, a numerical processor pattern is compute intensive, and if this were deployed onto a computational grid deployment pattern would be reflected in the service profile of the servers in that pattern as being compute resource intensive.

Turning to description of deployment patterns via qualities, a service profile for a deployment pattern expresses key requirements for a deployment pattern to work optimally and for how the pattern should degrade in the presence of overload or failure. Preferably, each element is characterized in a similar way as with functional patterns described hereinabove. The service profile of a deployment pattern captures these service qualities, and combined with the volume of workload from a workload pattern (described in more detail hereinbelow) enables the appropriate systematic sizing of configured ensembles.

Service profile qualities for a deployment pattern might be workload operating related (e.g., interrupt tolerance, low latency, and unit of work size), element interrelationship related (e.g., concurrency, collaboration, and proximity), or tradeoff related (e.g., quality priority, stringency, conflict resolution). Preferably, full characterization of the service profile for a deployment pattern is performed after associating elements of a functional pattern to elements of a deployment pattern.

Architecture Patterns—Technology Patterns

Another point of view to utilize to analyze enterprise architecture is a technology viewpoint. As with other viewpoints, analyzing enterprise architecture from a technology viewpoint allows for the use of several organizing principles.

First, it is preferable to define standardized technology usage, as this reduces the cost of support and operation. Further, open standards are preferable as compared to proprietary technologies, as this reduces the risk of being locked into a single vendor. Similarly, it is preferable to dual-source technology vendors, so as to reduce the risk of vendor failure or lock-in.

As with the other viewpoints, analyzing enterprise architecture from a technology viewpoint allows for the use of re-usable patterns, which, in this case, are technology patterns. Technology patterns can be used to define standard technology stacks that can be deployed within the design of an ensemble (described in more detail hereinbelow) for service deployment, or to define the infrastructure components of an ensemble. Technology patterns can also be used to define management elements of a processing execution destination (PED; described in more detail hereinbelow). Technology patterns can be further used to define technology employed within a deployment pattern. Additionally, technology patterns can be used to define virtualization and provisioning strategies.

Still further, technology patterns can be utilized for policy management in various contexts. For example, technology patterns could be utilized for security policy management (e.g., Policy Execution Point, Policy Decision Point, Policy Administration Point), or network policy management (e.g., manager/agent management or agentless management).

As noted above, a technology pattern can be used to define technology used within a deployment pattern. Notably, technology patterns are not deployment patterns as they do not govern how services are deployed or distributed. Instead, they simply define technology for managing and supporting deployed services. These definitions of technology are preferably expressed as generic technical capabilities which are independent of the actual products that realize the capability (for example, a technology pattern might require the generic capability of a web server, which in a preferred embodiment, could later be associated to a specific product such as Apache or Microsoft IIS only at the time that it becomes necessary to configure the ensemble).

For example, an integrated monitoring pattern can be used to define technology used within a common monitoring deployment pattern, in accordance with FIG. 22. Note that the common monitoring pattern is a deployment pattern because it defines how monitoring is distributed independently of the monitoring depth defined by the integrated monitoring technology pattern.

Figure 23:
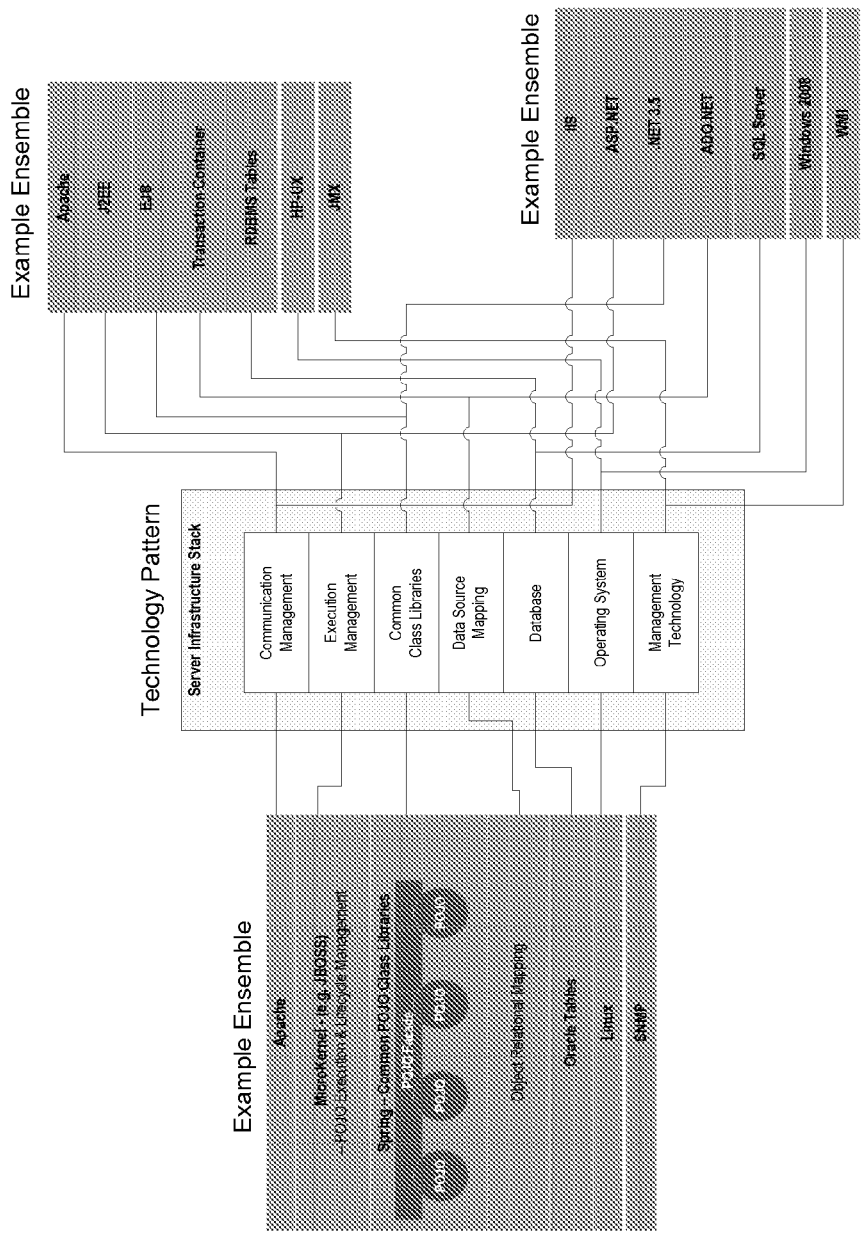
FIG. 23 illustrates an exemplary server infrastructure stack technology pattern and exemplary ensembles that can be realized therefrom by assignment of specific technologies.

A generic, or abstract, manifest for an ensemble (described in more detail hereinbelow) is a type of technology pattern, because only when specific technologies are assigned is the ensemble fully realized. Prior to that, the abstract manifest is a technology pattern. FIG. 23 illustrates an exemplary server infrastructure stack technology pattern and exemplary ensembles that can be realized therefrom by assignment of specific technologies.

Figure 24:
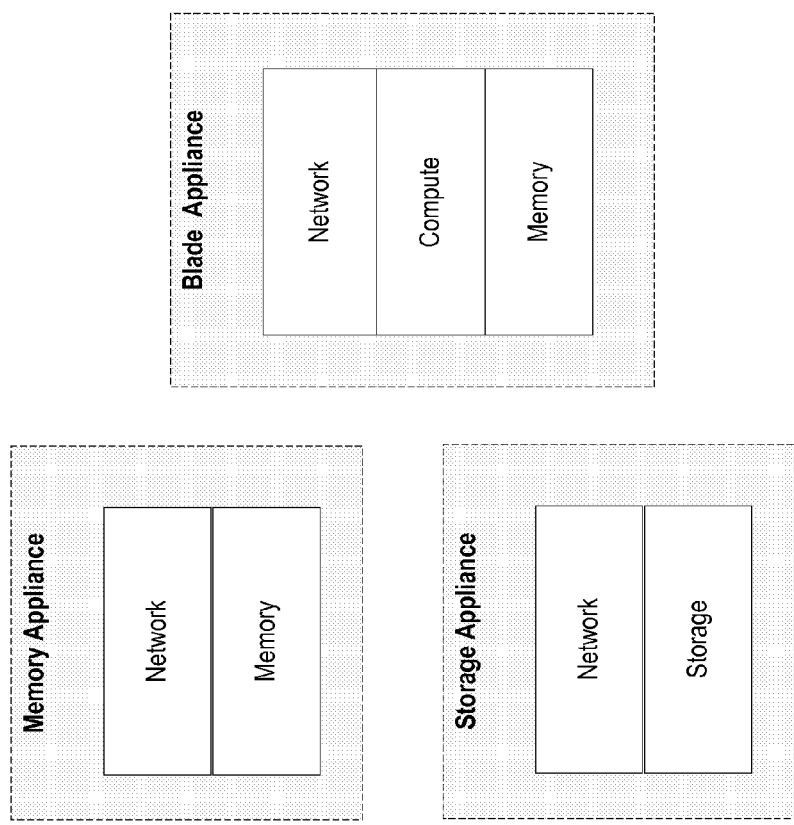
FIG. 24 illustrates an exemplary technology pattern for describing a generic manifest for a processing execution destination.

Similarly, a generic manifest for a processing execution destination (PED) can be described by a technology pattern. FIG. 24 illustrates such an exemplary technology pattern showing types of appliances to be utilized.

Figure 25:
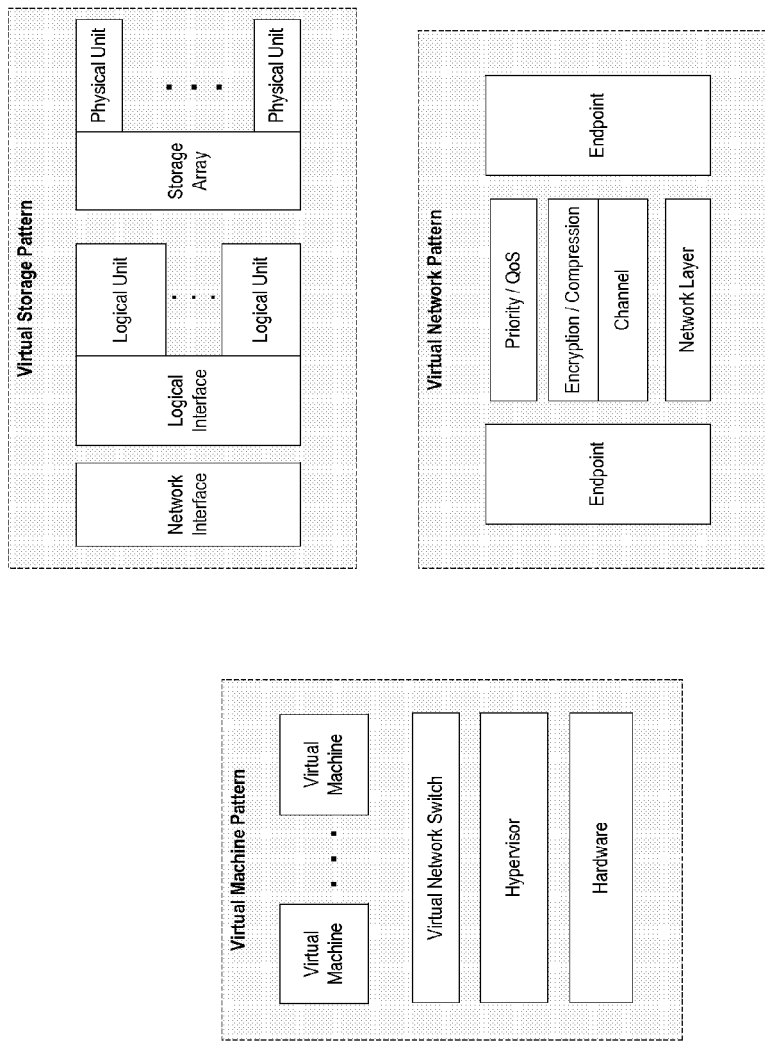
FIG. 25 illustrates exemplary virtualization technology patterns.

As noted above, technology patterns can also be utilized for virtualization. Specifically, although service virtualization is preferably addressed by deployment patterns, technology patterns can be utilized for resource virtualization. A virtualization family of technology patterns can be utilized to define elements of a processing execution destination. FIG. 25 illustrates exemplary virtualization technology patterns.

Figure 26:
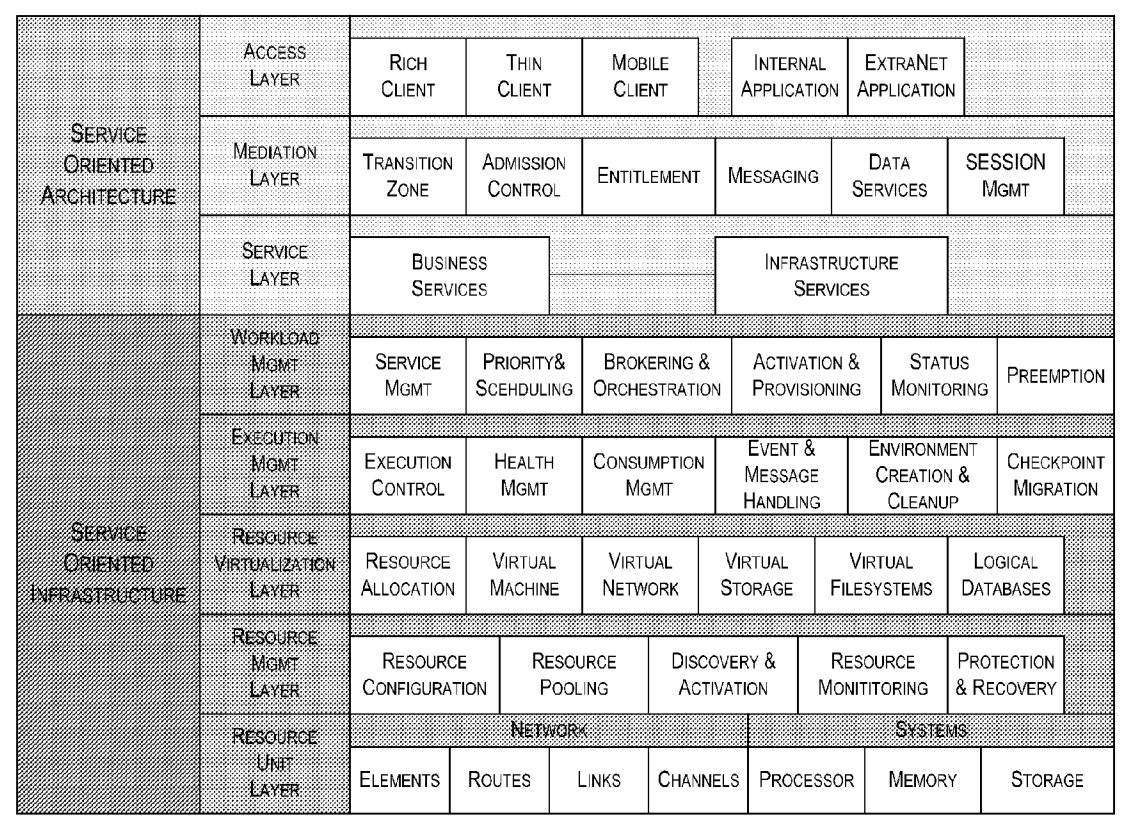
Figure 27:
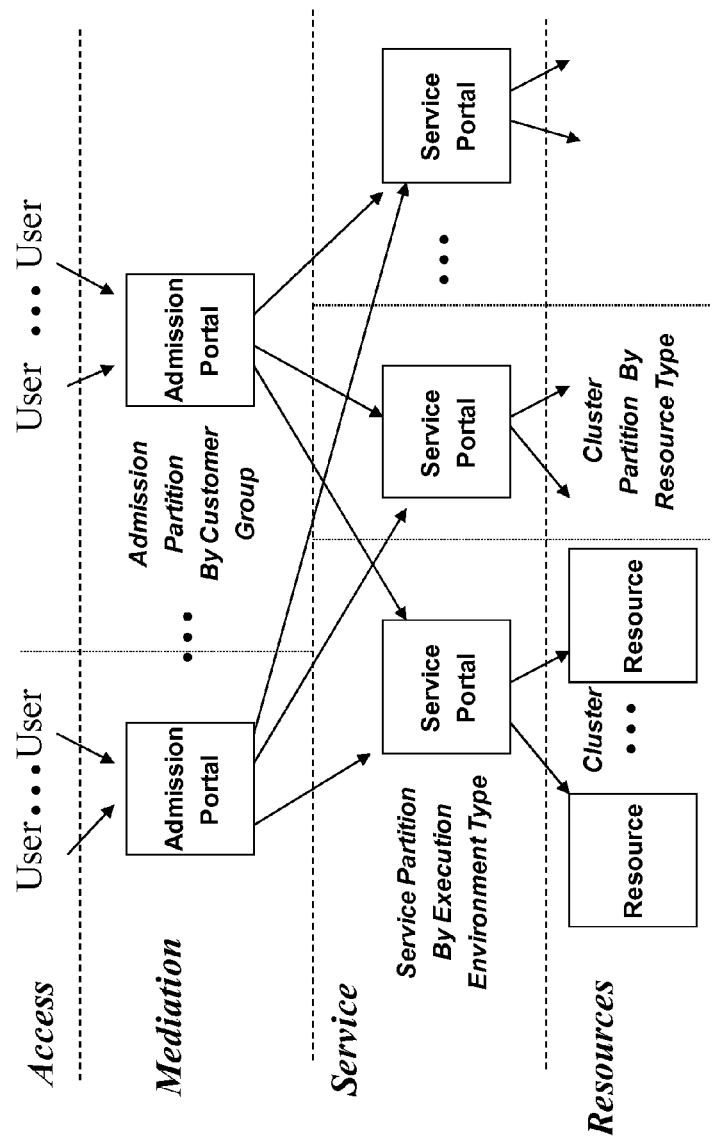
FIG. 27 illustrates the use of an enterprise stack to guide service oriented infrastructure architecture.

A technology pattern can even be used to describe the end to end characteristics of an entire enterprise architecture, as illustrated in FIG. 26. FIG. 27 illustrates the use of an enterprise stack to guide service oriented infrastructure architecture.

Turning to description of technology patterns via qualities, a service profile for a technology pattern for processing execution management, i.e., a technology pattern that describes a generic manifest for a processing execution destination, might define security policies used to control policy decision points, monitoring policies used to control network and system monitoring, and provisioning policies used to control thin provisioning and bare metal provisioning. On the other hand, a service profile for a technology pattern that defines a generic manifest for an ensemble might define generic technical capabilities for that generic ensemble.

Ensembles

Various architectural patterns have been described hereinabove. These architectural patterns can be characterized as being idealized, e.g., they have not been implemented and do not include any specific technology. Indeed, it is because these architectural patterns are idealized, and thus technology independent, that they have enduring value in the face of rapidly changing technology.

A realized implementation of an architectural pattern is an ensemble. In use, an ensemble is part of an application subsystem that, either alone or in combination, executes a business application.

Ensembles can be characterized as realized because, in contrast to architecture patterns, ensembles utilize real products and technologies to implement patterns. In other words, if a "pattern" is described utilizing one or more specific product names, then it is not a pattern that is being described, but rather an ensemble.

Because architectural patterns are technology independent, the same architectural pattern can be realized via different ensembles depending on constraints to be met. The qualities of the pattern and specifically the set of qualities that comprise the service profile is used in a preferred embodiment to automatically guide the selection of technology and configuration of the ensemble. Unlike architectural patterns, which have enduring value, ensembles depreciate in value over time, if not maintained, as technology improves. New ensembles can be created to remediate problems not solved by older ensembles.

Ensembles provide a way to efficiently package standard "line-ups" to provide known capabilities in a re-usable package, thereby promoting re-use and minimizing sprawl caused by many unnecessary variations serving the same pattern.

Different types of ensembles can be utilized for this purpose, such as, for example, server ensembles, storage ensembles, and network ensembles.

Ensembles are comprised of components, such as, for example, management components, technology stacks, and software frameworks. Any re-usable component that provides a distinct technical capability can be employed by an ensemble. Ensembles can contain any combination of re-usable components, and may contain a single component or multiple components. Ensembles can be realized utilizing third party software products or internal IT software products.

Some components are inline with workload processing, while others are infrastructure-based and do not directly participate inline with the workload. For example, a distributed cache framework is a re-usable component that is inline, while a policy decision point is a re-usable component that does not directly participate inline but is engaged by a security framework to support a workload.

Examples of types of re-usable components include a service oriented architecture service and a re-usable software framework. Exemplary components include a message processor (e.g., an enterprise service bus such as a Cisco Ace XML gateway), and an entitlement service.

Components can represent an implementation of an architecture pattern (or an element thereof), i.e., architectural patterns can be realized as components depending on the technology involved.

For example, a data model is a realized component that implements an information pattern. Data models are employed by application specific software that makes up part of an application subsystem that executes a business application (as described above, an ensemble is part of an application subsystem that, either alone or in combination, executes a business application). Specifically, data models define data and messages that are processed by application subsystems.

Figure 28:
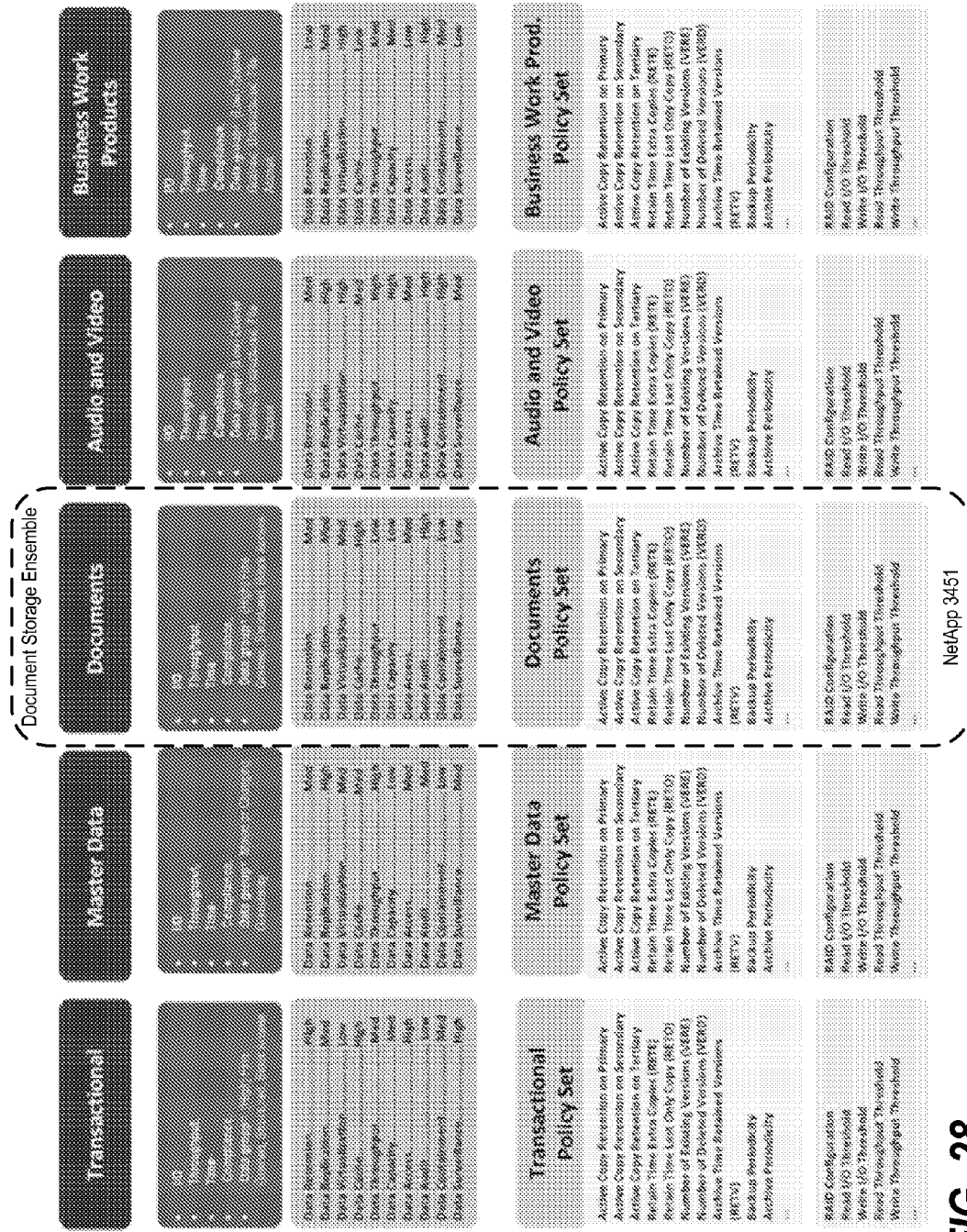
FIG. 28 illustrates an exemplary document storage ensemble.

Information patterns for storage and access can be implemented in a storage ensemble. For example, the combination of a realized component for an information storage pattern and a policy set for that storage pattern creates a storage ensemble. FIG. 28 illustrates a document storage ensemble thusly formed.

Figure 29:
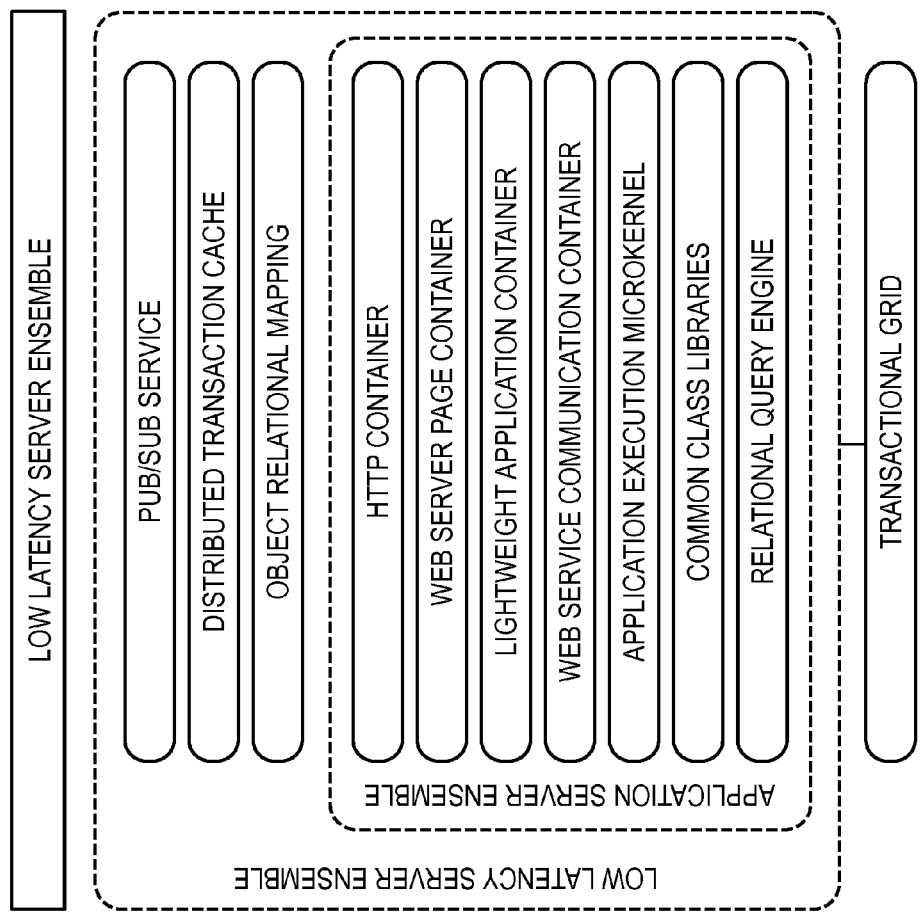
FIG. 29 illustrates an exemplary low latency server ensemble.

Similarly, functional patterns can be implemented in a server ensemble. Server ensembles provision the service layer in the enterprise stack. Each server ensemble assembles a set of technical capabilities that are fit for purpose. Exemplary service ensembles include, for example, a data processing server, a web application server, a report processing server, a numerical processing server, a low latency server, a complex transaction server, a workflow integration server, and a content collaboration server. FIG. 29 illustrates an exemplary low latency server ensemble.

Alternatively, an ensemble can employ one or more dynamic frameworks, which are realized components that implement a functional pattern. Dynamic frameworks are executable on one or more execution environments of a processing execution destination (described hereinbelow).

A dynamic framework can include one or more reusable components that represent an implementation of a design pattern. For example, a reusable service component might process data and messages as part of a dynamic framework that is employed by an ensemble that is part of an application subsystem executed by a business application.

Further, a dynamic framework can employ one or more infrastructure components. An infrastructure component represents an implementation of a deployment pattern. For example, a dynamic framework might employ a management infrastructure component which manages reusable components that are part of the dynamic framework.

Deployment patterns can be implemented in a network ensemble. The topology of a deployment pattern has a direct effect on the way in which the underlying network is to be configured. A network ensemble's configuration profile defines the packaging of a network configuration might specify, for example, IP address assignment (e.g., must be within a common subnet), VLAN usage (e.g., must be within the same VLAN), quality of service characteristics (e.g., low latency tag), and gateway requirement/treatment (e.g., multi-protocol label switching tagging).

Each dynamic framework is compatible with one or more technology stacks. A technology stack implements a type of technology pattern. Specifically, selecting management technologies for a technology pattern results in a technology stack. This provides for considerable flexibility in configuring products to implement the technology stack. For example, an authentication technology pattern comprising "directory service+directory access+identification" could be realized using Microsoft products as "AD+LDAP+Windows ID". Similarly, a platform technology pattern comprising "hardware+operating system+virtualization layer" could be realized in one ensemble as "Intel+Linux+VM Ware" and in another ensemble as "AMD+Windows+XEND", and a communications technology pattern comprising "session+presentation+RPC" could be realized in one ensemble as "HTTP+XML+SOAP", and in another ensemble as "IIOP+Java Object Serialization+RMI". FIG. 29 illustrates an exemplary technology stack. Specifically, FIG. 30 illustrates an integrated monitoring technology pattern realized as a technology stack via real products.

Just as qualities of an architecture pattern can be described by a service profile, attributes of an ensemble can be described by a configuration profile. A configuration profile for an ensemble defines the product realization for each generic capability in an ensemble, as well as the product configuration for each product used. A configuration profile for an ensemble further identifies any constraints on the configuration. For example, these constraints might be compatibility related. Additionally, a configuration profile for an ensemble identifies minimum resource requirements for that ensemble absent considerations of workload volume.

The configuration profile for an ensemble effectively defines the manifest for configuring that realized ensemble. Different types of ensembles give rise to different types of configuration profiles, i.e., the configuration profile for a storage ensemble is different from the configuration profile for a server ensemble. There also may be differences in the configuration profiles for different ensembles of the same type, e.g., there may be configuration profile differences between different server ensembles.

As an example of configuration profile establishment, it is helpful to revisit FIG. 28, which illustrates a storage ensemble comprising a realized component for an informational storage pattern and a policy set for that storage pattern. These policy set attributes and storage pattern qualities can be utilized to establish a configuration profile for the ensemble.

Figure 31:
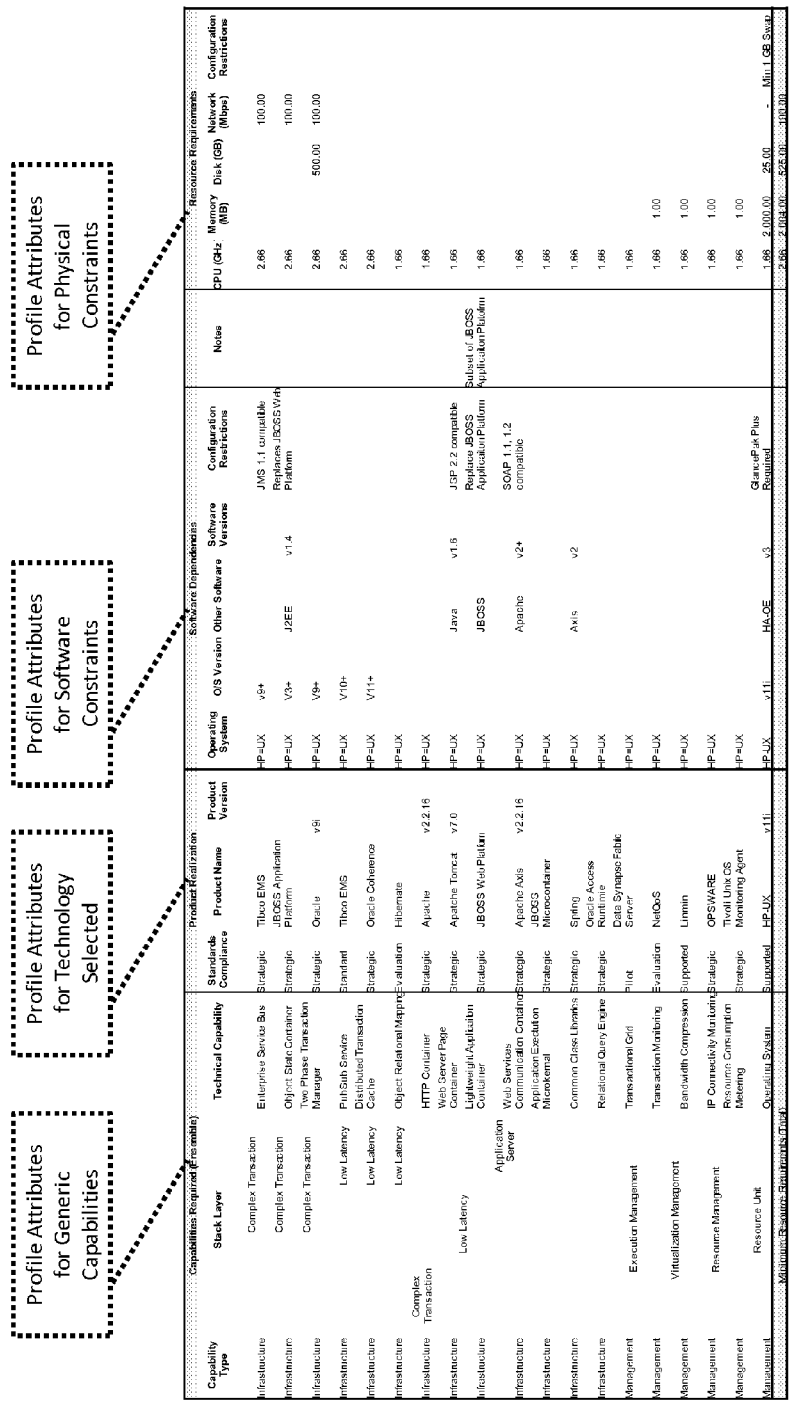
FIG. 31 illustrates an exemplary configuration profile for a server ensemble.

FIG. 31 illustrates an exemplary configuration profile for a server ensemble. The configuration profile details profile attributes for generic capabilities, profile attributes for selected technology, profile attributes for software constraints, and profile attributes for physical constraints.

Figure 32:
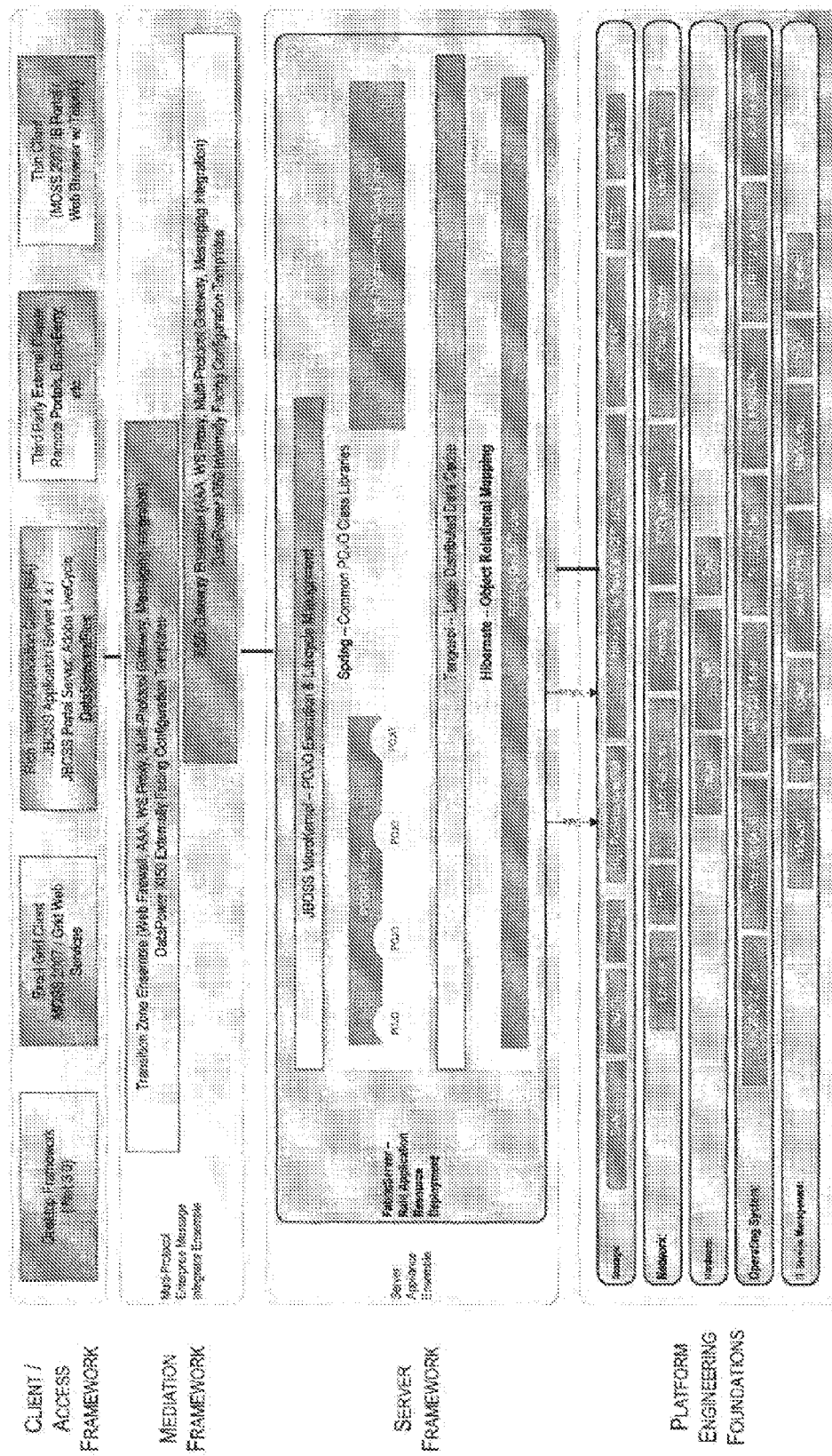
FIG. 32 illustrates a latency sensitive transaction stack that has been realized with real products as an implementation solution for deployment onto a processing execution destination.

Multiple ensembles can be combined together to form an implementation solution. Specifically, an implementation solution is a fit for purpose lineup of multiple ensembles that crosses multiple parts of an Enterprise Stack Pattern but that has not yet been dimensioned for deployment onto a processing execution destination (described hereinbelow). FIG. 32 illustrates a latency sensitive transaction stack that has been realized with real products as an implementation solution for deployment onto a processing execution destination. In a preferred embodiment, the actual deployment into the processing execution destination will further require sizing information to determine the actual quantities of each ensemble required to meet the workload volume. However, the contents of the implementation solution contains all the bill of material line items necessary to configure the processing execution destination and only the quantity of these items remains to be specified to complete the dimensioning.

Processing Execution Destinations

Ensembles are deployed on processing execution destinations (PEDs). In other words, a PED can be characterized as an instance of one or more deployed ensembles, (in a preferred embodiment, multiple ensembles are frequently deployed onto a single PED). While an ensemble is ready to be deployed but has not actually been deployed, and has been configured but has not yet been fully parameterized and dimensioned, a PED is fully parameterized and dimensioned with real processing and networking elements ready to execute workloads.

Specifically, a PED includes processing, memory, storage, networking, and management elements, as well as a platform profile that describes the configuration of all elements. Notably, some of these elements may be integrated. For example, a compute blade integrates memory elements and processing elements, and a solid state disk integrates storage and memory elements. Thus, PEDs comprise deployed computing, networking, and storage resources in a data center (or other place of processing execution). Viewed from a different perspective, a PED can be understood as a physical partitioning of a data center provided that it is understood that certain physical resources may be pivoted physically or temporally among PEDs in response to changing workload volumes in each PED.

A PED is responsible for management of the execution environment. Specifically, a PED is responsible for secure allocation of resources, instrumentation of resource consumption, and detection of, and recovery from, execution errors. Thus a PED contains all the different technical capabilities needed to execute workloads. Accordingly, the use of PEDs facilitate the co-location of processing to improve performance.

Figure 33:
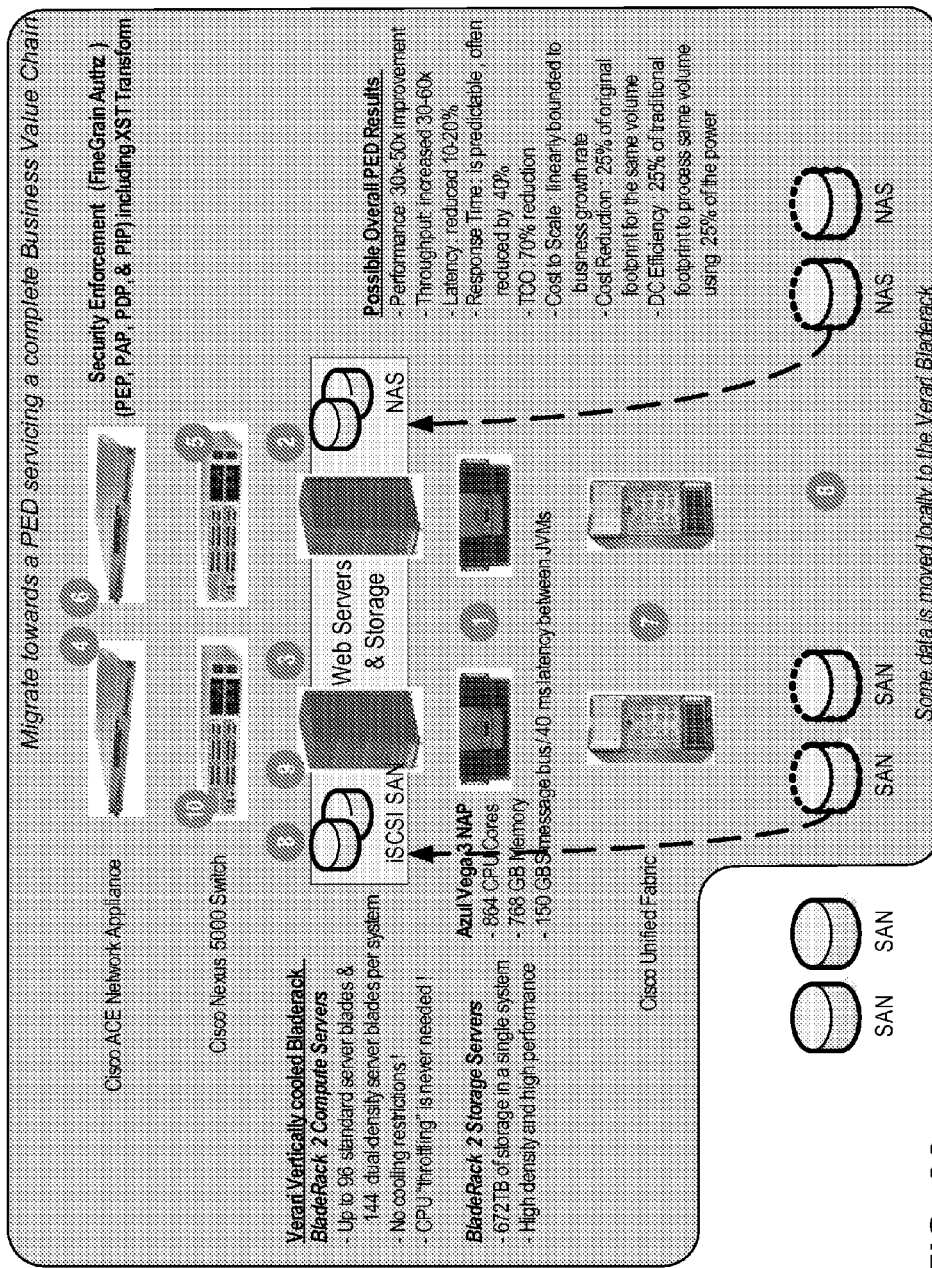
FIG. 33 illustrates an exemplary processing execution destination configured to service an entire business value chain.

In at least some preferred implementations, it is desirable to configure a PED to allow it to service an entire business value chain. FIG. 33 illustrates an exemplary PED configured to service an entire business value chain.

Figure 34:
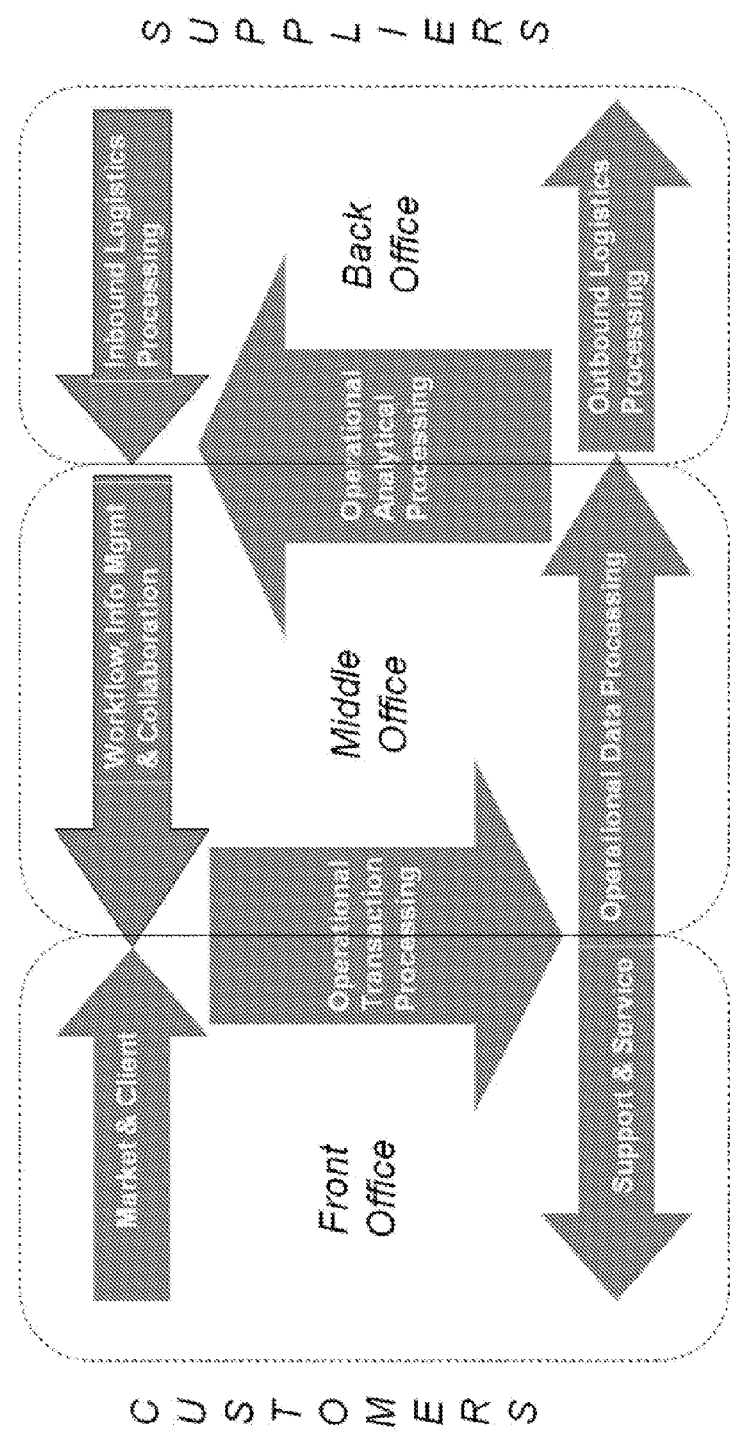
FIG. 34 illustrates an exemplary IT supply chain that maps to a business value chain.

Thus, ensembles running on PEDS can provide IT architecture to support a business value chain. This IT architecture can be characterized as forming all or part of an IT supply chain (ITSC) that supports a business value chain. FIG. 34 illustrates an exemplary IT supply chain that maps to a business value chain.

An IT supply chain is preferably configured to satisfy business demand of an organization. In order to determine whether this is the case, however, business demand must first be determined.

Fortunately, business scenarios and use cases, as described hereinabove, capture a frequency of performance as well as any constraints on performance. Further, business functions can be characterized as responding to various business drivers. Exemplary such business drivers include market advantage business drivers (e.g., time to market and competitive response), customer satisfaction business drivers (e.g., response times such as service time or delivery time, and quality factor), organizational effectiveness business drivers (e.g., continuous improvement, improved business scope/integration, improved business capacity, improved predictability, and improved agility), and vertical reality business drivers (e.g., regulatory response, industry initiates, standardization, and interoperability of products or services). These business drivers, frequencies, and constraints shape workload demand experienced by an organization.

The attributes of business demand can be characterized as business demand characteristics. Business demand characteristics can be organized via use of a workload demand profile (also referred to herein as a workload profile). FIG. 35A illustrates generic business demand characteristics that can be utilized in a workload profile. FIG. 35B illustrates an exemplary workload profile utilizing these generic business demand characteristics.

Workload profiles preferably describe a workload in the business value chain at the most appropriate level of detail. Some business value chains can be described at the business function level if all workloads in that business value chain have the same workload profile. Other business value chains, however, must be described at a business activity level because workloads in that business value chain differ between business activities. Sometimes, workloads must be described at an application level because an application crosses multiple business activities. This case is illustrated in FIG. 35B.

Each link in the IT supply chain, which maps to the business value chain, can include different applications with different processing characteristics. Workload tends to be similar within a link and different between links, i.e., workload demand can be characterized as being patterned because frequency is often the same at the workflow level of the business value chain. In other words, commonly occurring workflows are naturally expressed using workload patterns.

Figure 36:
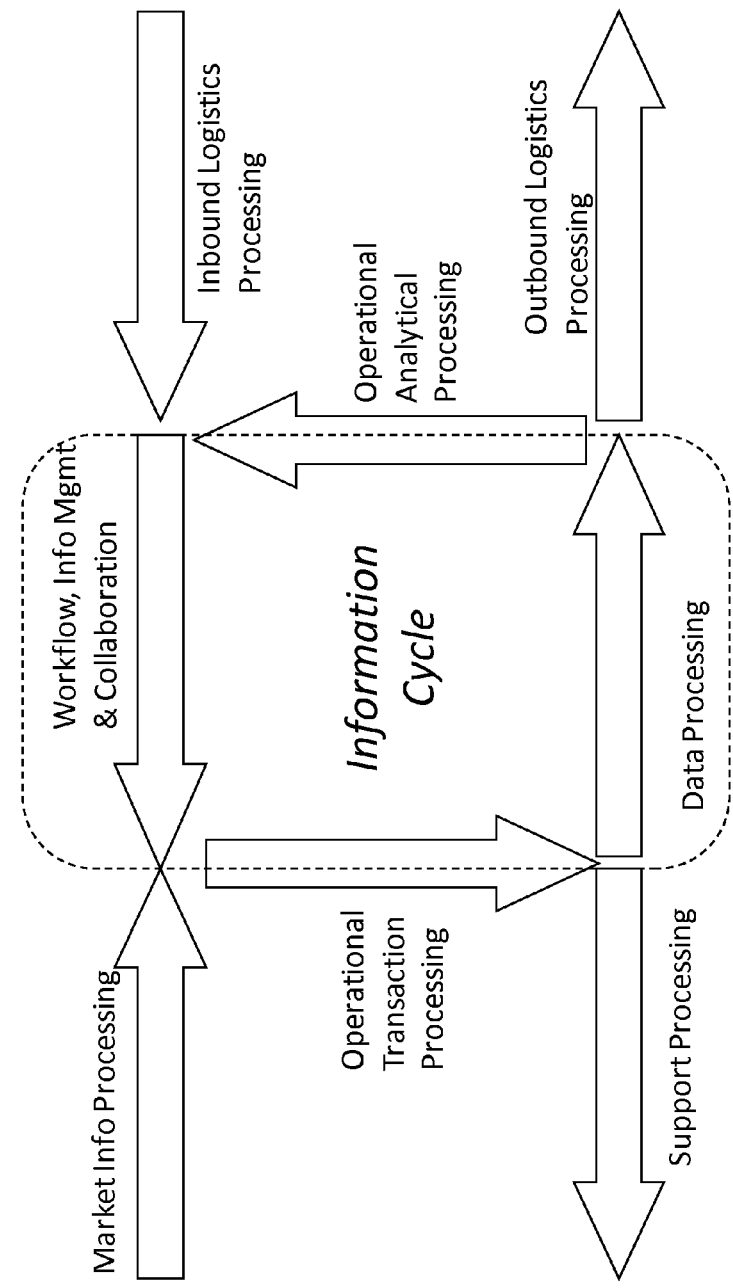
FIG. 36 illustrates an exemplary IT supply chain that includes a plurality of links.

Since recurring workflows typically occur within the same link of an IT supply chain, workload patterns can be utilized, and, for example, mapped onto links in an IT supply chain. FIG. 36 illustrates an exemplary IT supply chain that includes a plurality of links. These links include Market Information Processing (e.g., market data, marketing leads, call centers), Operational Transactional Processing (e.g., order entry, trading), Support Processing (e.g., dispatch, maintenance), Data Processing (e.g., settlement, payroll, extract-transform-load), Operational Analytical Processing (e.g., business intelligence, risk), Collaboration, Communication, and Workflow (e.g., email, SharePoint®, customer relationship management). Each of these links in the IT supply chain can be characterized as often having various commonly recurring workload pattern characteristics. Importantly, these characteristics preferably include recurring qualities as well as recurring known problems that can be remediated (as described in more detail hereinbelow) by the appropriate use of patterns.

For example, processing in the market context of an IT supply chain can frequently be characterized as including, utilizing, or supporting, on a recurring basis, a data flow model, layered peer to peer structures, a cascading flow of input and state, a publication subscription model, many to one relationships, and filtering and routing.

Similarly, transaction processing of an IT supply chain can frequently be characterized as including, utilizing or supporting, on a recurring basis, an n-tier structure with short-lived financial transactions, order entry, point of sale systems and processes, non-repudiation and customer service requests.

Further, support & service processing of an IT supply chain can be characterized as including, utilizing, or supporting a client-server structure that is n-tier with long lived transactions that are rarely financial, dispatching systems, delivery systems, and maintenance systems.

Further still, data processing and integration processing of an IT supply chain can be characterized as including, utilizing, or supporting enterprise application integration (EAI) structures, data aggregation/rationalization/integration, batch processing, clustered models, many to many relationships, large shared databases, extract transform and load operations, and a message bus.

Outbound logistics processing of an IT supply chain can be characterized as including, utilizing, or supporting processes that involve going outside of a company, extranets, protocol gateways, data conversions, store and forward processes, a reconciliation process, complex transactions, security and confidentiality, non-repudiation, and a multi-phase commit process.

Inbound logistics processing of an IT supply chain can be characterized as including, utilizing, or supporting: processes that involve coming inside to a company, security, validation, protocol and data conversions, non-repudiation and logging.

Still yet further, analysis and reporting processing of an IT supply chain can be characterized as including, utilizing, or supporting aggregation and large fan out, normalization and analysis, renders, distribution, data marts, satellite repositories, business intelligence, and operations research. Analysis and reporting can be characterized as tying into workflow and collaboration.

Finally, workflow and collaboration processing of an IT supply chain can be characterized as including, utilizing, or supporting distributed workflow management, data and media distribution, a controller, repositories, and caches.

Figure 37:
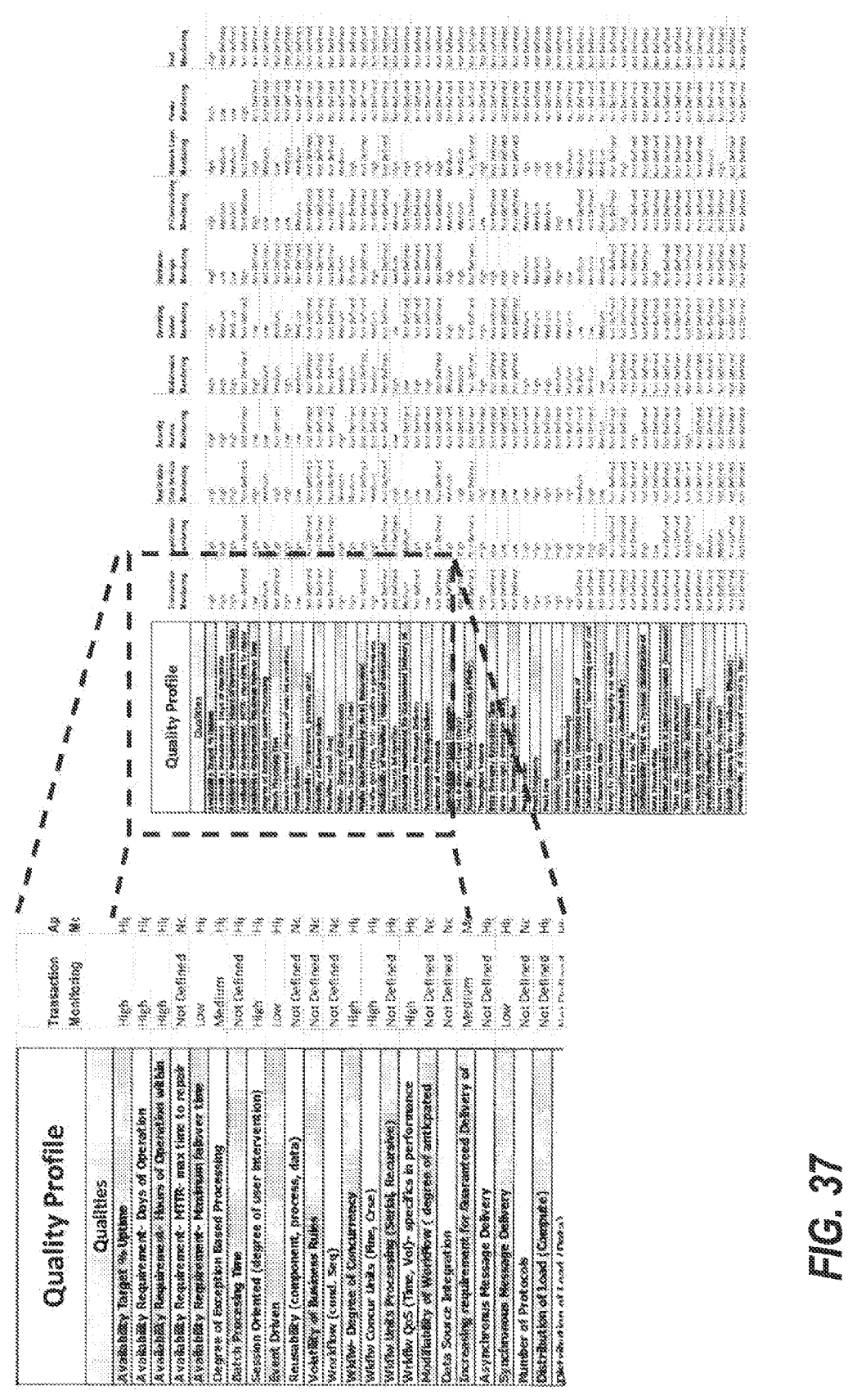

Just as attributes of demand can be characterized as business demand characteristics, attributes of workload patterns can be also be characterized as qualities. A workload pattern can be characterized by a quality of experience (QoE) profile using qualities. The qualities in a quality of experience profile are more detailed than those utilized in a workload profile. FIG. 37 illustrates an exemplary QoE profile.

Once demand is characterized in a workload pattern via a quality of experience profile, a finer grain service profile can be selected by considering more detailed qualities.

Figure 38:
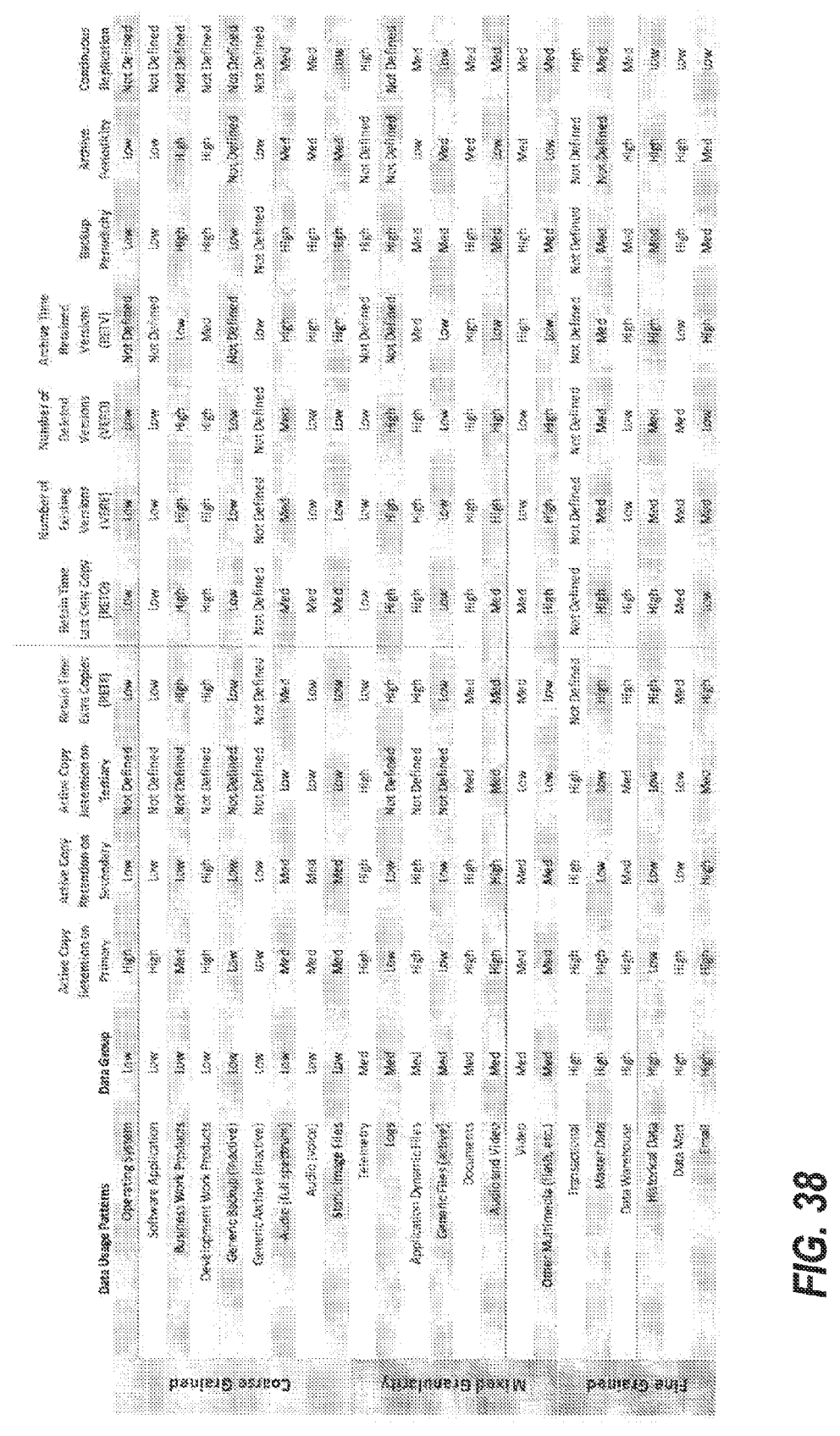

A service profile can be used to create a mapping between architecture patterns and a more detailed policy set that can be used to select an ensemble (as described in more detail hereinbelow). For example, FIG. 38 illustrates data usage patterns charted utilizing a detailed policy set of their service profiles. This mapping can be utilized to select the most appropriate storage ensemble.

While business patterns form a basis for reuse in view of common needs across various business activities, workload patterns form a basis for demand prediction. Specifically, the ability to readily map workload patterns onto IT supply chain models enables such demand prediction.

These business drivers, frequencies, and constraints which shape workload demand can also be used to shape service level agreements (SLAs) that must be met to meet user expectations for a business workflow or business scenario. A service level agreement (SLA) expresses a user's business value chain requirements for service from the IT supply chain (or digital supply chain). Such a service level agreement includes one or more service level outcomes that are required by one or more workload patterns.

Further, qualities of architectural patterns define constraints that are related to this service level agreement. Specifically, ensemble components which correspond to a pattern element of an architecture pattern (e.g., machine to machine dependencies) have one or more operational targets which form part of an operation level agreement (OLA) that expresses the resources and personnel required from an IT supply chain to meet a service level agreement. An execution level agreement (ELA) expresses the dynamic allocation policy of resources to be assigned by the IT supply chain, i.e., it expresses the allowed policy for increasing or decreasing resources required from an IT supply chain to meet a service level agreement.

For example, an SLA might specify that a user expects trade latency to be less than 100 ms with a trading frequency of 1000 trades executed per minute during the business day for peaks of up to 30 minutes. A corresponding sub-system responsible for realizing the SLA might require an OLA that provides for increased monitoring of transaction rates during the business day. A corresponding ELA might specify the ability to add up to three additional processing elements and one networking element (in the form of a VLAN), if monitoring reveals that the assigned resources are unable meet the quoting system's OLA, between 9 AM and 4 PM.

If the supply of resources is in balance with demand, then the IT supply chain will fulfill the SLA required by the business value chain. A PED, or a set of PEDs, is the realization of the IT supply chain. A PED's performance can be measured because it is physical manifestation of one or more ensembles. Ensembles are logically grouped sets of technical capabilities that are optimized to the processing of a specified workload demand. The choice of technology to implement the technical capabilities greatly affects the ultimate cost and success of the IT supply chain (i.e., its ability to meet demand, without over allocation of resources). These measurements can be compared against service level agreements.

PED performance can vary greatly based on configuration and optimization parameters. Each ensemble deployed on a PED can define recommended configuration parameters. These parameters can be adjusted based on operational considerations and workload characteristics as defined by the QoE profile.

Often, a PED will be required to run several types of workloads over a period of time (e.g., a day, a week, a month, etc.). This may require dynamic pivoting of resources and re-provisioning of processing and network elements in order to meet execution level agreements. The policy that governs this dynamic provisioning is the ELA.

Notably, such pivoting does not change a PED, instead, it changes the ensembles that are being executed on the PED and/or the configuration and/or the dimensioning of those ensembles. For example, during the day, an entire PED might be allocated to an ensemble used for dynamic numerical processing, but in the evening the number of processing elements for dynamic numerical processing is scaled back to allow some systems to be re-pivoted to run dynamic business intelligence on that same PED.

Figure 39A:
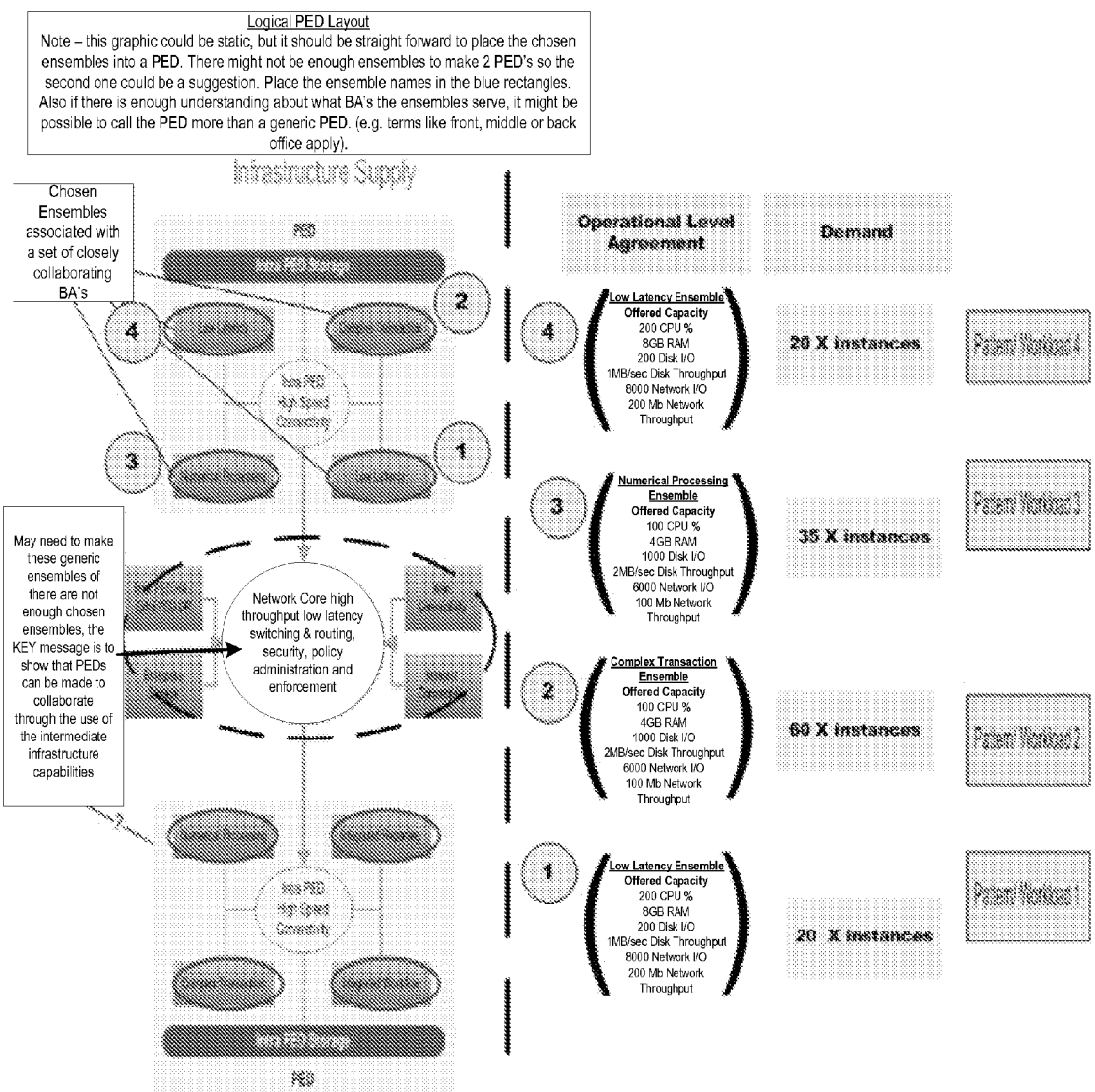
FIGS. 39A-B collectively illustrate an example of dimensioning a processing execution destination to utilize four ensembles at varying times of the day.
Figure 39B:
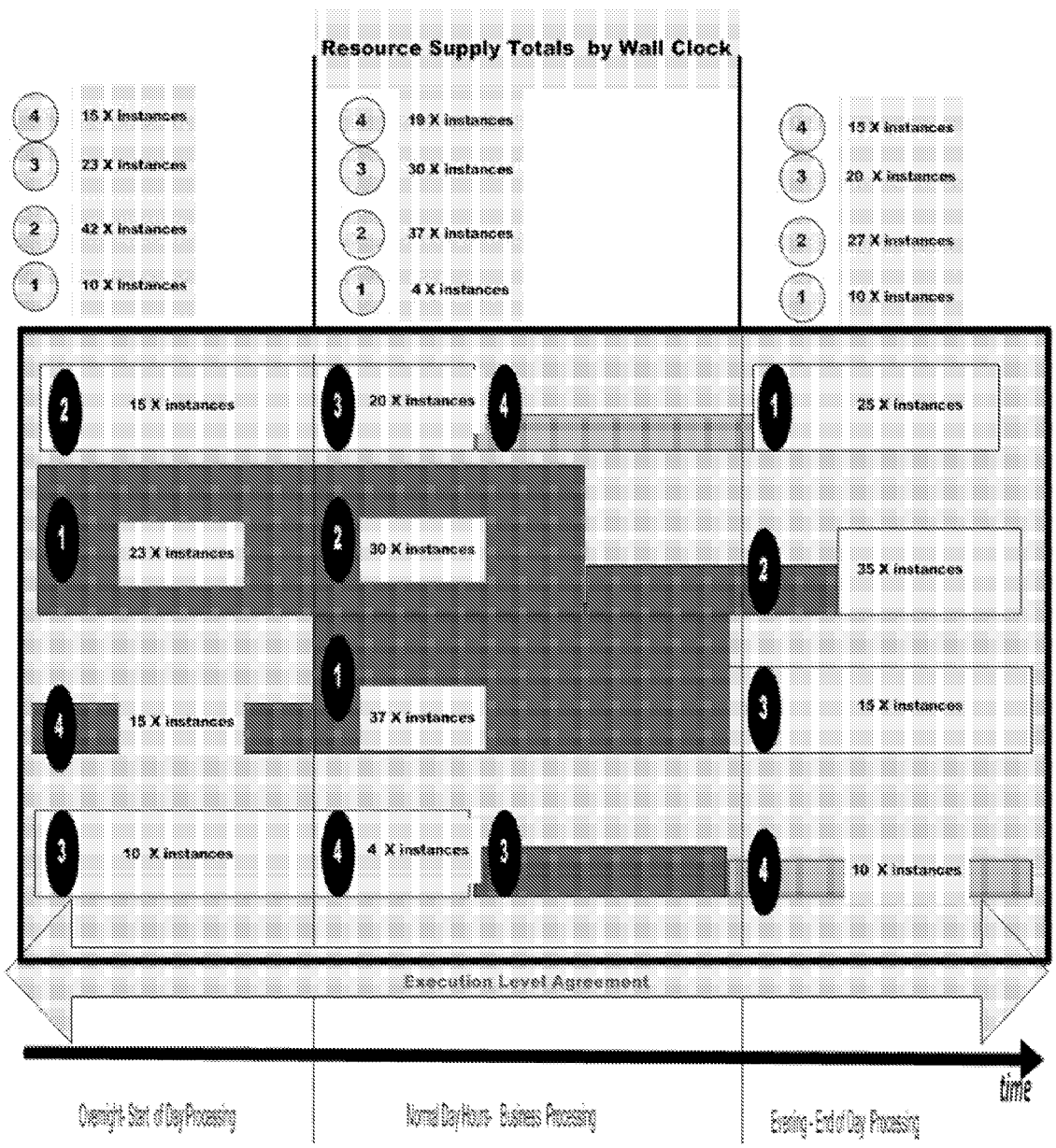
Figure 46:
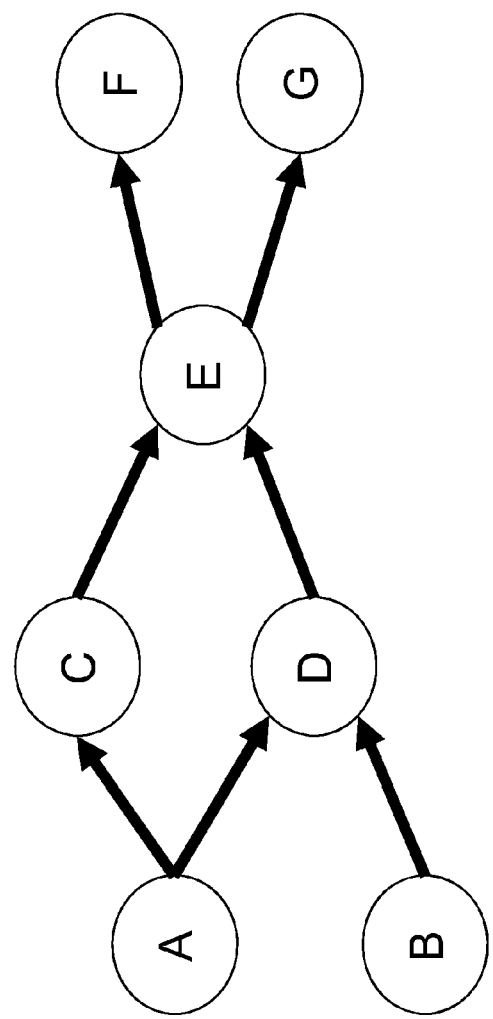
FIG. 46 illustrates an exemplary Bayesian Belief Network.

FIGS. 39A-B collectively illustrate an example of dimensioning a PED to utilize four ensembles at varying times of the day: two low latency ensembles, a network processing ensemble, and a complex transaction ensemble. Each ensembles defines operational requirements that form part of an OLA that describes what it requires to fulfill the SLA that it was created to meet.

Just as configuration profiles are utilized to describe the attributes of an ensemble, the provisioned attributes of a PED are described in a platform profile. The platform profile of a PED is based on realizing and dimensioning a manifest provided by each ensemble deployed on the PED. In a dynamic PED, such manifests are utilized to automatically dimension and pivot resources, while for a static PED such dimensioning and pivoting is performed by operations staff.

Figure 40:
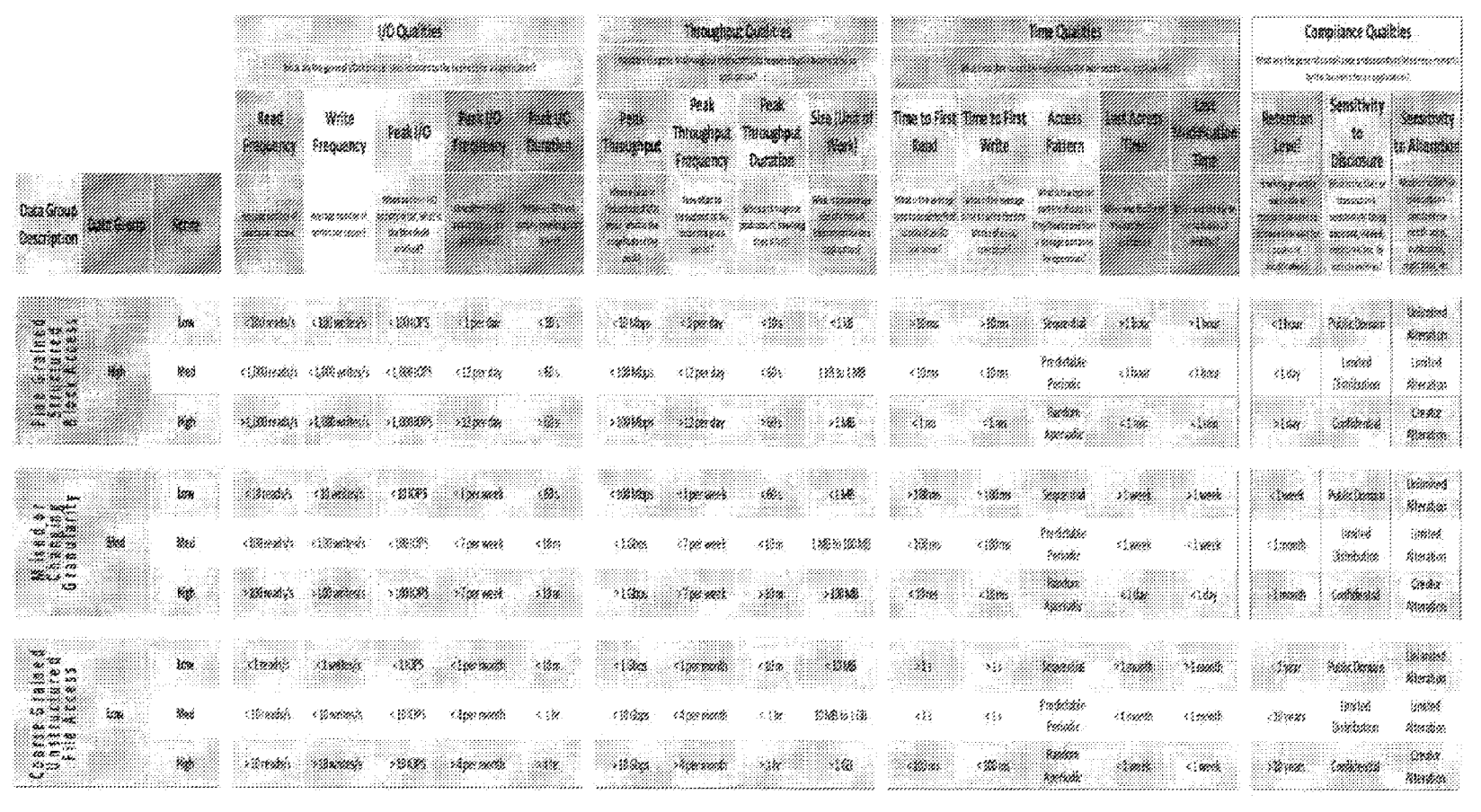

Preferably, second tier qualities are utilized in dimensioning a PED. For example, FIG. 40 illustrates second tier qualities for use in dimensioning storage for a PED. These second tier qualities might include, as I/O qualities, read frequency, write frequency, peak I/O, peak frequency for I/O, and peak duration for I/O; as throughput qualities, peak throughput, peak frequency for throughput, peak duration for throughput, and size of unit work; as time qualities, time to first read, time to first write, access pattern, last access time, and last modification time; and as compliance qualities, retention level, sensitivity to disclosure, and sensitivity to alteration. Second tier (i.e., deeper and more specific) qualities are utilized for dimensioning because policy sets do not describe the size of a required configuration until second tier qualities are considered.

Notably, however, because multiple ensembles are usually combined in a processing execution destination, a platform profile can contain significantly more information than the sum of the configuration profiles for each ensemble within the processing execution destination. For example, the configuration profile of a processing execution destination preferably contains provisioning information necessary for combining ensembles, configuration information necessary for sizing and dimensioning the processing execution destination, and information for temporal virtualization and prioritization of the processing execution destination.

The platform profile preferably includes detailed information that can be obtained utilizing forensic data gathering of hardware and storage configuration items, network and storage configuration items, configuration parameters for configuration items, and patch and firmware levels for configuration items.

Preferably, a platform profile is based on standards to the extent practicable. For example, the Distributed Management Task Force, Inc.'s Common Information Model can be utilized as a reference basis for hardware and storage configuration items, the Simple Network Management Protocol Management Information Base standard can be used as a reference basis for network configuration items, and configuration management database standards can be used as the reference basis for software configuration items.

FIG. 41 illustrates an example of provisioning a processing execution destination that lists profile attributes detailing configured resources, a make/model of equipment utilized in product realizations, a logical configuration supplied by the resources, and physical resources supplied by the resources. Note that this example does not fully illustrate storage and network provisioning. For example, a profile for networking provisioning might also detail IP address attributes, VLAN attributes, and quality of service attributes. Similarly, a profile for storage provisioning might also detail logical unit (LU) and physical unit (PU) parameters.

Capabilities

Ensembles enable one or more technical capabilities. A single capability might be enabled by multiple components of an ensemble, or, alternatively, multiple capabilities might be enabled by a single component of an ensemble.

In general, capabilities enable the business or IT of an organization. That is, a capability represents an ability to do something, e.g., an ability that an organization, person, or system possesses. There are three types of enablement. Competency capabilities correspond to the aggregate skills and the competency of personnel within an organization, technical capabilities correspond to technology architecture and engineering, and process capabilities correspond to operational organization, sophistication and maturity of process.

Competency capabilities are related to the ability of personnel to fulfill outcomes that IT can enable in a business. For example, the ability to accurately forecast the rate of resource consumption is a competency capability that enables IT to ensure that business functions have the requisite capacity to function.

Technology capabilities are often related to the benefits from introducing a new tool or technology. For example, the ability to monitor transactions end to end and the ability to do bare-metal provisioning are technology capabilities.

Process capabilities pertain to the ability to implement certain processes (such as IT change management) and often also include the processes required in addition to one or more technical capabilities to perform best-practices. For example, the ability to triage alerts by business impact, predict a capacity of resources, pivot resources in response to a surge in business demand, and accurately chargeback for resource consumption are all process capabilities. Net IT processes are also a type of process capability.

Thus, a capability may be a skill or competency possessed by a person or team, a process possessed by an organization, or a technology or product possessed by a system or tool.

Capabilities can be difficult to assess across a large organization that might have degrees of capability spread unevenly across many departments. Further, there is a difference between having a capability, and applying, or utilizing, it. Any assessment of capabilities preferably takes into account both having and applying a capability, and preferably is capable of statistically managing uncertain degrees to which either of these two factors are known.

Clearly, however, you can't apply a capability if you are not even aware of it. Thus, capabilities can be characterized as building blocks for IT maturity. As capabilities are increased, so too is IT maturity. FIG. 42 illustrates exemplary maturity levels that can be utilized.

A capability assessment preferably takes into consideration various factors in assessing differing types of capabilities. One potential assessment methodology that takes into consideration two factors for each of various types of capabilities, and thus can be characterized as being two dimensional, will now be described.

For a process capability, assessment considers how widely the capability is used across an organization, and how often it is used. For example, a change management capability may be practiced in only some units and may not be applied to all changes. For a technical capability, assessment considers how well featured a product is, and how widely it can be used. For example, a product might be capable of managing patches on only Windows systems, and only be capable of detecting Microsoft product patches. For a competency capability, assessment considers whether a competency is fully learned, and if a competency is present in all individuals in a particular role.

A capability assessment table can be utilized to translate the two factors considered for each type of capability into a single score. FIG. 43 illustrates an exemplary capability assessment table for process, technical, and competency capabilities. Note that each of the two factors considered for each type of capability can be converted to a criteria assessment, which is one of: none, few, some, most, or all.

This will produce two criteria assessments for a single capability. In some preferred implementations, a scoring matrix is utilized to express a statistical level of probability that the assessment is accurately known by converting these two assessments to a single score between zero and one. Specifically, the criteria assessment for one factor of a capability is looked up along one axis, and the criteria assessment for the other factor of that capability is looked up along the other axis. The score for that capability is located at the intersection of the factors. FIG. 45 illustrates an exemplary scoring matrix, which in some preferred implementations could be calibrated automatically by sampling frequencies that assessments of this type are accurate across many organizations. For example, if an exemplary technical competency was well featured (thus earning a "most" criteria assessment) but only applicable in a few cases (thus earning a "few" criteria assessment), it would earn a score of 0.15. This represents a fifteen percent level of presence. This level of presence can be viewed as the statistical likelihood that the capability is present, and the statistical likelihood that the capability is absent can be viewed as the inverse of this level (i.e., eighty five percent).

However, because the evaluation is based on a subjective two-dimensional metric, the assessment carries statistical uncertainty. Accordingly, a degree assessment is next looked up from a range table based on the ascertained level of presence to obtain a final assessment. This provides a method for determining base capabilities present in a maturity model even in the presence of uncertainty.

FIG. 45 illustrates an exemplary range table. Returning to the previous example, in which a score of 0.15, corresponding to a fifteen percent level of presence, was assigned, the assessment would result in a determination that the capability is most likely absent.

Preferably, it is assumed that an assessment is unbiased, and that each outcome is equally likely. For example, for the range table illustrated in FIG. 45, it is assumed that each degree of assessment is equally likely (i.e., there is a twenty percent chance of each degree of assessment). Additionally or alternatively, in at least some implementations, biased assessments are accommodated via the use of different weights in the table of assessment certainties.

Capabilities can be combined with other capabilities to create higher level capabilities. Combining capabilities to create new capabilities (or improve existing capabilities) represents a capability increment. When two capabilities are combined together to create a higher level capability, the higher level capability can be characterized as a derived capability, while the capabilities that were combined to form the derived capability can be characterized as base, or constituent, capabilities.

If it is known that a base capability exists (to some level of uncertainty), the likelihood that a derived capability exists can be estimated, although obviously this estimate is uncertain and probabilistic. Conditional probability tables and basic probability theory represent a preferred methodology for such estimates. (Notably, such a methodology preferably does not rely on descriptive statistics or probability distributions, although neither does it prevent or prohibit the alternative application of such techniques as they can be equally accommodated in some preferred implementations.)

Such an estimate preferably incorporates domain knowledge with structure and patterns as well as uncertainty. It is believed that neural nets do not incorporate structure well, and that rule based systems do not adequately incorporate uncertainty, although in at least some implementations these may be utilized anyway.

It is preferred, however, that a Bayesian-based modeling technique for probability calculation be utilized. Bayesian probability is based on basic set theory and the frequency of discrete elements of a set. Its use requires only basic assumptions regarding countable sets of discrete elements (which can be extended for continuous data), and axioms of conditional frequency (although approximate knowledge can be utilized), but does not require independent events (although they can be modeled). By relying only on basic assumptions and axioms, there is less opportunity for inaccuracy being introduced by the modeling technique used within this method.

In contrast, classical descriptive statistics is based on fitting observed data to a continuous probability description. This requires assumptions regarding probability distribution (which are rarely accurate unless there is sufficient data to calibrate a utilized model), continuously valued data sets (e.g., discrete and categorical data is not handled well), and independence between events (which is rarely true). Classical descriptive statistics may be utilized, however, in at least some implementations, as they are not precluded from use in one or more preferred implementations.

Fuzzy logic is similar to Bayesian probability in that it is based on set theory and frequency of discrete elements of a set, however, it is based on the more complex mathematics of infinite sets and uses inequalities as the basis for its reasoning. This is difficult to utilize and modify, thus hampering traceability and the incorporation of client-provided information. Nonetheless, fuzzy logic may be utilized in at least some implementations.

The use of Bayesian techniques is preferred because it provides several benefits. For one, fewer modeling assumptions results in better results in more situations. As noted above, a Bayesian approach works with independent events (probabilities add) as well as conditional events (probabilities multiply). Further, knowledge of conditional probability can come from any source, such as, for example, measured frequencies, subjective knowledge contained in fixed tables, functions of variables used, or hard facts. This is particularly valuable in this application area because of the extensive reliance on subjective knowledge provided by IT architects.

A Bayesian approach allows for reasoning in both directions. For example, if it is known that A causes B, and the baseline frequency of B is also known, inferences can be made in the reverse direction about A given evidence regarding B. A Bayesian approach also enables "explaining cause" reasoning. For example, if it is known that A and B can cause C, but only information about A and C is available, inferences can be made about B that explains the evidence of C.

A Bayesian approach still further enables iteration. It is possible to start out with a mix of hard and soft facts and easily update a model with more hard facts later as they emerge. In other words, knowledge of a prior (i.e., anterior-priori) probability can be updated with new facts or information to yield a more accurate knowledge of a posterior probability (i.e., post-priori). This is particularly well suited for use with an evolving knowledge base utilized by IT architects. For example, the more patterns are used to systematically guide the configuration of ensembles, the greater the accuracy that the correlations between the qualities of those patterns are known. This evolving certainty can be exploited in a preferred embodiment that employs Bayesian techniques for updating probabilities.

Lastly, a Bayesian approach is easily extendable in the creation of advanced models of IT supply chain behavior via the use of Bayesian Belief Networks (BBNs).

Figure 47:
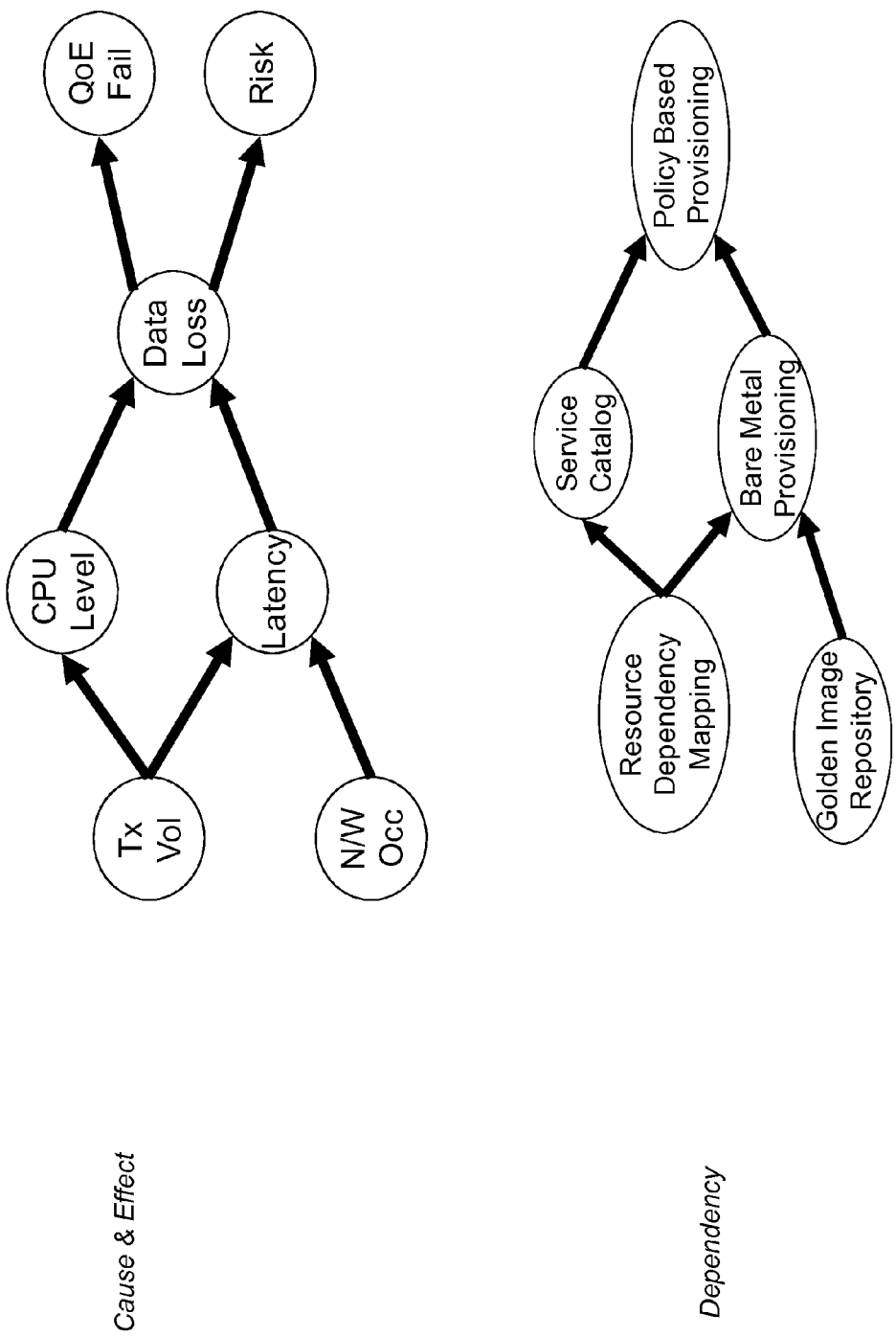
FIG. 47 illustrates the use of causality graphs to represent both cause and effect and dependency.

A Bayesian Belief Network is a causality graph. FIG. 47 illustrates an exemplary such Bayesian Belief Network. Notably, in a Bayesian Belief Network, the nodes do not need to be homogenous, and, in fact, are often very different from one another.

In a Bayesian Belief Network, each starting leaf node is provided with an uncertain estimate, such as, for example a capability assessment. Each subsequent node can be computed utilizing a conditional probability of soft evidence from the leaf nodes. Importantly, how conditional probability is computed can be different at each node.

Bayesian Belief Networks can be utilized to represent different relationships. FIG. 47 illustrates the use of causality graphs to represent both cause and effect (top) and dependency (below).

It will be appreciated that estimations based on Bayesian Belief Networks are uncertain, which makes this technique preferable for estimating the uncertainties in IT supply chains and in IT capabilities. For example, suppose a capability A is based on a capability B, i.e., A depends on B. If information regarding B is known, then the probability of A being present or absent can be inferred using a conditional probability table, such as the one illustrated in FIG. 48.

Then, if it is believed that capability A likely exists (for example because a client said so), but an assessment for B is not available, Bayes' rule can be utilized to infer the level of presence of B.

Bayes' rule can be expressed as $P(B|A)=(P(B) \times P(A|B))/P(A)$, where $P(B)$ is the prior probability or marginal probability of B (i.e., it does not take into account any information about A), $P(B|A)$ is the conditional, or posterior, probability of B, given A, $P(A|B)$ is the conditional probability of A given B, or likelihood, and $P(A)$ is the prior or marginal probability of A, which acts as a normalizing constant.

FIG. 49 illustrates a conditional probability matrix for the probability of B, given A (i.e., $P(B|A)$ that has been calculated using Bayes' rule. For example, for the case where B is known to be "few", in calculating the chance that A is present, $P(B)$ would be 0.2, as all outcomes (absent, few, some, most, present) are equally likely absent more information, $P(A)$ would be 0.5, as present and absent outcomes are equally likely absent more information, and $P(B|A)$ would be 0.25 (based on the conditional probability matrix illustrated in FIG. 48). Accordingly, Bayes' rule says that $P(B|A)$ is equal to $((0.2 \times 0.25)/0.5)$, or 0.10, as indicated in the conditional probability matrix of FIG. 49. Thus, Bayes' rule says that B has a ten percent probability of being present if A is present. Note that B's presence is not certain if A is present, because A's presence is uncertain in the first place.

Thus, using Bayesian techniques it is possible to estimate the value of dependent capabilities. This allows for a more accurate assessment of IT maturity than might otherwise be possible. For example, if there are fifty potential capabilities, but a particular organization only has ten of those capabilities, is the organization really only at twenty percent maturity? It is more likely that the organization has partial maturity in some of the remaining forty capabilities. In this case, uncertain estimates of dependent capabilities could be utilized to estimate a score greater than twenty percent.

Additionally, the estimation of dependent capabilities allows for the estimation of a cost/effort required to improve an organization. For example, if the average cost to acquire a capability is ninety days of effort from three people, or three fourths of a person year, then a partial maturity estimate can be multiplied by this value to estimate the effort to perfect the capability. Assuming that it has been estimated that there is a forty percent chance that a certain capability is present, three fourths of a person year could be multiplied by the inverse of the capability estimate, i.e., (1−0.4), which is 0.6 (corresponding to a sixty percent chance that the capability is not present) to generate an estimate that 0.45 of a person year is required to perfect the capability.

Further still, the estimation of dependent capabilities can be utilized to estimate a relative value to an organization of improving the capability. For example, the value of a capability can be multiplied by the probability that the capability is absent to establish a value to the organization in acquiring a capability.

Known Problems and Remediation

In the course of business, an organization might encounter challenges that prevent the organization from pursuing particular approaches to meet its goals. These can be characterized as known problems.

Figure 50:
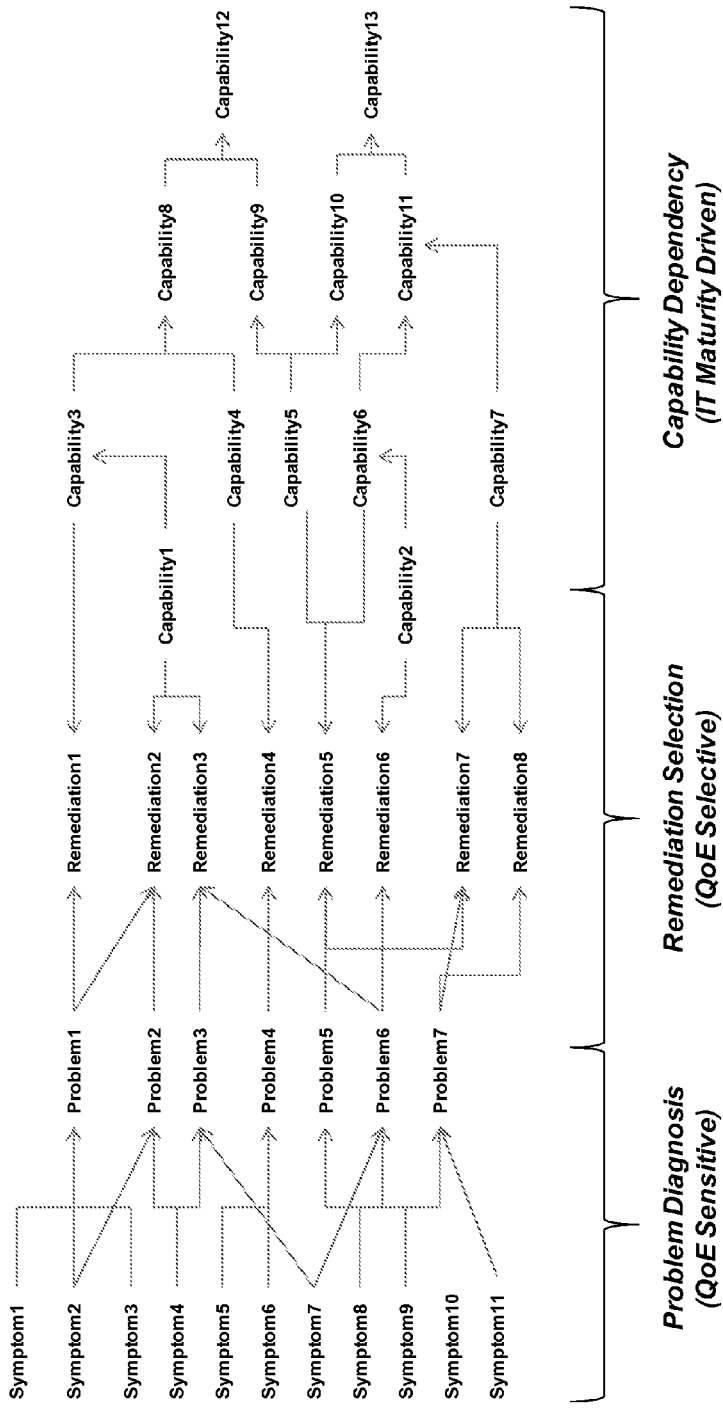
FIG. 50 illustrates how the presence of certain symptoms might indicate the presence of a particular problem.

Known problems can be diagnosed based on the appearance of symptoms. For example, the presence of certain symptoms might indicate the presence of a particular problem, as illustrated in FIG. 50.

Problem diagnosis via symptoms can be characterized as being quality of experience sensitive. For example, symptoms might be identified based on a fit to a quality of experience profile (described herein). In one or more preferred implementations, an automated characterization of symptoms is uncertain and also well suited to the application of Bayesian techniques for recognizing symptoms based on comparing a platform profile of a PED to a configuration profile of ensembles that comprise that PED (for example to detect mismatches in configuration.

Capabilities enable the use of known remediations to resolve known problems. Specifically, a remediation strategy is a set of known remediations used to resolve a known problem. Such a remediation strategy represents a list of capabilities that supply known remediations that are required to resolve the known problem. In one or more preferred implementations, the automated selection of remediations for a known problem is uncertain and also well suited to the application of Bayesian techniques.

Equivalent remediation strategies resolve the same known problem. A minimum equivalent strategy is the smallest set of known remediations that resolve a known problem. Sometimes, a set of remediation strategies in aggregate can resolve a known problem. An equivalent-AND strategy represents such a set. By way of contrast, two remediation strategies that resolve the same known problem can be characterized as equivalent-OR strategies if either can be used in the absence of the other. In this case, which one is most appropriate depends on the context that the known problem appears in.

The insight that capabilities can be combined to create higher-level capabilities can be exploited to simplify reasoning about equivalent remediation strategies. In the cases where the remediation strategy can be defined as an equivalent-AND strategy, it is possible to define a single composite capability that has as its constituents the base capabilities that comprise the members of the equivalent-AND set. Thus the remediation provided by that composite capability can be recognized as automatically matching or predicting the presence of the base capabilities. This provides an algorithmic basis for reducing the number of uncertain capabilities which must be considered to reason about the appropriate remediation. This means that if a preferred embodiment has knowledge of the uncertain maturity level of capabilities, it can infer the probability that an optimal remediation to a known problem can be provided.

If an estimate of the presence of a capability is available, it is possible to compute the probability that a known problem can be solved utilizing a given remediation strategy (as a function of the presence of the capabilities required). Similarly, it is possible to estimate the effort required to resolve a known problem using a remediation strategy.

Qualities Revisited

Qualities can be used to relate quality of experience, workload patterns, patterns, symptoms, known problems, known remediations, and capabilities. As described above, qualities represent categorical metrics. Qualities can be categorized in many ways. These categorizations can be characterized as dimensions in a mathematical sense (not to be confused with the different concept of dimensioning and sizing of a PED, or with different dimensions or viewpoints on IT enterprise architecture). Thus, qualities can be described mathematically as measures within a dimensional metric space. Different dimensions of qualities can be defined to measure different things. Qualities can appear in more than one dimension because there is no restriction that dimensions must be orthogonal to each other (as they are in a Euclidian dimensional space). For example, a workload profile is a useful subset of qualities. Although qualities might be traditionally organized in terms of availability, business process, and usability, qualities can be rearranged into dimensions for processing, messaging, data, and memory. FIG. 51 illustrates an exemplary workload pattern that represents a subset quality profile having thirty four of fifty qualities rearranged.

Qualities can be correlated to other qualities both individually and in aggregate.

Specifically, the fit between any two qualities can be correlated using conditional probability tables. FIG. 52 illustrates how a pattern quality value can be correlated to a workload pattern quality value. Notably, for conditional probability to be utilized to model a quality fit, different conditional probability tables will be needed for different pairs of relationships.

The, average fit between any two quality profiles can be calculated using a multiplicity of techniques. One such technique minimizes the average distance between the qualities. Another technique utilizes a geometric mean. Yet another technique uses density estimation techniques. In one or more preferred implementations, the use of a specific technique may depend on the types of quality profiles being reasoned about, or on the type of reasoning being performed. For example, if it is desirable to exploit the fact that conditional probabilities multiply, the use of a geometric mean based technique can result in a higher performing and more accurate implementation. Alternatively, if a similarity estimate between quality profiles is desired, a density estimation technique might be preferred.

Thus, the fit of, for example, a pattern to a workload or a known problem to a known remediation can be estimated using conditional probability tables to model explicit dependencies (e.g., known problem—known remediation, capability dependency, quality dependency), or using quality profile comparisons in situations where explicit dependency tables are not defined (e.g., an ensemble fit to a business value chain).

Further, it is possible to define rules to derive qualities. This can be accomplished by utilizing a function on one or more qualities. For example, the function $F(X+Y)=Max(X,Y)$ says that, if X="High", and Y="Low", then $F(X+Y)=Max$ ("High", "Low")="High". This simple example illustrates the use of function $F(X+Y)$ to derive a new quality from X and Y qualities. In a more complex methodology, fuzzy logic tables could be utilized to define functions taking X and Y as inputs. Exemplary such fuzzy logic tables are illustrated in FIG. 53. Notably, the use of fuzzy logic tables supplements, rather than replaces, the use of conditional probability tables as both can be accommodated within the same implementation.

Figure 55A:
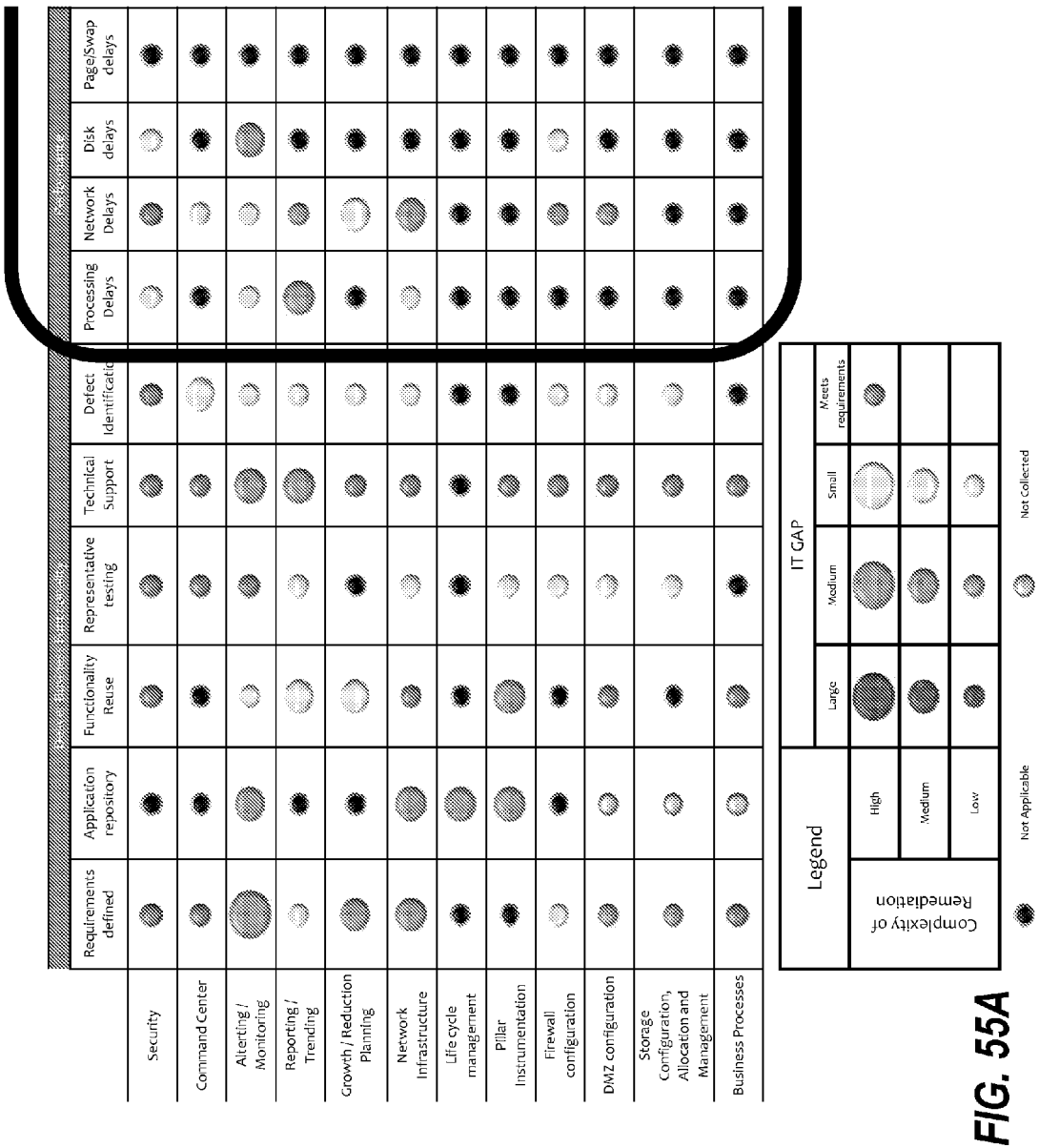
Figure 55B:
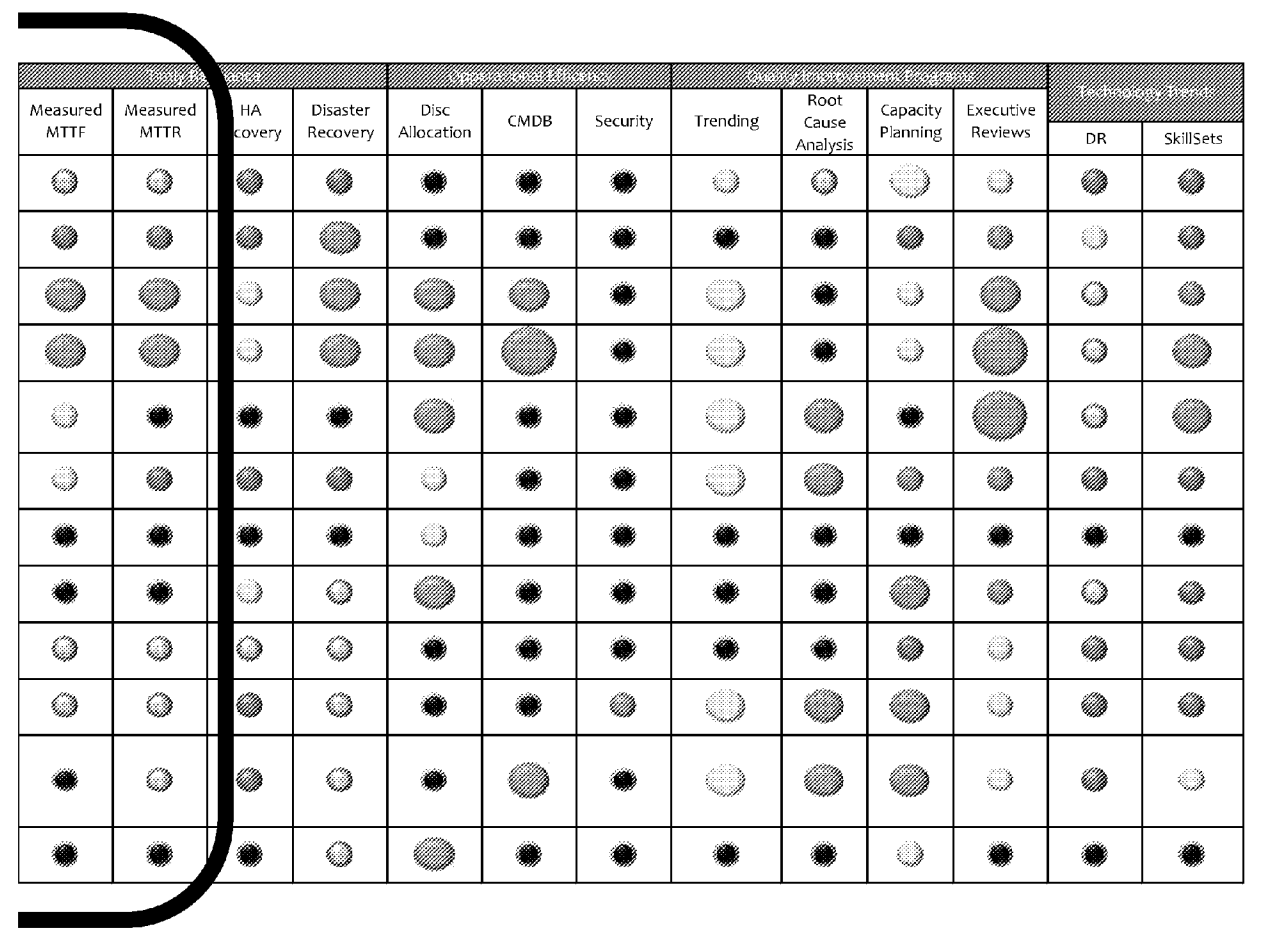

The use of derived qualities enables deeper use of workload patterns. FIG. 54 illustrates a workload pattern having both base qualities and calculated qualities derived therefrom. Functions on qualities can be utilized to extend conditional probability or to help shape conditional probability tables (e.g., ensemble fit to workload). Further, derived qualities can be utilized for heat map comparisons (e.g., a heat map predicting how well an ensemble or remediation meets workload requirements). FIGS. 55A and 55B collectively illustrate an exemplary performance heat map predicting how well an ensemble meets workload requirements. As illustrated therein, this heat map illustrates the complexity of remediation required to meet workload requirements. This complexity of remediation can be characterized as representing an IT gap. Similarly, a heat map measured on an existing application could be imported to compare to an ensemble.

Exemplary Processes

Figure 56:
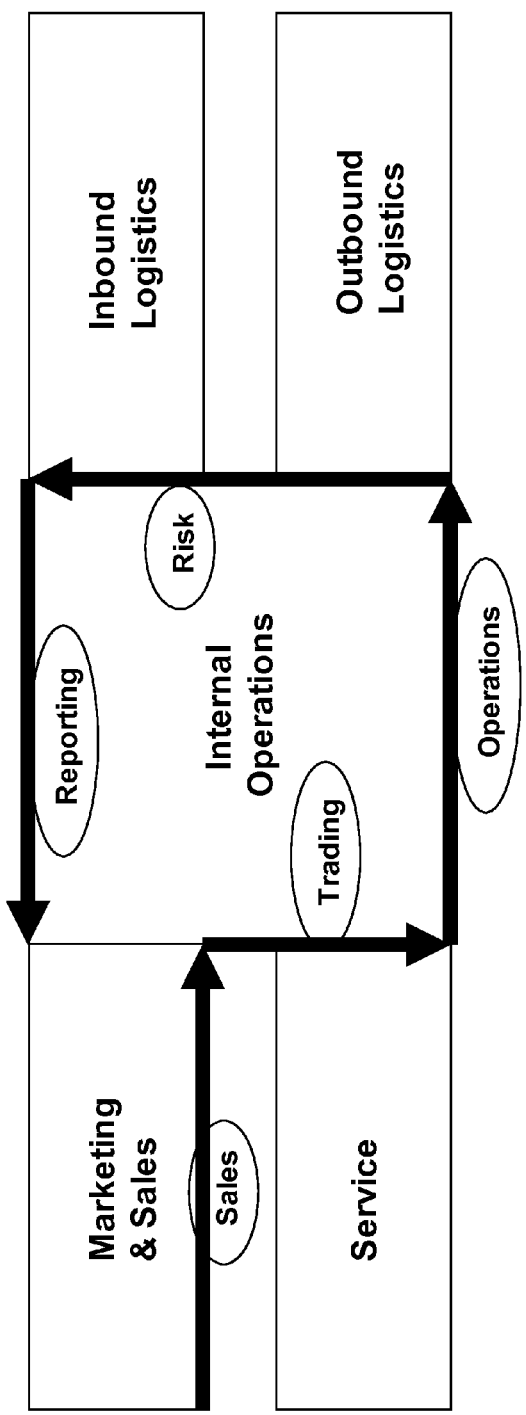
FIG. 56 illustrates business functions that constitute a straight through processing business value chain in capital markets mapped onto an IT supply chain.
Figure 57:
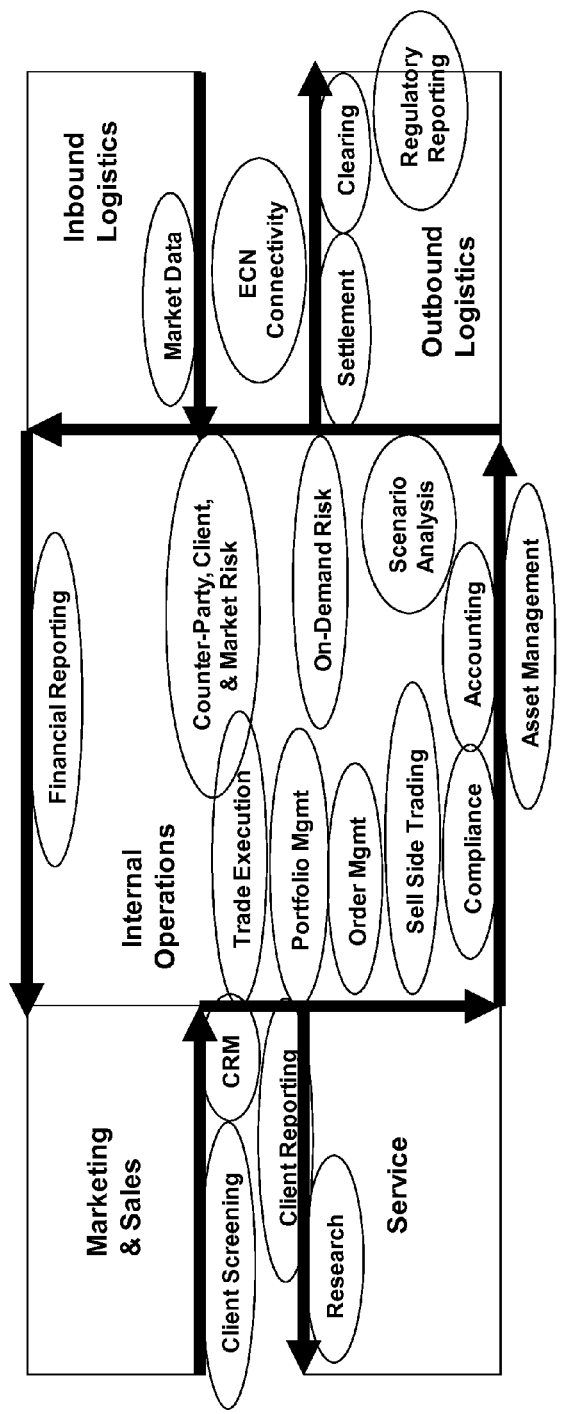
FIG. 57 illustrates how business activities can be organized along different legs of an IT supply chain.

It will be appreciated from the above description that a business value chain can be utilized to characterize IT demand of an organization, and an IT supply chain can be utilized to characterize IT supply to meet that demand. Business functions can be laid out within such a business value chain. Business activities within each business function can then be identified, as illustrated in FIG. 56, which depicts business functions that constitute a straight through processing business value chain in capital markets mapped onto an IT supply chain. Business activities are organized along different legs of the IT supply chain, as illustrated in FIG. 57.

The requirements for each business activity, which typically are dominated by similar workflows, can be characterized by a recurring workload pattern having a distinct set of qualities, i.e., a quality profile. The requirements, and hence the quality profile, for each business activity in a business value chain are shaped by business drivers for the business functions in that business value chain.

Figure 58:
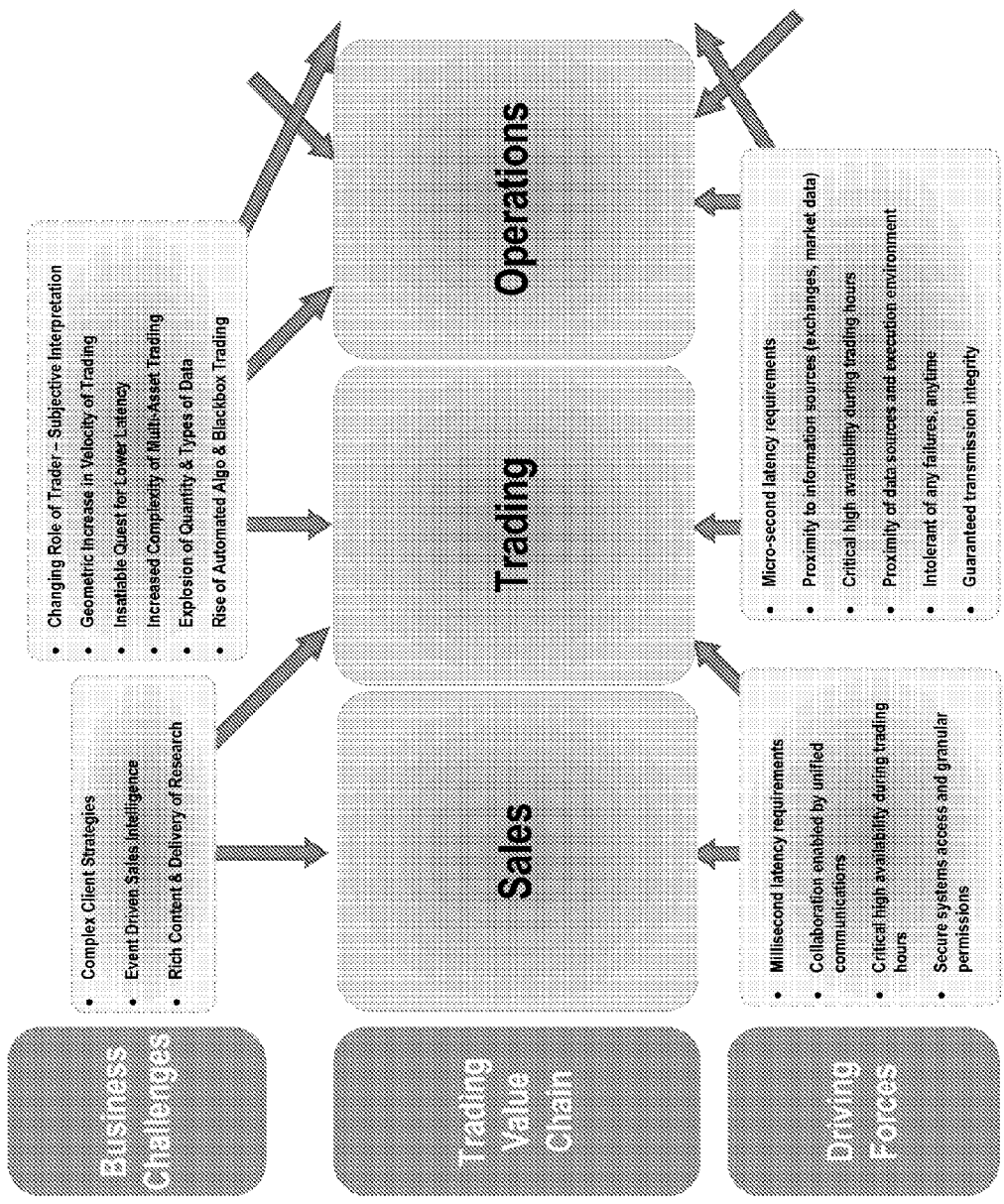
FIG. 58 illustrates how business challenges and driving forces (e.g., service level agreements) can shape key performance indicators for a business function of a business value chain.

In FIG. 56, each arrow identifies a leg in the IT supply chain. Each leg of the IT supply chain has different processing requirements (e.g., this might be influenced by whether a leg is customer facing, internal, or supplier facing). Thus, whereas business drivers are specific to business activities, it is possible to define key performance indicators that exert a common influence on all business activities within the same business function. FIG. 58 illustrates how business challenges and driving forces (e.g., service level agreements) can shape key performance indicators for a business function of a business value chain. For example, key performance indicators might include time to market agility, business performance agility, capital expenditure (CapEx) cost savings, operating expense (OpEx) cost savings, efficiency, operational risk reduction, and reliability. With respect to these key performance indicators (KPIs), for a trading business function, time to market agility, business performance agility, and reliability would likely be characterized as of "high" importance, while CapEx and OpEx cost savings would likely be characterized as of "low" importance.

Once KPI priorities have been characterized for a business function, an optimal quality profile (OQP) can be derived. This optimal quality profile can be utilized as a point of departure to derive a business activity quality profile (BAQP) for each business activity within a business function. Each business activity quality profile can be adjusted based on specific workload requirements for that business activity (e.g., based on business drivers for that business activity). FIG. 59 illustrates pseudo code for carrying out this process.

Figure 21:
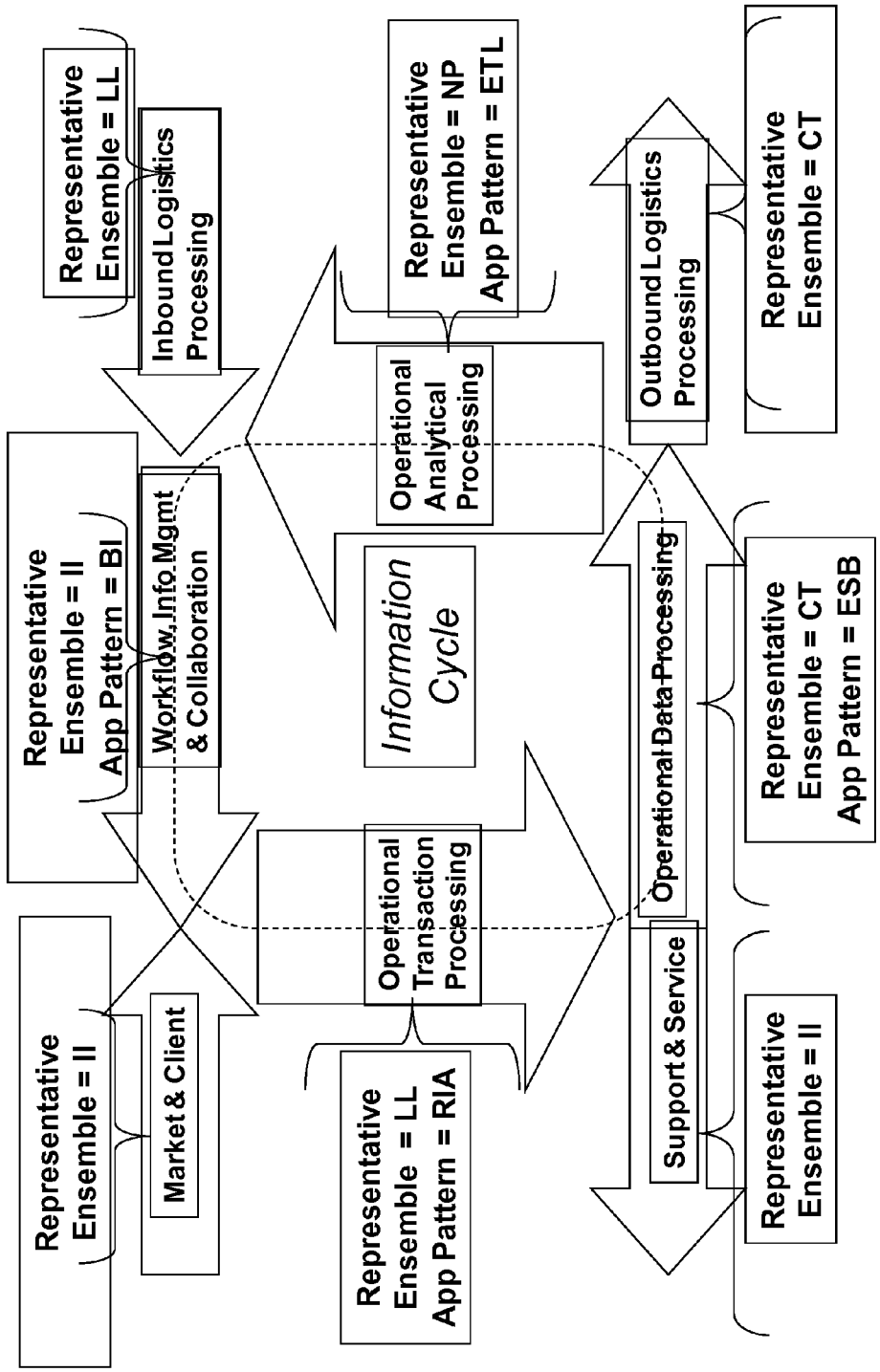
FIG. 21 illustrates how each leg of an IT supply chain can have a representative ensemble.

An ensemble can be matched to this optimal quality profile. This ensemble can be characterized as being representative of the leg of the IT supply chain it is mapped to. Thus, each leg of an IT supply chain has a representative ensemble, as illustrated in FIG. 21.

The fit of this representative ensemble can be compared to an optimal quality profile and business activity quality profiles utilizing a predictive heat map. The fit of this representative ensemble to business activities will vary due to the different business drivers of business activities.

Figure 61:
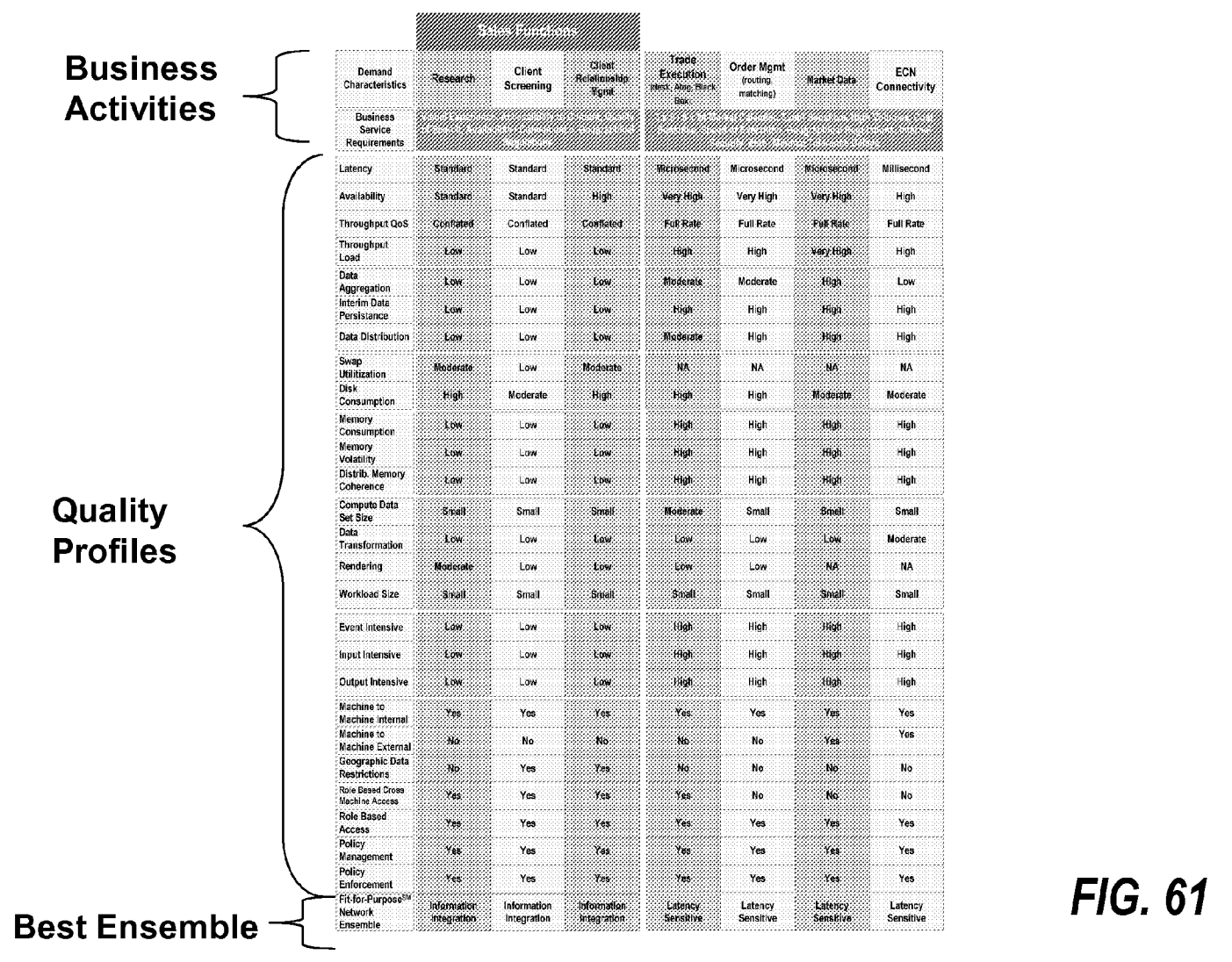

However, business activities within the same leg of an IT supply chain will still have very similar quality profiles. This can be exploited via the use of fit for purpose ensembles (that is, multiple business activities can utilize the same ensemble, and it will generally be a good fit for each business activity). FIG. 61 illustrates the similarity of quality profiles for business activities of a sales business function and the identification of a fit for purpose network ensemble for these business activities.

Figure 62:
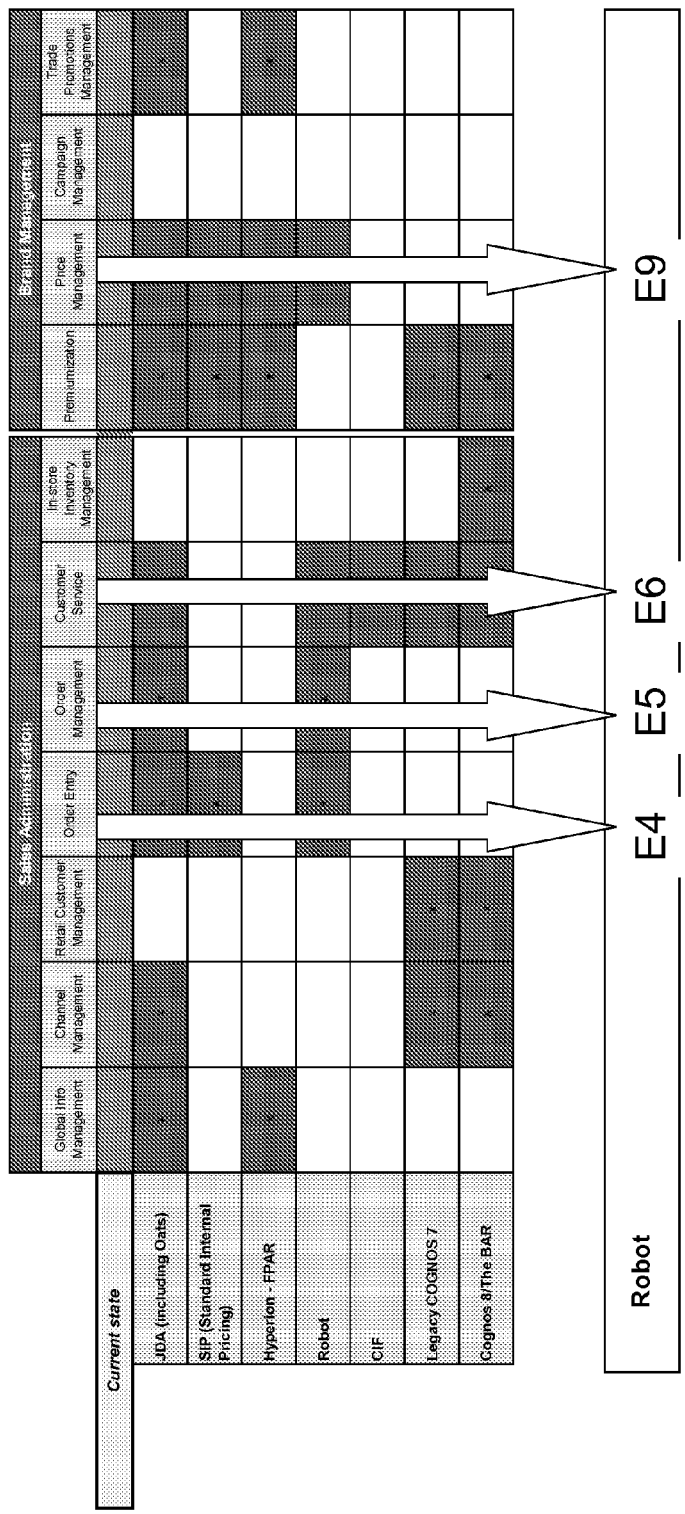
FIG. 62 illustrates how an application can intersect multiple business activities.
Figure 63:
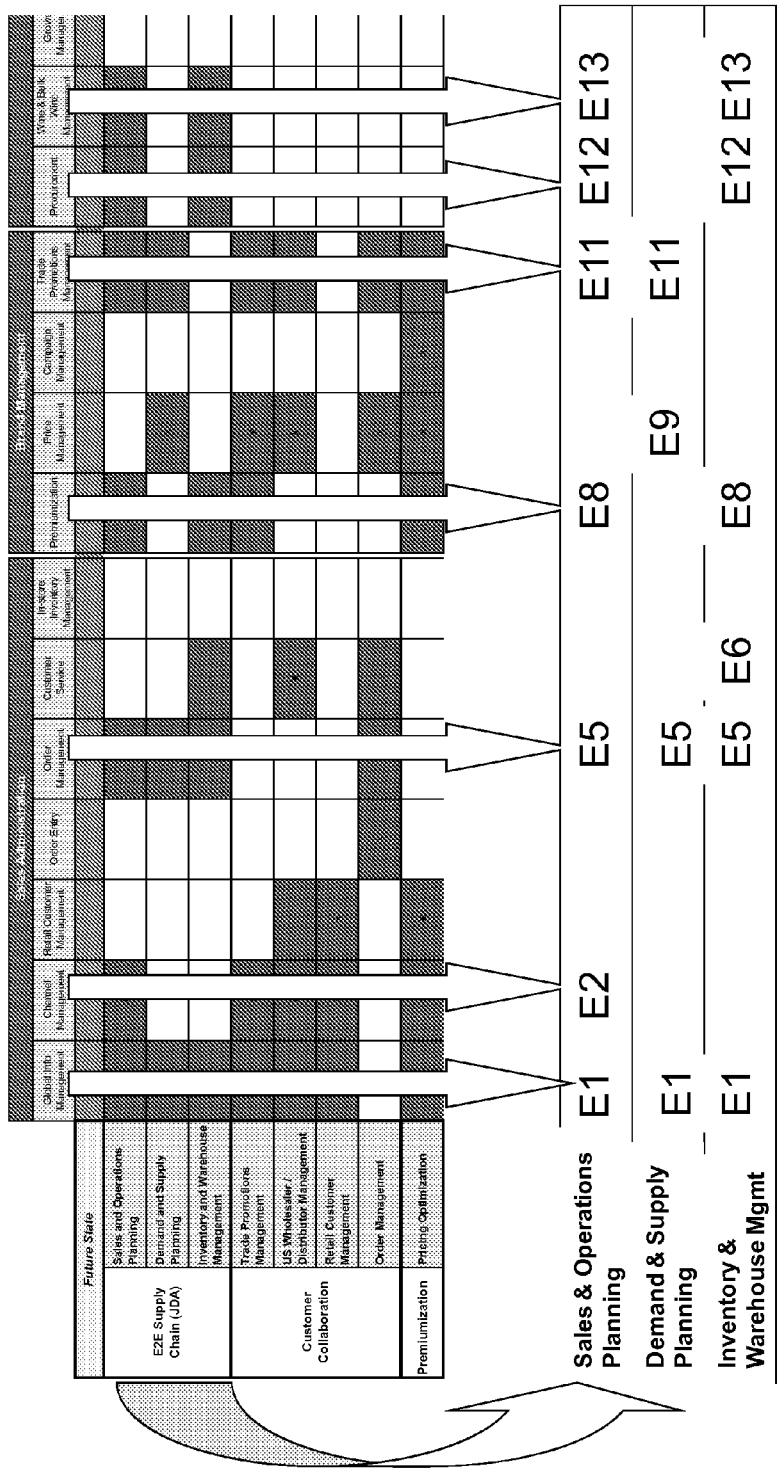
FIG. 63 illustrates how future state application functionality can be planned to intersect multiple business activities.

Notably, though, as an entire business value chain obviously crosses multiple legs of an IT supply chain, the use of multiple ensembles will usually be required to address an organization's business value chain. This is why, as described above, ensembles are combined to form a processing execution destination for the IT supply chain. This also provides the basis for automated reasoning about how the alignment or fit between quality profiles can be used to guide the automated configuration of ensembles and PEDs, Similarly to how a business value chain crosses multiple legs of an IT supply chain, business applications can intersect several business activities. For example, FIG. 62 illustrates how, in a current state, a "robot" application intersects order entry, order management, customer service, and price management business activities, and FIG. 63 illustrates how future state application functionality can be planned to intersect multiple business activities.

Figure 64:
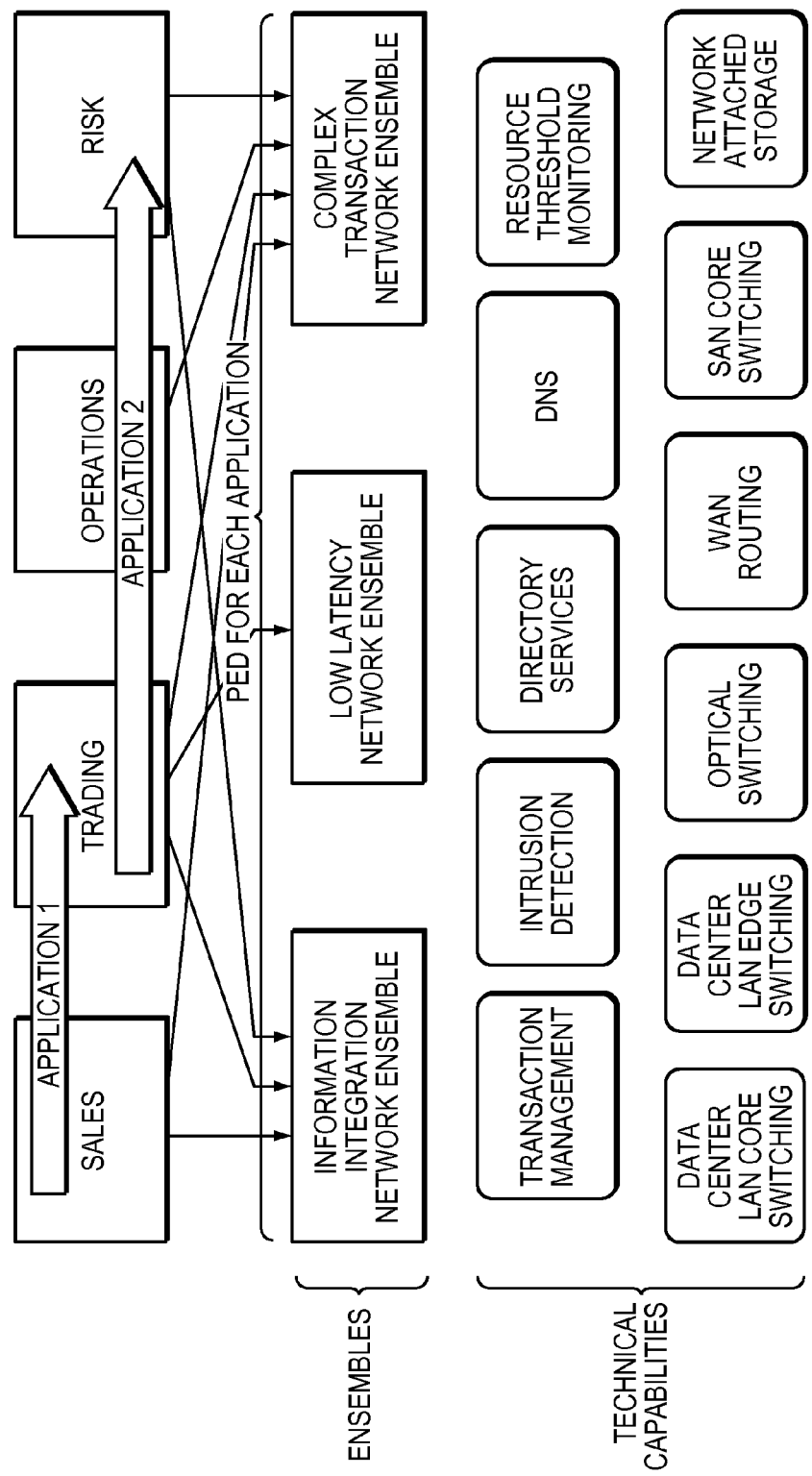
FIG. 64 illustrates two applications that each cross over two business functions.

FIG. 64 illustrates two applications that each cross over two business functions, and the mapping of various of these business functions to ensembles of a processing execution destination.

A method for automatically estimating the appropriate ensembles for use in a PED starts by mapping an application or service to one or more business activities. Next, identified key performance indicators or business demand characteristics can be utilized to predict an optimal quality profile that best fits those KPIs or demand characteristics. There are then several options for proceeding to derive candidate best fit ensembles.

A first option is to derive candidate ensembles based on an application quality profile. This application quality profile can be created from scratch, or can leverage imported business activity quality profiles, which in one or more preferred implementations might use a database of Bayesian prior frequencies that a particular quality in the quality profile occurs across many organizations having the same business activity. Specifically, an application quality profile could be synthesized from the business activity quality profiles for all of the business activities the application has been mapped to. This synthesis could be accomplished by various techniques which may include, for example, comparing and selecting quality by quality, deriving an average quality profile across business activities, selecting qualities based on a majority basis, or ranking business activities by importance to the application and deriving qualities from the highest ranked business activities. This application quality profile can then be customized using the optimal quality profile as a point of departure and adjusting for specific workload requirements. FIG. 65 illustrates pseudo control instructions for a machine for carrying out this method.

A candidate best fit ensemble list can then be derived, e.g., by utilizing Bayesian logic based on the application quality profile. FIG. 66 illustrates pseudo control instructions for carrying out this method by utilizing geometric mean calculation to simulate a simplified BBN-type of calculation.

Preferably, multiple ensembles will be selected if the best match has a score lower than a first threshold value such as seventy percent. If the best match is below this first threshold value, then all ensembles with a score greater than a second threshold value, such as thirty percent, can be selected.

A second option is to leverage business activity to IT supply chain mappings. Specifically, functional patterns such as application patterns can be matched based on the IT supply chain legs that business activities are mapped to. Ensembles can then be derived, with less accuracy, based on application patterns. This may be desirable as an alternative in cases where detailed knowledge of business activities is unknown.

A third option is to derive candidate ensembles based on representative ensembles selected based on business activity quality profiles. Candidate ensembles can be derived based on the majority of business activities, a ranking of the importance of business activities, or a best match by average ensembles of business activities.

The first and third of these options are perhaps most applicable for future state applications which are planned on the basis of the business activities that they will service and are not yet implemented, while the second option is perhaps most applicable for current state applications where detailed knowledge of business activities is incomplete or unknown.

This illustrates the flexibility of one or more preferred implementations to be used for the automation of a variety of methods based on the situational context of the user. In at least some implementations, further options are available, which may also be based on the automation of reasoning about patterns, ensembles, and PEDs based on the different kinds of quality profiles described previously. For example, in at least some preferred implementations, alternatively to, or in addition to, the top-down examples cited above, a bottom-up forensic-based analysis is implemented where, instead of using quality of experience profiles, platform and configuration profiles are used as the basis for the automated reasoning.

Figure 67:
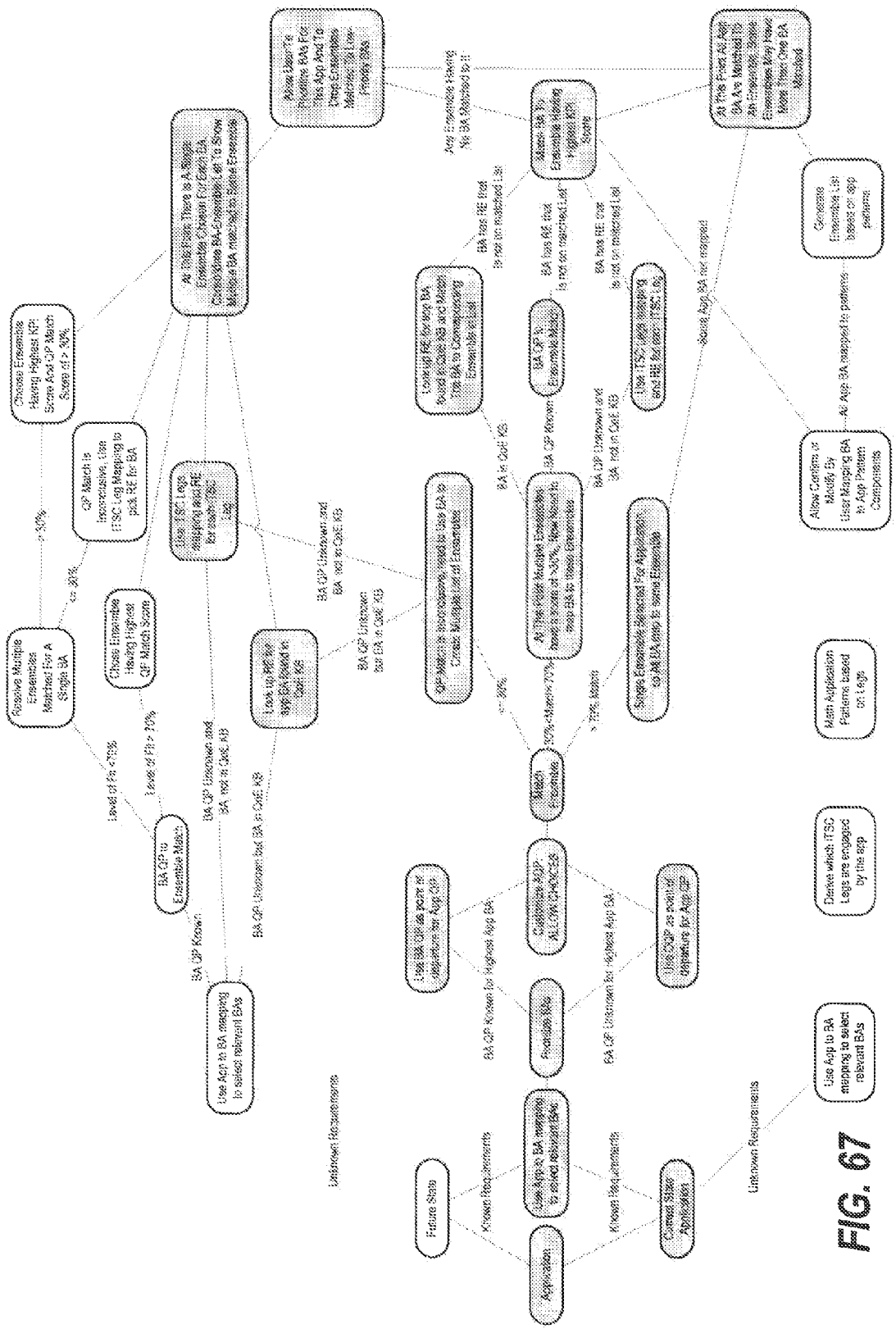
FIG. 67 illustrates a flowchart detailing exemplary decision logic.

FIG. 67 illustrates a flowchart detailing exemplary decision logic that can be utilized synthesizing these options.

First, a determination is made as to whether an application is a current state application or a future state application. If the application is a current state application, then a determination is made as to whether it has known requirements or unknown requirements.

If the application is a current state application, and it has unknown requirements, an application to business activity mapping is utilized to determine relevant business activities. These business activities are then utilized to determine which IT supply chain legs are engaged by the application. This allows for matching to application patterns based on the selection of these legs. At this point, a user can confirm presented application pattern matches, or modify a match by mapping a business activity to application pattern components. If, following this, all application business activities are mapped to patterns, then an ensemble list is generated based on these patterns. If, on the other hand, some business activities are not mapped, those business activities are matched to an ensemble based on key performance indicators. Either way, following this, all application business activities will be matched to an ensemble, although some ensembles may have more than on business activity matched thereto.

If the application is a future state application, and it has unknown requirements, the process once again begins by using an application to business activity mapping to determine relevant business activities.

For each business activity, if a quality profile for that business activity is available, that quality profile is matched to ensembles. FIG. 68 illustrates pseudo control instructions for carrying out this method.

If a level of fit for one of the ensembles is greater than a threshold value, such as seventy percent, the ensemble having the highest score is selected. If no ensemble has a level of fit greater than seventy percent, but one or more ensembles have a level of fit between a different threshold value, such as thirty percent and the seventy percent threshold value, the ensemble having a level of fit greater than thirty percent and the highest key performance indicator score is selected. If no ensemble has a level of fit greater than thirty percent, an IT supply chain leg mapping may be utilized to select a representative ensemble for the business activity. In a preferred embodiment, the threshold values would be set initially on a subjective basis and using Bayesian techniques be updated based on the frequency that the users accept the automated recommendations made. In at least some preferred implementations, other techniques for adjusting the threshold values may be utilized.

Similarly, if no quality profile is available for a business activity, and if the business activity is not in a quality of experience knowledge base, an IT supply chain leg mapping may be utilized to select a representative ensemble for the business activity. If the business activity is in a quality of experience knowledge base, a representative ensemble for the business activity is looked up from the knowledge base.

Either way, a single ensemble will have been selected for each business activity. This list of business activities and matching ensembles can be consolidated to show multiples business activities that are matched to the same ensemble. At this point, a user can prioritize business activities for the application and can even drop ensembles matched to low priority business activities. If a user drops an ensemble, then every business activity having no ensemble matched to it will be matched to one of the remaining ensembles based on key performance indicators.

Following this, all application business activities will be matched to an ensemble.

If the application is a current state or future state application with known requirements, the process once again begins by using an application to business activity mapping to determine relevant business activities. Next, business activities are prioritized. If a business activity quality profile is available for the highest priority business activity, then that business activity quality profile is utilized as the point of departure for an application quality profile. If a business activity quality profile is not available for the highest priority business activity, then an optimal quality profile based on key performance indicators is utilized as the point of departure for an application quality profile.

Either way, a user is allowed to customize the application quality profile. Next, the application quality profile is matched to ensembles. If there is an ensemble with a level of fit greater than a threshold value such as seventy percent, than the ensemble with the highest level of fit is selected for the application, and all business activities are mapped to this ensemble.

If there is no ensemble with a level of fit greater than a threshold value such as seventy percent, but there are one or more ensembles with a level of fit greater than a different threshold value such as thirty percent but less than seventy percent, then each business activity will need to be mapped to an ensemble. For each business activity, if a business activity's quality profile is known, then the business activity's quality profile is matched to an ensemble. If the business activity is in a quality of experience knowledge base, then the representative ensemble for that business activity is looked up from the quality of experience knowledge base. If the business activity's quality profile is not known and the business activity is not in a quality of experience knowledge base, then an IT supply chain leg mapping is utilized to select a representative ensemble for the business activity. Either way, for each business activity, if a representative ensemble is matched that is not on a matched list, that ensemble is added to the matched list, and an ensemble is then selected from the matched list based on key performance indicators.

If there is no ensemble with a level of fit greater than the lower threshold value of say thirty percent, and if no quality profile is available for a business activity, then it is determined whether the business activity is in a quality of experience knowledge base. If the business activity is not in a quality of experience knowledge base, an IT supply chain leg mapping may be utilized to select a representative ensemble for the business activity. If the business activity is in a quality of experience knowledge base, a representative ensemble for the business activity is looked up from the knowledge base. Either way, a single ensemble will be selected for each business activity. This list of business activities and matching ensembles can be consolidated to show multiples business activities that are matched to the same ensemble. At this point, a user can prioritize business activities for the application and can even drop ensembles matched to low priority business activities. If a user drops an ensemble, then every business activity having no ensemble matched to it will be matched to one of the remaining ensembles based on key performance indicators.

Following this, all application business activities will be matched to an ensemble.

Once candidate best fit ensembles are selected, a predictive heat map of quality fit can be derived for these ensembles comparing them to the optimal quality profile, and one or more best fit ensembles can be identified.

Next, processing execution destination engineering considerations can be identified based on consolidation of engineering rules for each selected ensemble. Similarly, required technical capabilities can be identified based on consolidation of pre-defined lists of component technical capabilities for each selected ensemble.

Optionally, physical partitioning can next be specified. This could be accomplished by, first, identifying functional partitioning of an application based on business activities having the same best fit ensembles. Business activities with the same best fit ensemble can be grouped together in the same functional partition, while business activities having different best fit ensembles usually should be in different partitions (although this might be dependent on an amount of collaboration). Notably, application or service specific requirements might cause it to make sense to utilize partitioning of mismatched best fit ensembles (e.g., an application function in one ensemble might need to invoke an application service in another ensemble). Lastly, a processing execution destination design can be generated and application partitions can be allocated to processing execution destinations.

Similarly to how it is possible to calculate an optimal quality profile, it is possible to calculate optimization suggestions. FIG. 60 illustrates pseudo control instructions for the optimization of a project quality profile.

Blueprint Dimensions

The above description describes exemplary methods for characterizing demand of an organization and systems to address this demand, e.g., systems that supply resources to address this demand.

In characterizing demand and supply, however, selecting an approach to facilitate IT decision making requires consideration of a scope of use. For example, a user could be trying to solve a point problem or working on one application. This type of view has a very narrow scope relative to the large problem sets most organizations have. Alternatively, consideration of multiple applications could be undertaken. This would be a much broader scope. These broad and narrow scopes could drive very different approaches.

Similarly, different time horizons could be examined. For example, a user could undertake an analysis based on a current state of IT (current state), design future IT (future state), or consider a transition from a current state to a future state (transition state).

The two choices of scope and the three choices of time horizon together provide six major decision content groups with which to work in when making infrastructure changes.

Figure 70A:
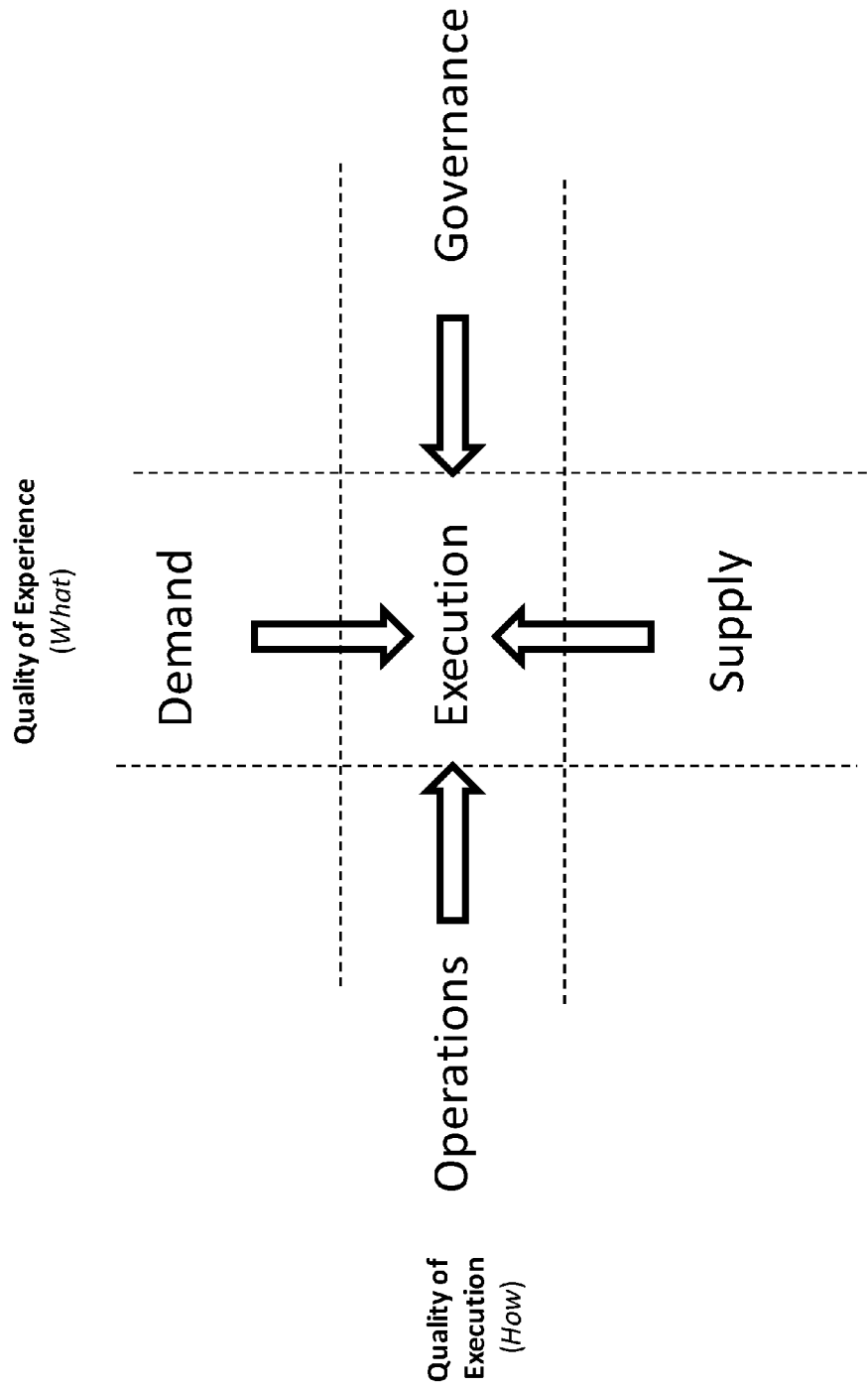
FIGS. 70A-B and FIG. 71 illustrate supply, demand, operations, governance, and execution dimensions.
Figure 70B:
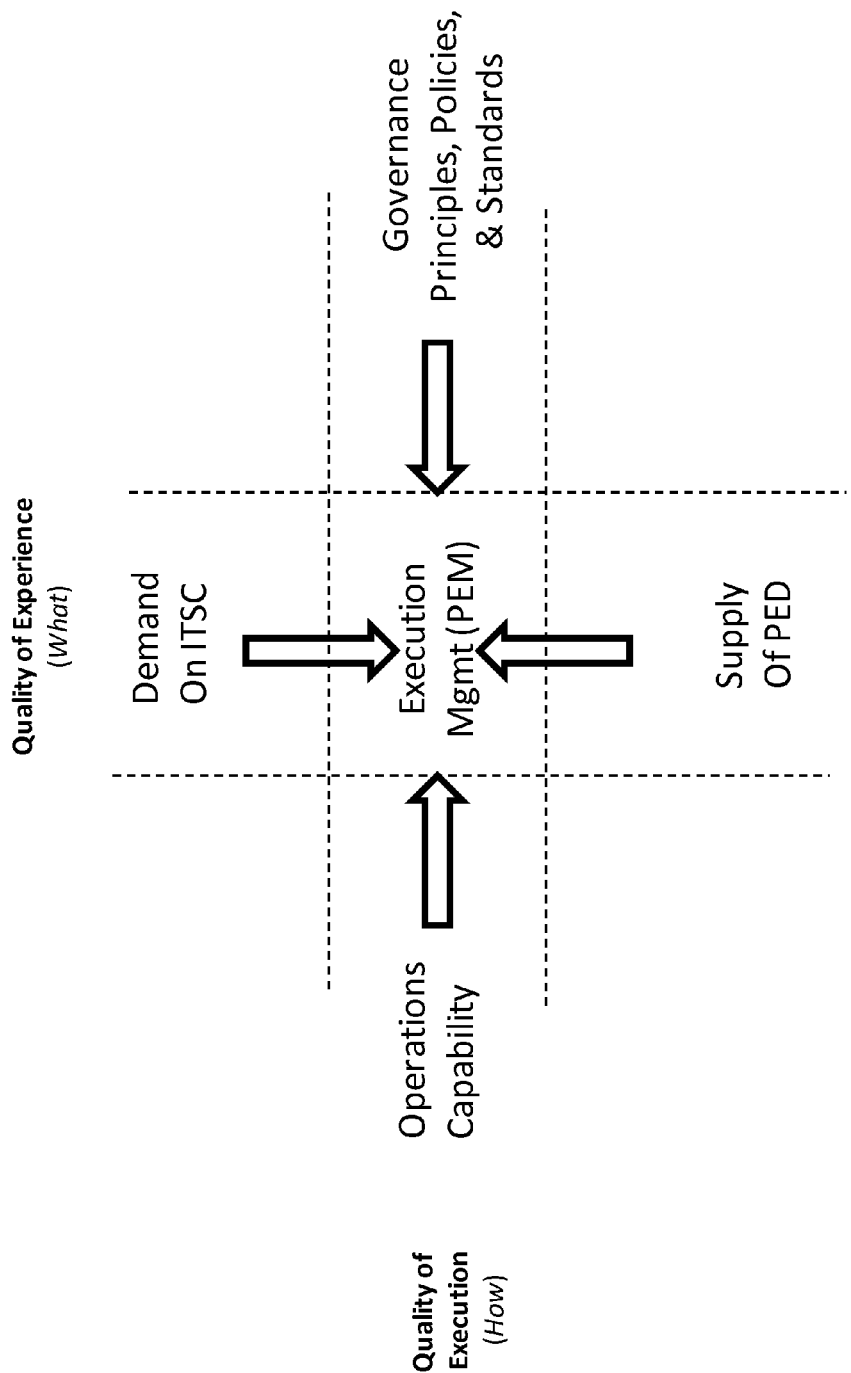

This demand and supply is also useful for organizing architecture blueprints. As illustrated, this supply and demand ideally meet in an execution dimension, where, for example, demand of an organization is met by a processing execution destination, as illustrated in FIG. 70.

Figure 69A:
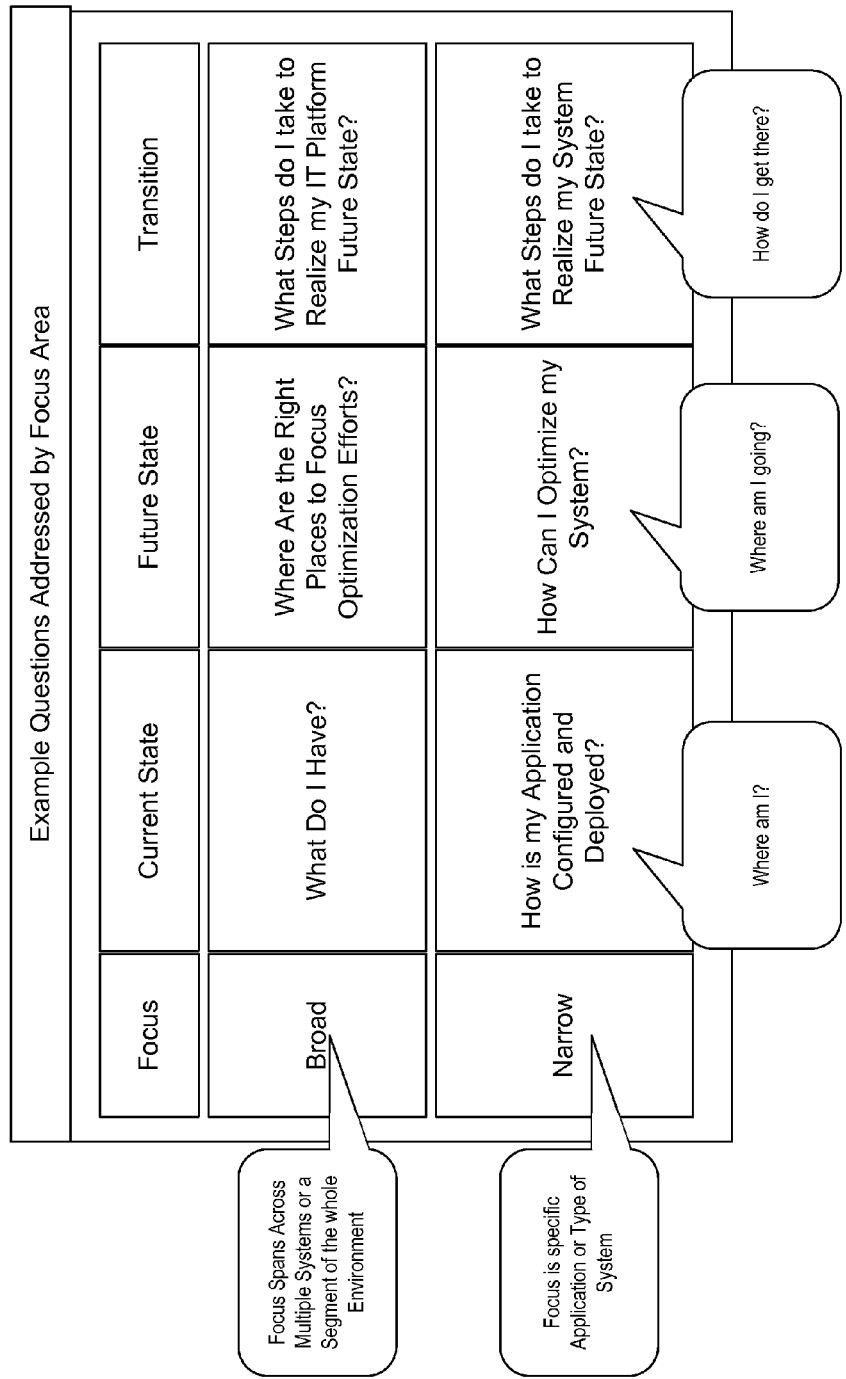
FIGS. 69A-B illustrate how choices of scope and time horizon together provide six major decision content groups with which to work in when making infrastructure changes.
Figure 69B:
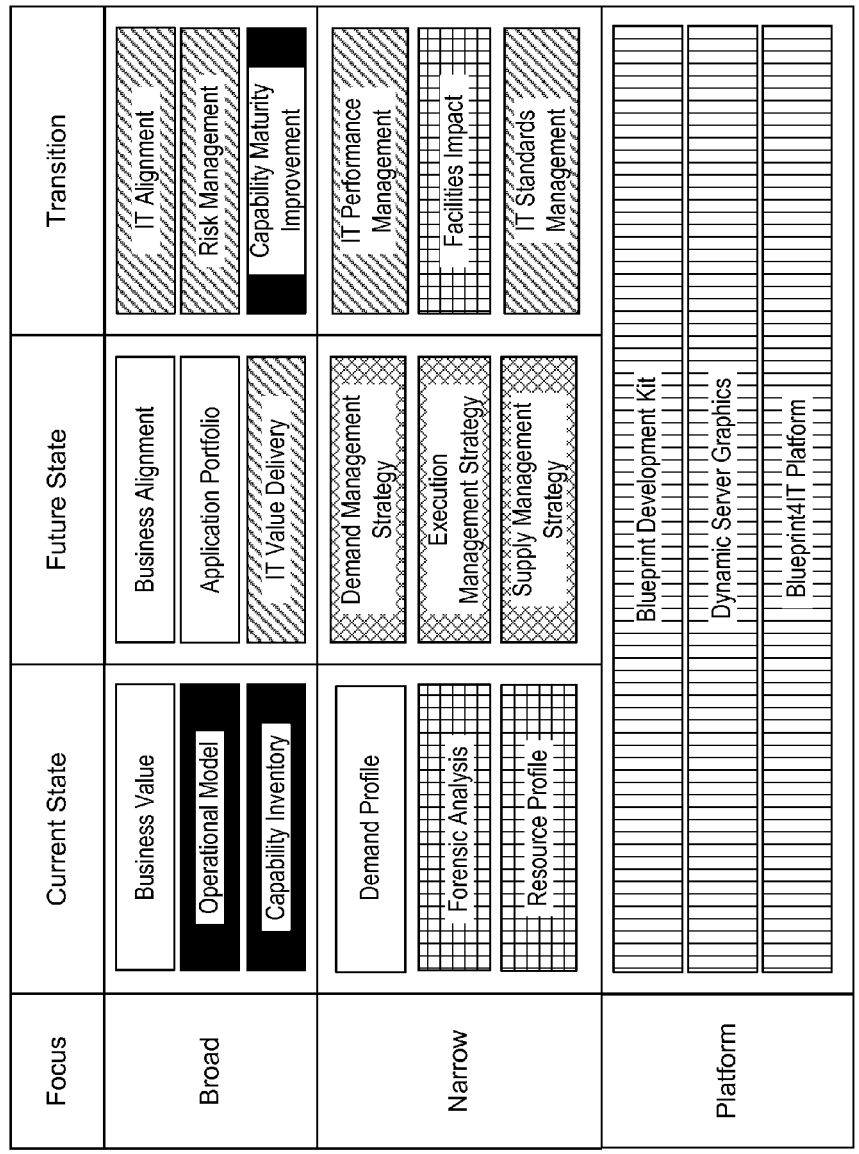

Specifically, the results of the automated reasoning described above can be organized systematically into an orthogonal set of dimensions for automatically generating IT architecture blueprints for building processing execution destinations. FIG. 69 visualizes this relationship.

Figure 71:
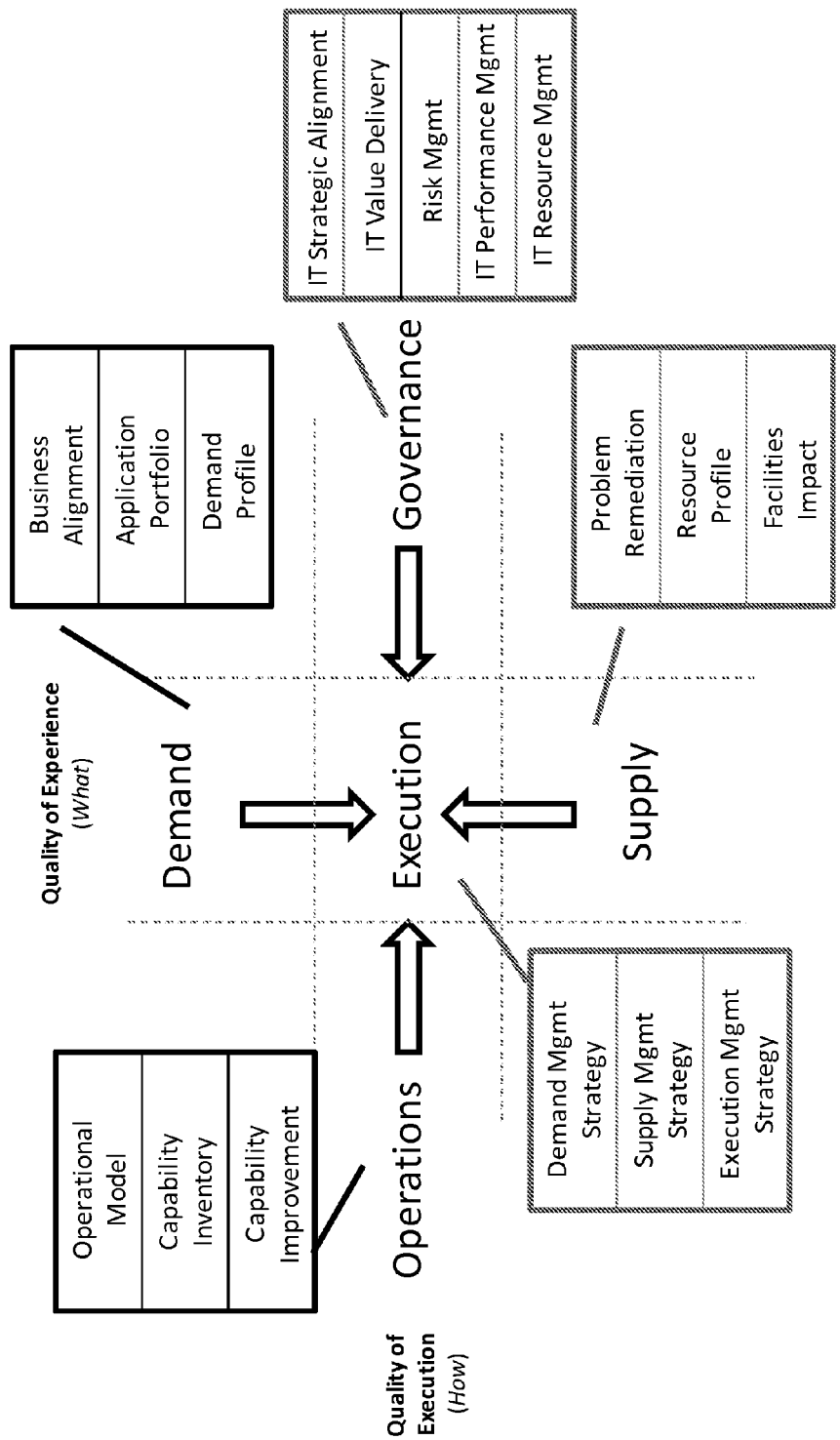

This execution dimension is managed by two additional dimensions pertaining to operations and governance. Together, these five dimensions can be characterized as providing a universe for blueprints for information technology, i.e., an IT blueprint, as illustrated in FIG. 71.

Demand Dimension

The purpose of the demand dimension is to align IT to business needs. With respect to the demand dimension, an IT blueprint preferably summarizes business process requirements and describes workload in the context of business processes. A blueprint can also present information about a portfolio of applications (e.g., the infrastructure of many applications). These goals are preferably accomplished by describing a business (e.g., utilizing a business value chain), understanding alignment of one or more applications to a business value chain, profiling a workload shape via quality of experience (e.g., a quality of experience profile of a workload pattern), profiling workload distribution utilizing functional patterns, and profiling workload volume utilizing peak period characteristics.

The demand dimension can be described utilizing information related to business alignment, application portfolios, and demand profiles.

With respect to business alignment, a line of business (LoB) of an organization can be characterized as determining a business value chain and business drivers for that organization. This business value chain includes business functions and business activities, as described hereinabove. Each of these business activities can be characterized as a business capability of the organization. The business drivers for an organization can be translated to key performance indicators (KPIs) for each business function.

Information relating to business alignment details lines of business of an organization and the business value chains and business drivers for each line of business, a breakdown of each business value chain into business functions by business value chain legs, and business drivers for each business function (which represent external characteristics of the business environment), as well as business demand characteristics for each business function (which represent internal characteristics within the business). This information also preferably details business challenges for each business function, which represent business problems (preferably independent of IT terminology), as well as IT supply chain problems for each business function (e.g., the top three might be shown). This information preferably further includes key performance indicators for each business function, which can be characterized as being related to business challenges. This information preferably still further illustrates how business capabilities can be equivalent, or map to, business activities (notably, for some large business functions, a view of multiple levels may have to be provided).

Business alignment content can be organized and displayed in various ways, e.g., at various levels of granularity from various viewpoints. Preferred methodologies of display include a display of a business value chain showing business functions by business value chain legs, a display of a line of business showing business drivers by business function, a display of a business value chain showing key performance indicators by business function, a display of a business value chain showing business capabilities by business function, a display of a business value chain showing business challenges by business function, and a display of three top IT supply chain problems by business function.

An organization can be characterized as including an application portfolio. A current state of an application portfolio for an organization would include an application inventory for each business function and/or activity. These application inventories would detail application and infrastructure services for each application in a business function and/or activity. Preferably, a future state application portfolio can be designed utilizing applications aligned to business processes, where each business process comprises one or more workloads across a business activity, and a workload represents a use case through an application.

Information relating to an application portfolio details a current state, i.e., an application inventory per business function and/or activity, as well as a future state showing applications aligned to business processes. This information preferably also details common services, which represent shared services between applications. A common service might be an infrastructure service oriented architecture service or a service oriented architecture business service offered by an application. Common services are consumed by applications.

Application portfolio content can be organized and displayed in various ways, e.g., at various levels of granularity from various viewpoints. Preferred methodologies of display include a display of a business value chain showing business processes by business value chain, a business value chain showing business activities by business process, a business value chain showing current applications by business activity, a business value chain showing business processes with application associations, a business value chain showing future state alignment of applications to business activities, a service oriented architecture manifest showing services consumed and offered for each application, and a services inventory showing applications by shared service (i.e., what applications use the same shared service).

Demand profiles can be generated at various levels of granularity and scope. A demand profile for a leg, or link, of a business value chain describes a representative workload for a business function. A quality profile for a business activity describes a representative workload for a business activity, which can be characterized as a canonical shape of demand. A workload quality profile describes the shape of demand for a workload. A functional pattern can be characterized as describing a distribution of demand within a workload. Peak period characteristics describe a dimensioning peak volume of unit of work for a workload, i.e., a volume of demand.

Information relating to demand profiles includes business function demand characteristics for a business value chain leg, business activity quality profiles showing representative workloads per business activity, workload quality profiles showing a shape of demand per workload, functional patterns showing distribution of demand within a workload, known problems per functional pattern linked to functional components, and peak period characteristics.

Demand profile content can be organized and displayed in various ways, e.g., at various levels of granularity from various viewpoints. Preferred methodologies of display include a display of workload quality profiles by business value chain leg, workload quality profiles by business activity, workload quality profiles by business process, functional patterns by business process, functional pattern components by functional pattern, known problems by functional pattern, workload quality profile linkage to key performance indicator dimensions, business activity to functional pattern allocation, data qualities by business process, workloads by business process, workload volume detail by business process, security qualities by business process, and network qualities by business process.

Execution Dimension

The purpose of the execution dimension is effective balancing of supply and demand. With respect to the execution dimension, an IT blueprint preferably describes workload imprint on infrastructure, defines workload management policies, demonstrates optimal utility usage, defines resource allocation policies, and defines processing execution destination management infrastructure (PEM). These goals are preferably accomplished by defining logical architecture utilizing static deployment patterns, using information patterns to derive data, security, and network policies, using ensembles to define high level resources, define a resource allocation strategy, deriving runtime services from ensembles and the resource allocation strategy, profiling expected resource consumption, and defining PEM infrastructure required to control and monitor observed resource consumption.

Figure 72:
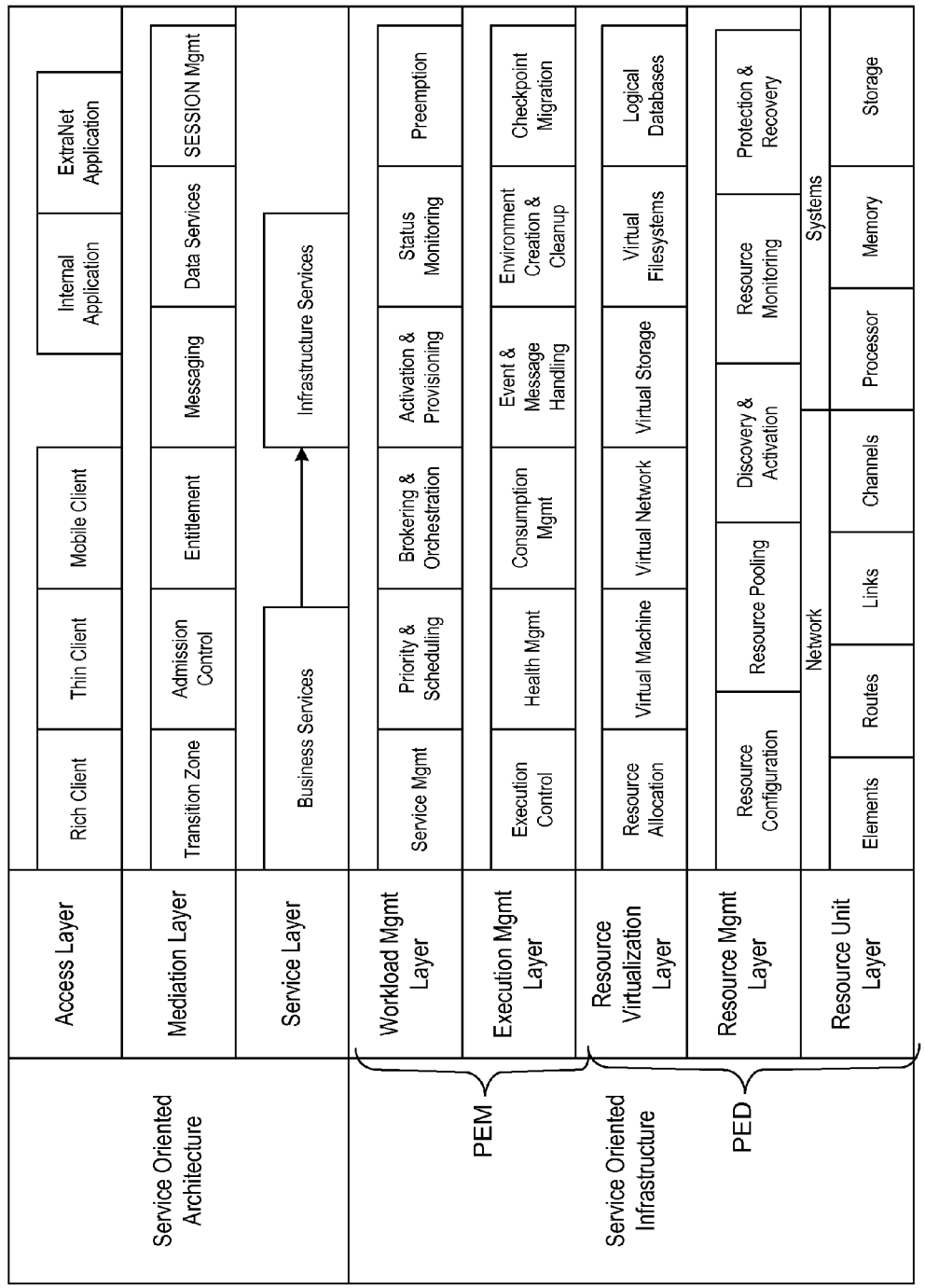
FIG. 72 illustrates how service oriented infrastructure, service oriented architecture, a processing execution destination, and a processing execution destination management infrastructure can be mapped to an enterprise stack.

The execution dimension can be described utilizing information related to demand management strategy (associated with service oriented architecture), supply management strategy (associated with service oriented infrastructure), and execution management strategy. FIG. 72 illustrates how service oriented infrastructure, service oriented architecture (notably, the phrases infrastructure and architecture may each be utilized herein to describe both architecture and infrastructure, although in this description a distinction is made), a processing execution destination, and a processing execution destination management infrastructure can be mapped to an enterprise stack.

With respect to demand management strategy, logical architecture can be characterized by a logical (static) deployment model, e.g., static deployment patterns can be utilized as architecture design templates. A workload allocation policy details the relative priority of workloads over time. Preferably, a predicted resource impact and resource pool dimensioning are available and utilized. Similarly, observed resource consumption is preferably available, e.g., via forensic heat map.

Information relating to demand management strategy includes information pertaining to logical architecture, workload resource consumption ratios (i.e., resource occupancy/unit of work, which, when multiplied by peak volume produces a resource utilization forecast, which is preferably also included), and workload priority information.

Demand management strategy content can be organized and displayed in various ways, e.g., at various levels of granularity from various viewpoints. Preferred methodologies of display include a display of logical architecture showing static deployment patterns, forecasted resource utilization per deployment pattern component, workload priority aligned to business priorities, deployment patterns by deployment pattern family, functional component allocation to deployment patterns, predicted quality of experience heat map based on ensembles, predicted resource heat map based on ensembles, forensic heat maps, forensic heat map synthesis, and forensic event annotations.

With respect to supply management strategy, server ensembles can be characterized as a fit for purpose server (container) for a workload. Information policies describe data, network, and security usage for a workload. A resource allocation policy identifies whether resource allocation is static, virtual, time pivoting, dynamic, or cloud based.

Supply management strategy content can be organized and displayed in various ways, e.g., at various levels of granularity from various viewpoints. Preferred methodologies of display include a display of ensemble mappings by quality profile, ensemble fit analysis results, server ensemble technical capability details, business applications allocated to ensembles, a predicted quality heat map based on ensembles, security ensembles, security policies by information pattern for security, security policy technical capability manifests by information pattern used, storage ensembles, data policies by information pattern for data, data policy technical capability manifests by information pattern used, network ensembles, network policies by information pattern for networks, network policy technical capability manifests by information pattern used, resource allocation policy details, database server technical capability information, and forensic storage usage.

Execution management strategy relates to processing execution destination management infrastructure capabilities and runtime services, e.g., surround services per architecture stack layer. Information relating to execution management strategy includes information pertaining to predicted impact and resource pool dimensioning (sizing), PEM infrastructure technical capabilities (e.g., monitoring, security, network management, and provisioning), observed resource consumption (e.g., via a forensic heat map), and runtime services.

Execution management strategy content can be organized and displayed in various ways, e.g., at various levels of granularity from various viewpoints. Preferred methodologies of display include a display of resource pool sizing analysis, a monitoring technical capabilities manifest, and an execution management services stack.

Supply Dimension

The purpose of the supply dimension is to optimize the use of resources. With respect to the supply dimension, an IT blueprint preferably determines an optimal quantity of resources by type, illustrates an amount of resource reuse, shows remediated problems, a logical architecture, and physical engineering models, and illustrates a next generation data center (i.e., an optimized future IT configuration).

These goals are preferably accomplished by sizing and dimensioning processing execution destinations as pools of resources, mapping resource units onto processing execution destinations, identifying reuse opportunities, remediating known problems, and profiling resource impact on facilities.

The supply dimension can be described utilizing information related to problem remediation, resource profiles, and facilities impacts.

Information relating to problem remediation includes information pertaining to known problems (KPs) having a known cause, known problems by functional pattern, known problems by deployment pattern, known problems by information pattern, known problems by capability. Preferably, a forensic heat map and information related thereto are provided as well.

Problem remediation content can be organized and displayed in various ways, e.g., at various levels of granularity from various viewpoints. Preferred methodologies of display include a display of mappings of workload symptoms to known problems for functional patterns, performance/availability symptoms to known problems for deployment patterns, security symptoms to known problems for information patterns, network types, network symptoms to known problems for information patterns, storage symptoms to known problems for information patterns, usage symptoms to technical capability related known problems for technical capabilities, execution symptoms to PC related known problems for process capabilities, known problems to known remediations for functional patterns, known problems to known remediations for deployment patterns, known problems to known remediations for security, storage, and network information patterns, known remediations to a capability summary, and a forensic heat map to symptoms. Preferably, display of security domains and storage types can also be provided.

Information relating to resource profiles includes information detailing processing execution destinations as pools of fit for purpose resources. Elasticity tactics include a virtualization strategy (thin provisioning), resource orchestration strategy (resource pivoting), and resource sourcing strategy (cloud resources). A resource inventory details how much of each type of resource is available (including appliances optimized to efficiently execute specific workload types). A virtual resource inventory details what resources are virtualized and how they map to physical resources. Preferably, a workload quality of experience to service continuity mapping is provided.

Resource profile content can be organized and displayed in various ways, e.g., at various levels of granularity from various viewpoints. Preferred methodologies of display include display of processing execution destination capability manifests, processing execution destination sizing analysis, processing execution destination virtual to physical allocation, thin provisioning rules, storage tiers, resource inventory usage schedules by resource type, resource inventories by application, a resource reuse summary, and processing execution destination service continuity aspects.

Information relating to facilities impacts includes a footprint consumption profile detailing a processing execution footprint as a function of time, a power consumption profile detailing processing execution destination power required as a function of time, a cooling consumption profile detailing processing execution destination cooling required as a function of time, and processing execution component physical requirements (e.g., rack unit sizes, power, heat).

Facilities impact content can be organized and displayed in various ways, e.g., at various levels of granularity from various viewpoints. Preferred methodologies of display include display of footprint consumption (rack view) profiles per processing execution destination, footprint consumption (floor view) profiles per processing execution destination, footprint cost analysis per processing execution destination, power consumption profiles per processing execution destination, power cost analysis per processing execution destination, cooling consumption profiles across processing execution destinations, cooling cost analysis per processing execution destination, facilities cost analysis per processing execution destination, a next generation data center financial summary, and external cloud cost information.

Operations Dimension

With respect to the operations dimension, an IT blueprint preferably illustrates an operational model, highlights major operational policies, summarizes operational maturity, and provides a capability improvement roadmap.

The operations dimension can be described utilizing information related to an operational model, a capability inventory, and capability improvement.

Figure 73:
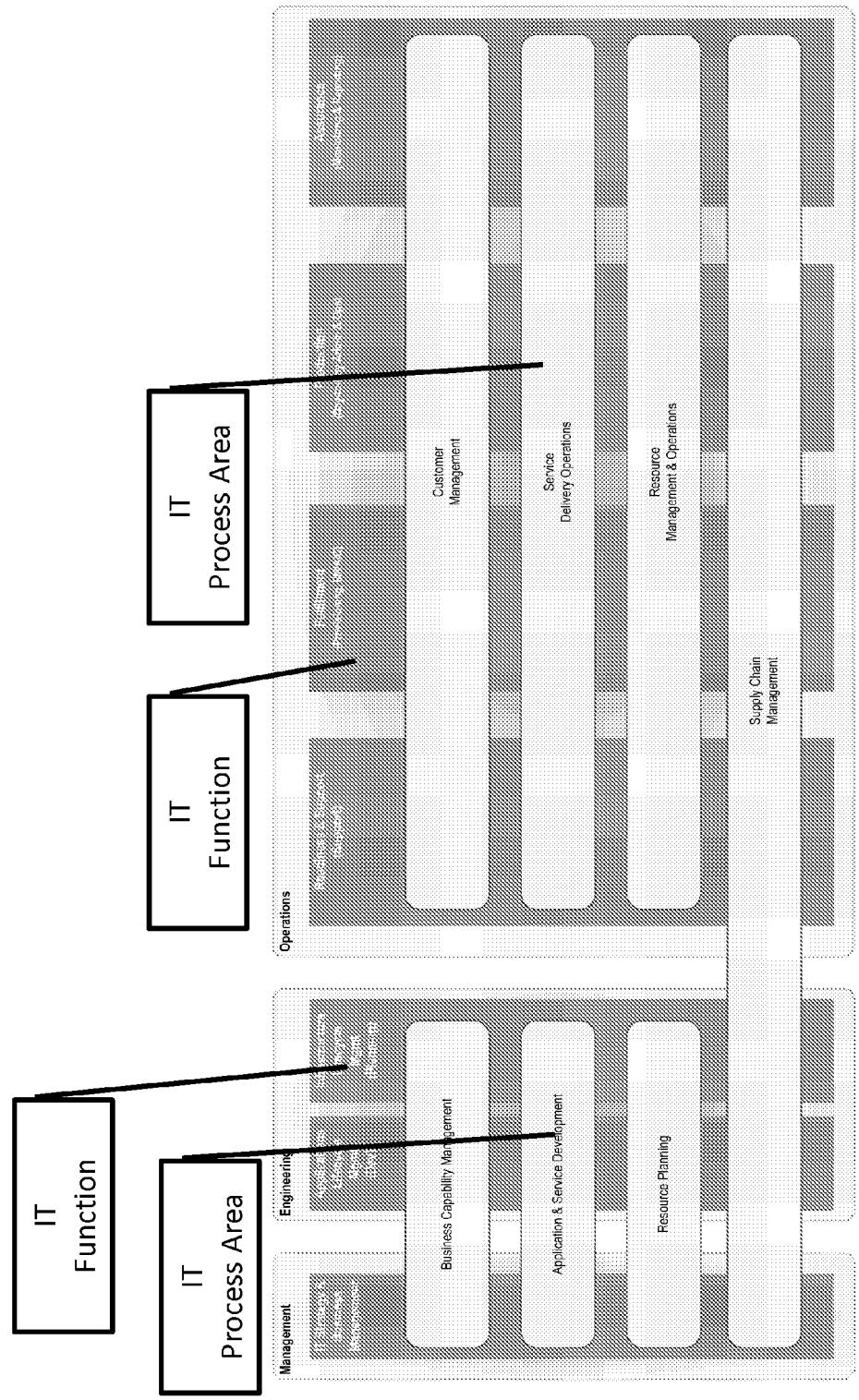
FIG. 73 illustrates an exemplary operational model.

Information relating to an operational model includes information related to IT functions, IT process areas, operations policies and standards, and resource maintenance requirements (e.g., planned unavailability, upgrades, backups, patches, hardware service, change management, etc.). FIG. 73 illustrates an exemplary operational model.

Operational model content can be organized and displayed in various ways, e.g., at various levels of granularity from various viewpoints. Preferred methodologies of display include display of IT organization by IT function, IT organization by IT process area, operational policy technical capability details, operational policy process capability details, and resource maintenance and planned unavailability schedules.

Information relating to a capability inventory includes a technical capability assessment, a view of technical capabilities by enterprise stack by maturity level, a process capability assessment, a view of process capabilities by IT function and IT process area, a competency capability assessment, and a capability inventor, i.e., a summary of capability assessment findings.

Capability inventory content can be organized and displayed in various ways, e.g., at various levels of granularity from various viewpoints. Preferred methodologies of display include display of a process assessment detail report, a technical assessment detail report, a competency assessment detail report, process capabilities by IT process area, process capabilities by IT function, process capabilities by utility focus area for current maturity, technical capabilities by IT process area, technical capabilities by IT function, technical capabilities by utility focus area for current maturity, competency capabilities by IT function, a capability summary scorecard by IT function, a capability summary scorecard by IT process area, and a capability summary scorecard by utility focus area. FIG. 74 illustrates exemplary capability summary scorecards by IT function, IT process area, and utility focus area.

Capability improvement allows for the selection of targets and constraints. A focus area roadmap can be built from capability time and effort relative to an assessment. Capability improvement in operations preferably is near term in focus based on an IT function or IT process area lens. The governance dimension relates to longer term improvement based on a utility delivery lens.

Figure 75:
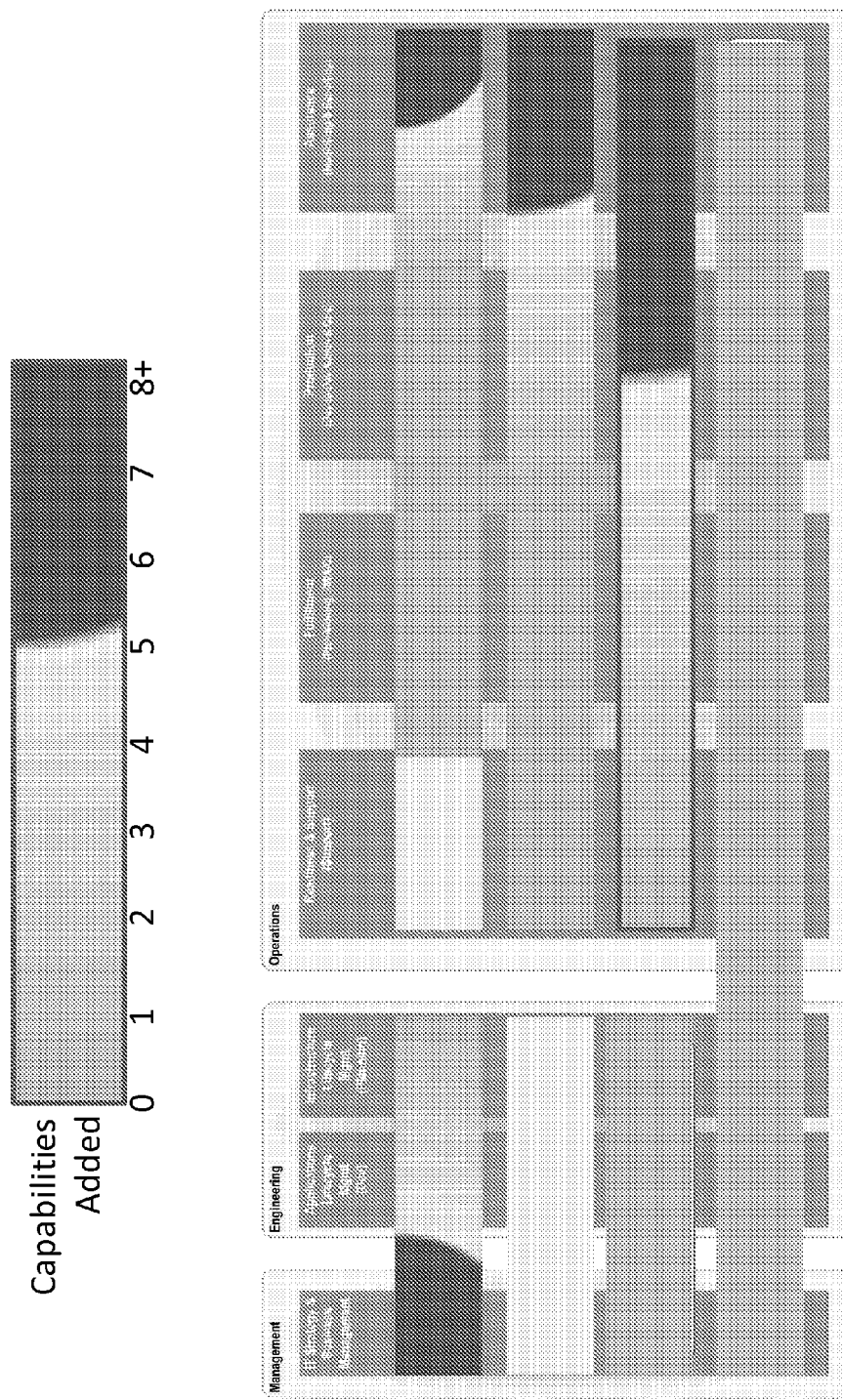
FIG. 75 illustrates an exemplary capability heat map.

Capability improvement content can be organized and displayed in various ways, e.g., at various levels of granularity from various viewpoints. Preferred methodologies of display include display of a capability heat map, focus area selections and constraints, and capability improvement program roadmaps. FIG. 75 illustrates an exemplary capability heat map.

Governance Dimension

The purpose of the governance dimension is to define how IT is accountable to an organization and to establish the policies and standards by which IT is to be managed. With respect to the supply dimension, an IT blueprint preferably establishes governance practices based on a recognized IT governance framework.

An exemplary IT governance framework includes strategic alignment, value delivery, risk management, standards management, and IT performance management governance domains. The strategic alignment governance domain relates to understanding the needs of a business, developing IT strategy and objectives, resource allocation and portfolio management, demand management, and communication. The value delivery governance domain relates to identifying project value drivers, identifying service value drivers, project management, and external benchmarking. The risk management governance domain relates to organizational risk appetite, project and investment risk mitigation, information security risk mitigation, operational risk mitigation, compliance regulatory mandates, and auditing. The standards management governance domain relates to hardware and software asset management, third party service provider management, standardized architecture, and financial management, e.g., service costing. The IT performance management governance domain relates to customer satisfaction, service level management, business value measurement, and process improvement.

In accordance with these governance domains, the governance dimension can be described utilizing information related to strategic alignment, IT value delivery, risk management, IT performance management, and IT standards management.

Strategic alignment encompasses IT planning objectives and priorities, e.g., key performance indicators for IT, such as, for example, to reduce cost or improve scalability. Strategic alignment further encompasses alignment measure and application portfolio management discipline and process.

Strategic alignment content can be organized and displayed in various ways, e.g., at various levels of granularity from various viewpoints. Preferred methodologies of display include display of IT planning objectives and key performance indicators, IT improvement programs by IT key performance indicators, IT improvement programs by IT function, strategic alignment scorecards, application future state portfolios, application future state transitions, and applications by portfolio process stage.

IT value delivery, which can also be characterized as utility value delivery, encompasses IT value models, information regarding utility utilization and value for money, and utility investment plans (e.g., detailing a proportion of investment in reusable infrastructure products and management tools).

IT value delivery content can be organized and displayed in various ways, e.g., at various levels of granularity from various viewpoints. Preferred methodologies of display include the display of value models by project initiative, value delivered summaries, utility utilization information, utility resource reusable capacity plans, and utility resource reuse by project.

Risk management encompasses IT policy standards and guidelines, operational risk mitigation, and architecture control. Risk management can encompass an architecture review process.

Risk management content can be organized and displayed in various ways, e.g., at various levels of granularity from various viewpoints. Preferred methodologies of display include the display of IT policies by IT function, IT policy compliance by application, architecture council strategic priorities, architecture review portfolio status, architecture review scorecards, architecture remediation action plans, operational risk reduction strategic priorities, operational risk reduction by capability, and operational risk reduction by capability by project.

IT performance management encompasses capability maturity, IT service accountability, customer satisfaction, IT competency improvement, chief technology officer related processes (e.g., product release, product research, etc.), and supplier performance assessments.

IT performance management content can be organized and displayed in various ways, e.g., at various levels of granularity from various viewpoints. Preferred methodologies of display include the display of service level agreements by business function, execution level agreements by processing execution destination, operation level agreements by application, capacity assessments by IT function, capability usage by IT project, capability improvement programs by IT function, and capability maturity improvements by utility focus area.

IT standards management encompasses architecture principles and standards, ensemble lifecycle management, architecture tradeoff analysis method (ATAM) standards selection, IT lab processes, IT sourcing evaluation, supply chain sourcing strategy, and application harvesting.

IT standards management content can be organized and displayed in various ways, e.g., at various levels of granularity from various viewpoints. Preferred methodologies of display include the display of architecture principles, policies, and standards, architecture standard usage by project, corporate architecture tradeoff analysis method standards, architecture tradeoff analysis method evaluations by technology capability, ensemble lifecycle plans, cloud sourcing policies, and outsourcing policies by operations function.

Business Application Life Cycle and Services Oriented Information Technology

The present invention is preferably consistent with the methodical decomposition of the life cycle of an application or service. After the decomposition, these decomposed factors may be processed to algorithmically identify the relevant documentation, best practices for the business application development, and relevant educational topics and technology options for the program or business application deployment.

Figure 76:
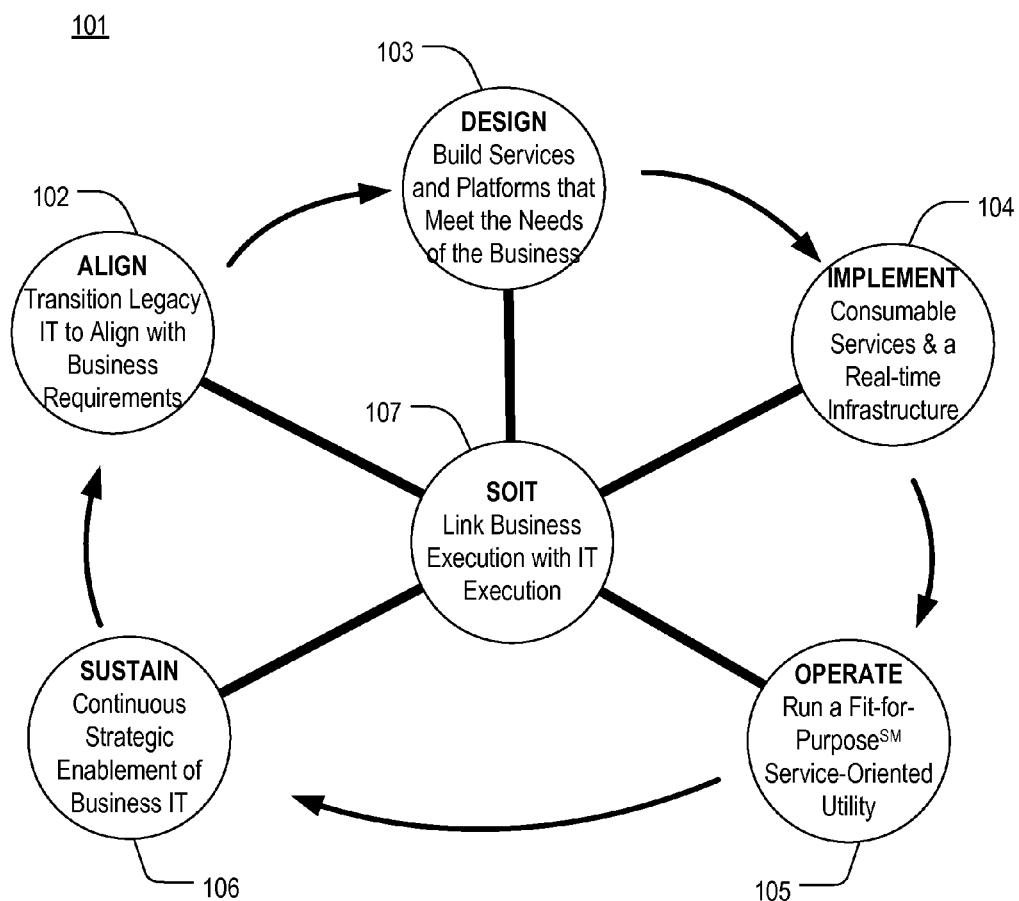
FIG. 76 is a block diagram illustrating a five segment approach to the business application life cycle.

In particular, in at least some embodiments, the invention is part of an integrated expert decision platform that takes a holistic view of the life cycle of a business application, based for example on a five segment approach to solving a business problem. FIG. 76 is a block diagram illustrating a five segment approach to the business application life cycle 101. As shown therein, a business application life cycle 101 may include four major areas 102,103,104,105 that a business application flows through during development. Additionally, the business application must preferably be sustained (represented by the Sustain block 106), continuing to exist, operate and potentially adapt to new business needs. The collection of steps or phases 102,103,104,105,106 (sometimes referred to herein as "ADIOS") converge to render a Services Oriented Information Technology (SOIT) 107 that has been created and aligned to business needs and optimized to deliver the required quality of service.

The phases 102,103,104,105,106 may be better understood as follows. Starting with the Align phase 102, significant analysis is performed to understand how a business application should perform, and what attributes it should exhibit. When a business application already exists, it is important to understand how the application works. As the existing business application is characterized through Align, the IT assets being consumed are defined. Using this input, an archaeologist platform gathers operational data and records the results. The information may be made available to the infrastructure correlation engine ICE mentioned previously, to integrate into a knowledge base and to identify available capacity to meet the changed business needs.

During the evolution of a business application, it may be put under test scenarios that validate its performance in production. This is part of the Implementation phase 104. It is important to exercise the business application in an environment that is similar to the production configuration. An archaeologist platform can be used to identify problems, by analysis of the key data in the test environment. Additionally, retention of this data will enable an ICE tool to validate assumptions before the final operational deployment. This test data is also very useful when evaluating the production operations. Testing is supposed to be representative of production's operational environment. Contrasting against this test data can reinforce the quality of testing that was performed.

As mentioned, operational activities around ARC abound 105. When things are working as expected, one important purpose for ARC is to automate the collection of data that deals with meeting business objectives. These are typically represented in SLA/OLA, and are the values captured are representative, for example, of qualities and metrics around the patterns being used. An abstract for the SLA/OLA is preferably retained in the knowledge base, so that analysis can be performed at pre-defined times. Because an ICE tool is based on patterns, which are in turn aggregated by applications, and patterns can be characterized and distinguished with qualities and constraints, abstracting the SLA/OLA can be done through an interactive process to select relevant values within the tolerances of the employed patterns.

At least some embodiments of the archaeologist platform are most closely aligned with the Operate phase 105. In this role, the business application has been deployed onto the production infrastructure, but the results of the System are input directly to the Align phase 102, the Design phase 103 and the Implement phase 104. In this case, the conclusions become input parameters to their recommendations.

Introduction to ARC Platform

By using configuration information around the assets associated with a business application, the archaeologist tool can provide the necessary statistics on the ability of the components to satisfy the service level agreements (SLA) and operational level agreements (OLA) that comprise the segments (or components) of the business applications. Sources of the configuration information are often kept in a Configuration Management Data Base (CMDB), but may be derived from ICE recommendations, or the dynamic resource allocation products, such as Tibco's Dynamic Service Execution Broker (FabricServer), Microsoft High Performance Computing or Hypervisor Clustering (available from ESX or Zen).

ARC can also algorithmically analyze operational data and make the comparisons with the specified operational requirements of its constituent patterns, expressed as a set of qualities in a quality profile for each pattern. If any aspect of a pattern quality profile is violated (as indicated by the holistic correlation of the forensic data), then there is a high likelihood that the SLA is being breached, so the quality profile acts as a form of stated limit tolerance on the patterns (and the aggregate of the patterns, which is an application). Failure to operate within the limits can be raised as an exception, which is expressed as a visible "symptom of a problem." This approach can then be used as a starting point for ICE to trace symptoms (limit violations) to known problems, which in turn allow the user of ICE to act upon one or more ICE recommendations of known remediation tactics for solving the known problems. The known remediation tactics then lead to suggestions for technical products from which the user can choose. ARC forensic analysis utilizing logic to create a holistic view of an application's operational characteristics is an innovation that provides linkages that previously only could be done by trail and error with a large set of very experienced people in a room. That kind of effort is rarely exercised until a major crisis occurs. This invention allows for a more feasible holistic view that can be performed before the crisis actually occurs.

Figure 77:
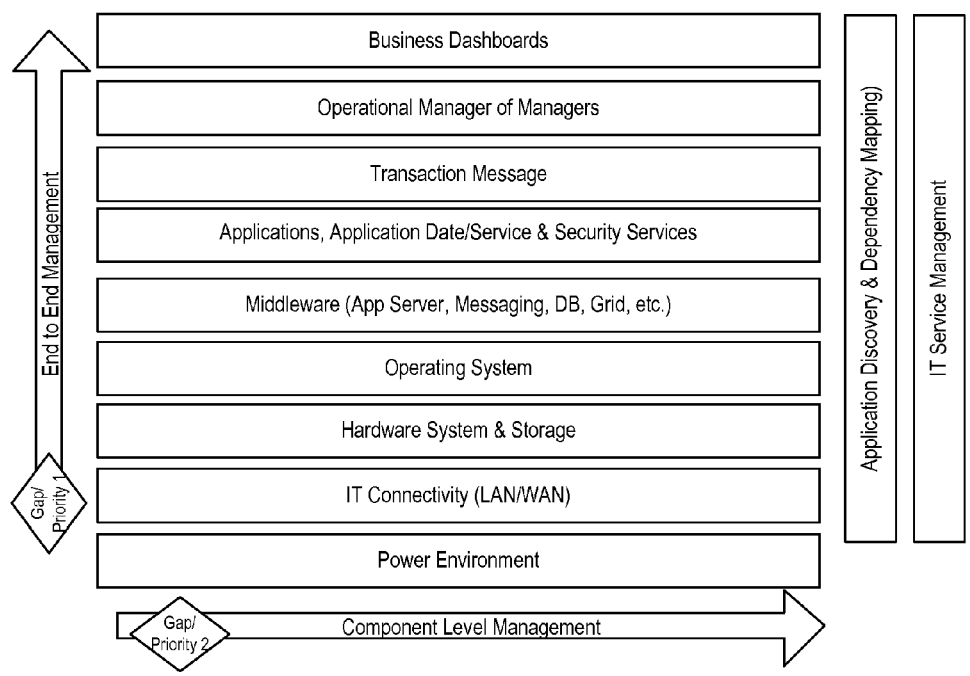
FIG. 77, which is a block diagram illustrating a decomposition of the logical (and physical) parts that may enable one or more business applications.

The role of ARC may be at least partially understood with reference to FIG. 77, which is a block diagram illustrating a decomposition of the logical (and physical) parts that may enable one or more business applications. As such, when in production (or test), metrics can be observed in the configuration that are indicative of how the Program is running FIG. 77 is a generic decomposition of the elements for which IT Operations is responsible for. This collection of topics is important to ARC, because it identifies data collection points that may be necessary for the analytics. While all sources of data can be processed through the system, the most common data sources are from the IP Connectivity (WAN/LAN) layer, Hardware Systems and Storage, the Operating System and the Middleware. These data sources most often have instrumentation that can provide rates of consumption (actions per second), volumes of consumption (bytes transferred) and delays (such as queuing). Collectors are provided by many vendors, but include BMC (Patrol), Microsoft (MOM), Compuware (Vantage) and Computer Associates (Unicenter/eHealth). One important function of system or tool of the present invention is the normalization of the information into a System internal format for analysis, because all of these formats are different and typically use different semantics. In addition all of these tools only provide a small highly focused view of the system characteristics. One very useful aspect of at least some embodiments of the present invention is that the analysis integrates all of these disparate inputs into a holistic view of consumption so that informed decisions can be made about remediation tactics.

Figure 78:
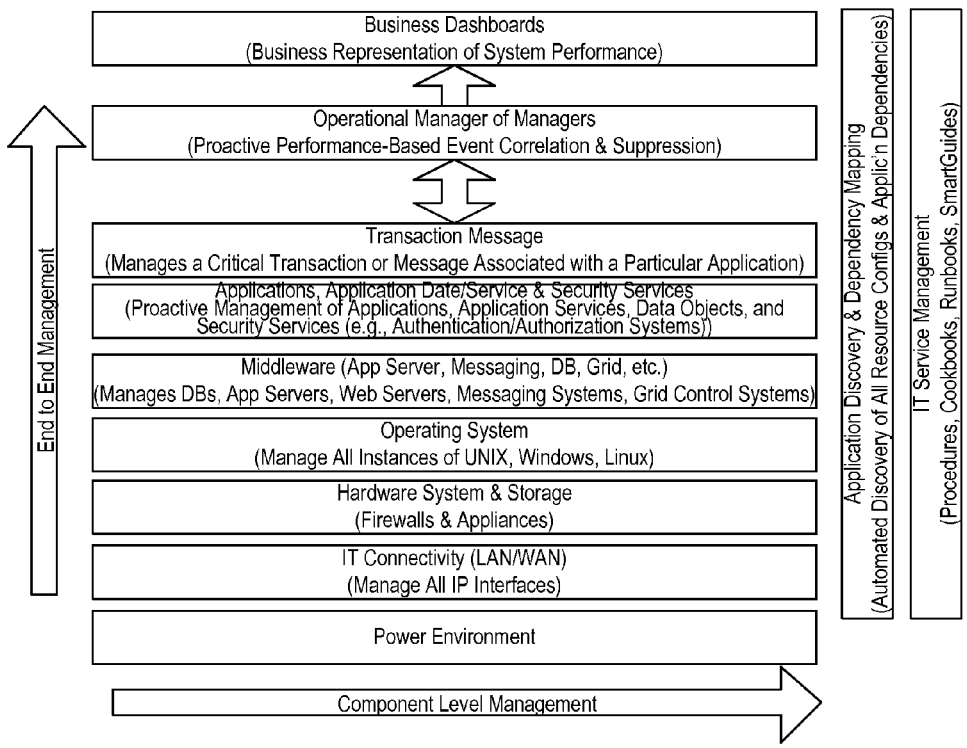
FIG. 78 is a block diagram similar to that of FIG. 77 but elaborating upon the details of the different layers.

FIG. 78 is a block diagram similar to that of FIG. 77 but elaborating upon the details of the different layers. FIG. 78 is an extension of FIG. O2, identifying specific technologies that are part of typical Program deployments. Some examples of different technologies that exhibit similar metrics include, Unix, Windows, z/OS and Linux for operating systems, SAN, SCSI and SSD for storage, SNA, TCP/IP, Wireless, Infiniband, OC3 for networking, and Sybase, Oracle, SQLServer and MYSql for database middleware. With these different expressions of generic functionality, it is possible to use the metrics available in abstract ways, and derive the quality of the delivery of services to the business applications that are being rendered.

Figure 79:
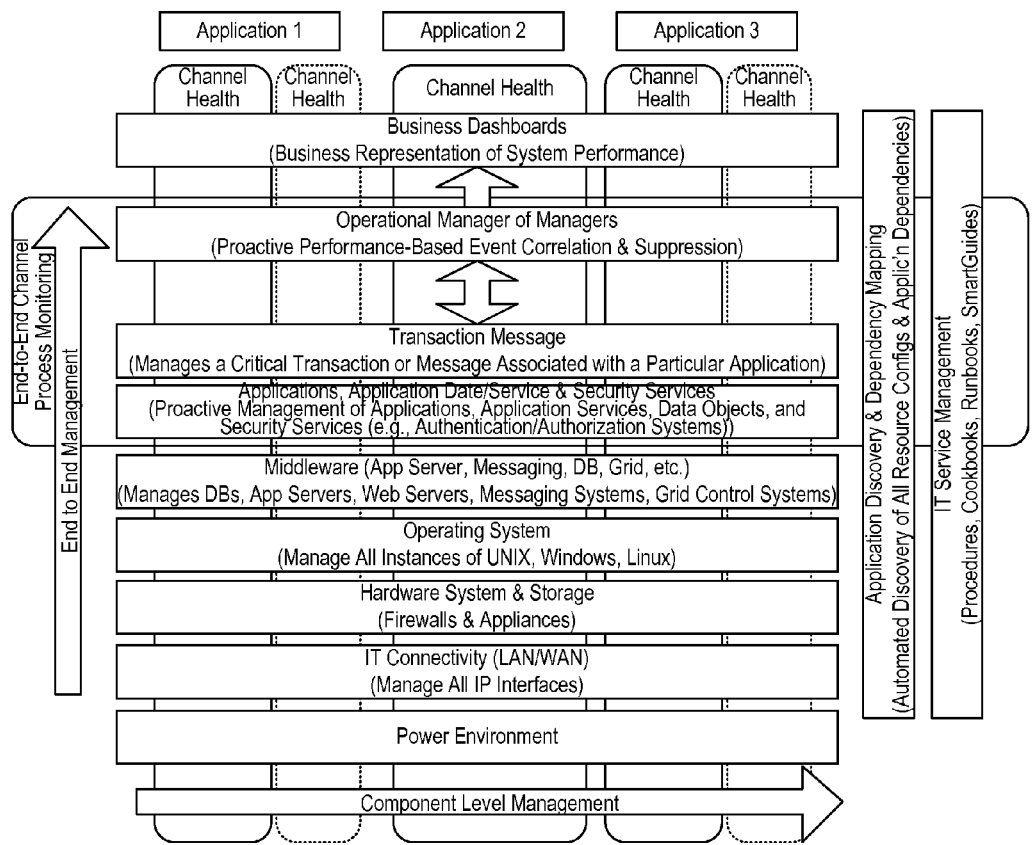
FIG. 79 is a block diagram similar to that of FIG. 78 but illustrating the simultaneous applicability of the topics and technologies of FIG. 78 across multiple different business applications.

FIG. 79 is a block diagram similar to that of FIG. 78 but illustrating the simultaneous applicability of the topics and technologies of FIG. 78 across multiple different business applications. In particular, FIG. 79 illustrates three different business applications operating concurrently. Each Program will cause distinct metrics to be surfaced.

FIG. 79 expresses the logical action occurring in a system or tool of the present invention. For each identified business application, the data points relevant to the deployed Program are gathered, retained and compared against the expected metric values. In this image, there area three business applications referenced, called "Application 1", "Application 2" and "Application 3." While the data collection is similar, the conclusions may not be, because each different Program may be working within different patterns, and therefore having different goals to achieve.

Integration of ARC, ICE and Other Platforms and Tools

In one or more preferred implementations, the archeologist platform (ARC) and the infrastructure correlation engine (ICE) are part of an integrated decision platform that utilize expert knowledge in supporting advanced IT architecture, engineering and real-time operational management. Expert knowledge may be made available via a customized or customizable library that organizes such knowledge in an intuitive, context-specific manner, such as, for example, software implementing such a library as disclosed in U.S. patent application Ser. No. 12/899,315, titled "CUSTOMIZABLE LIBRARY FOR INFORMATION TECHNOLOGY DESIGN AND MANAGEMENT USING EXPERT KNOWLEDGE BASE", naming as inventors Anthony Bennett Bishop, Sheppard David Narkier, Alexis Salvatore Pecoraro, and Paul John Wanish, filed concurrently herewith on Oct. 6, 2010, which application and any publications thereof and patents issuing therefrom are hereby incorporated herein by reference.

Figure 80:
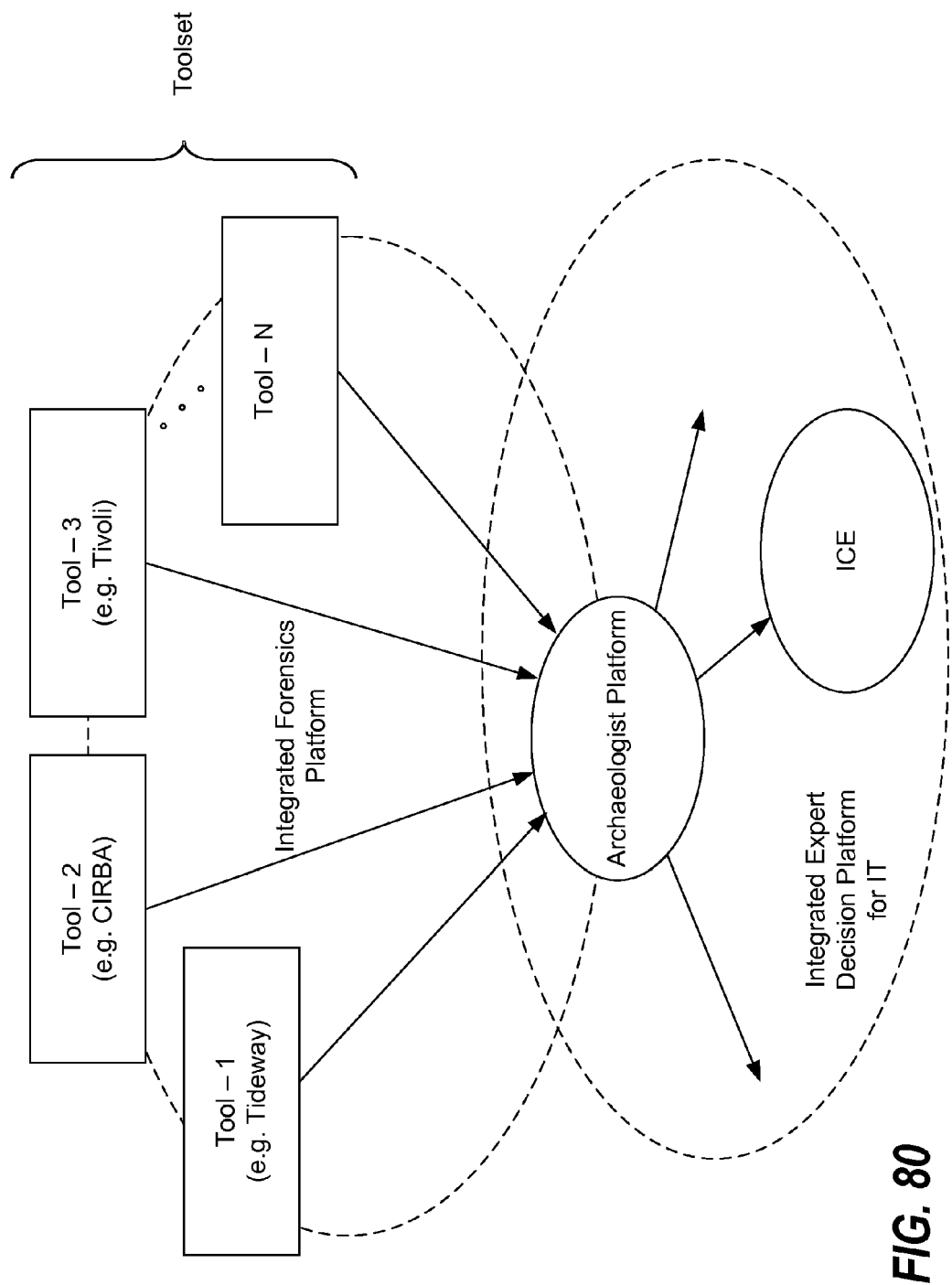
FIG. 80 is a block diagram illustrating an integrated forensics platform that is configured to import data from a plurality of tools, which collectively represent a toolset, in accordance with one or more preferred embodiments of the present invention.

Preferably, the integrated expert decision platform leverages an integrated set of components known as an Integrated Forensic platform. The alternative to this forensics platform would be what is prevalent in the industry, namely a collection of disparate point solution tools. More specifically, the forensics platform is configured to allow for the importing of useful information from third party metric and monitoring tools so that a user does not have to enter such information manually. Such third party tools might include those considered best in class industry products and/or internally generated tools derived by a particular organization. FIG. 80 is a block diagram illustrating an integrated forensics platform that is configured to import data from a plurality of tools, which collectively represent a an aggregated snapshot of consumption in accordance with one or more preferred embodiments of the present invention.

It will be appreciated that different organizations may utilize different tools for monitoring, metrics and the like. Preferably, an aggregator component of the archaeologist platform or other element of the integrated forensics platform is configured to import data from a wide variety of third party and organizationally created tools. In a preferred implementation, an integrated forensics platform provides out-of-the-box support for a preferred data filtering, conversion and analysis component. The data is preferably gathered from popular enterprise wide tools, for example, from companies such Tideway, OpTier, CIRBA, and Integrien.

Preferably, the forensics platform is configured to leverage an organization's data without requiring that organization to export sensitive details, e.g., a customer network or system configurations. For example, government entities, telecommunications entities, internet service providers, and pharmaceutical organizations might prefer their sensitive data not be exported to the platform unless this data can be properly scrubbed while still providing holistic forensics value. In at least some embodiments, it is necessary for scrubbing to be under the configuration control of the user.

The forensics platform preferably is configured for filling in missing data by integrating or synthesizing information generated by one time consulting projects, e.g., filling in gaps in configuration management database information or incident information. The forensics platform is preferably further configured for adjusting, scaling, time-aligning, and truncating data series obtained from multiple non-aligned sources. Further, the forensics platform is preferably configured to prepare and generate forensic heat maps (described herein-below).

In one or more implementations, an upload mechanism reads raw output from a third party or custom tool and uploads data into a database associated with the forensics platform for subsequent use. This results in the storing of a high volume of telemetry which can be analyzed repeatedly. However, this introduces significant data management challenges, and potentially introduces security concerns relating to the sensitivity of the raw data.

In one or more preferred implementations, a suite of filters are utilized to scan the output of one or more monitoring or metric tools and to extract salient information. Preferably, this is accomplished via the use of an adaptor specifically configured for each type of third party or custom tool, although standards are preferably leveraged to reuse filters. In this case, analysis is performed once, and only essential and summary information is stored. This mitigates data management issues, as well as security issues, as raw data is not stored.

Architectural Overview of ARC

Figure 81:
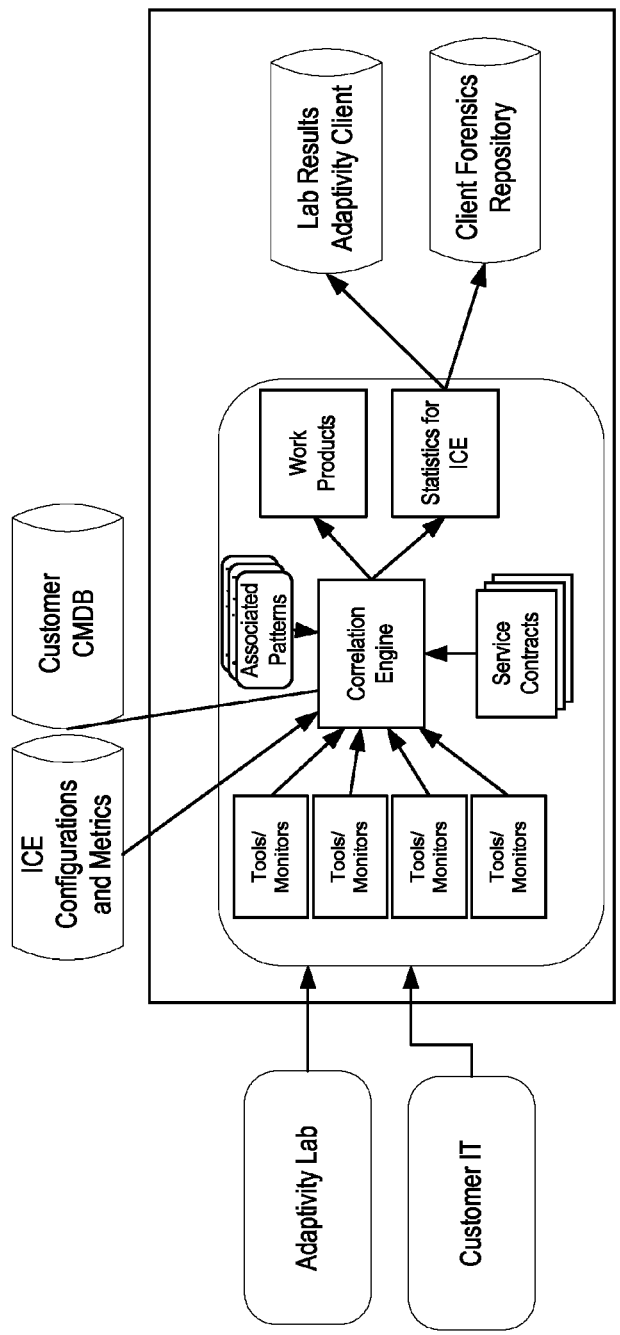
FIG. 81 is a block diagram expressing various components of an exemplary representation of an "archaeologist" platform for analysis of consumed resources (ARC), including expected input and output components, in accordance with one or more preferred embodiments of the present invention.

FIG. 81 is a block diagram expressing various components of an exemplary representation of ARC, including expected input and output components. In this representation, data is acquired from both the a customer's IT Operations, as well as the expert knowledge developed in a laboratory setting, with the difference being that the laboratory results are used to calibrate the reference data that is used by ICE, while the customer IT Operations data, coming through the same transformation, can be used by ICE to do quality compares, and to adapt the order of viable deployment ensembles.

There are two types of metric input, available from industry instrumentation tools. Examples of tools that gather and externalize metric data on periodic cycles include BMC (Patrol), Microsoft (MOM), Compuware (Vantage), and Computer Associates (Unicenter/eHealth). This list is most focused on the server components. Other tools provide significant network data, such as NetScout and Cisco. These vendors do not surface metrics in a common format. Because the most desirable way to draw conclusions is to organize the analysis is based on time sequenced data, the metric data is transformed to be based on a common time sequence. If the timing is not exactly the same, interpolation of the data may be used to synchronize it synthetically. Other forms of transformation may also occur, one of the most common being the normalization of the data into a common scale or other metric. For example, some reporting may measure timing in milliseconds, while others measure in seconds, or other time periods. The normalization factors may be retained in ICE, along with the quality and constraint metrics that are to be employed. This aspect of the invention is believed to be advantageous at least because it incorporates "expert knowledge" to interpolate "semantic content" in or to an otherwise unintelligible deluge of data that is, as a practical matter, useless because it traditionally involves a human looking at a million or more rows of data from multiple different tools.

The other metric input to ARC is the known business application configuration data. Traditionally, this would be retained in a Configuration Management Data Base (CMDB), but this often is incomplete in documenting the representation of relationships and adequately detailing the relevant metrics. To supplement the information that the CMDB retains, the ICE knowledge base may also be used to bound the information that is collected and retained. The archaeologist platform (and integrated forensics platform) incorporate the interpretation of real time infrastructure discovery tools that provide detailed maps of how infrastructure is connected so that data obtained from monitoring and metrics tools can be augmented with semantic data about inter-application and intra-application connectivity, thereby enhancing the ability of the practitioner to triangulate on known problems and symptoms.

Figure 82:
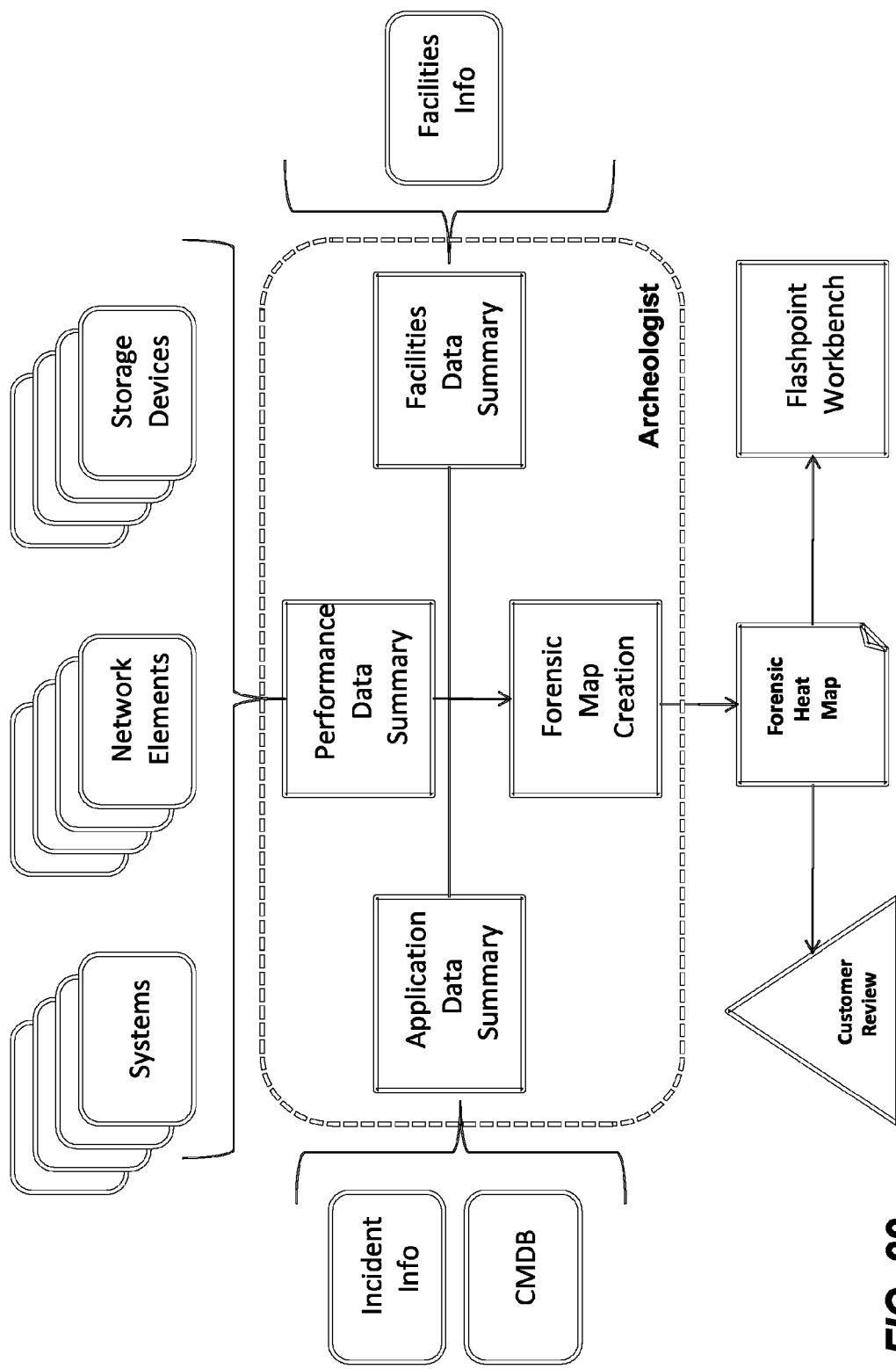
FIG. 82 is a block diagram illustrating a conceptual view of an exemplary archeologist platform in accordance with one or more preferred embodiments of the present invention.

FIG. 82 illustrates a conceptual view of an exemplary forensic archeologist platform. As illustrated, such a platform preferably includes an application data summary associated with incident information and configuration management database information, a performance data summary associated with information on systems, network elements, and storage devices, a facilities data summary associated with facilities information, and is further configured for forensic heat map creation.

FIG. 83 is a first exemplary depiction of a forensic heat map of FIG. 82. A heat map is a visual aid used to highlight several dimensions of consumption characteristics. Such forensic heat maps can be organized by application, and preferably include an application name, deployment pattern and component. In at least some embodiments, each heat map is expressed as a table in which each row represents a different metric, for a particular resource, and further includes various aspects of resource consumption for that metric. A forensic heat map preferably includes, for each system engaged by each application, a list of resource metrics by resource type, a condition of that resource (e.g., how much of the resource is being utilized), and an impact of the resource condition (e.g., how much performance is impacted by high usage of the resource). Resource types may include but are not limited to CPU (processing), Network (messaging), Memory, Storage (data), Platform Availability, and the like.

Figure 84:
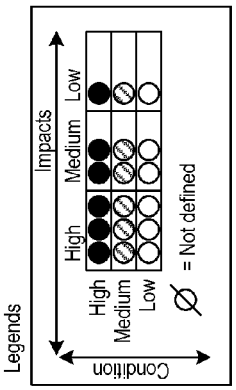
FIG. 84 is a second exemplary depiction of forensic heat maps of FIG. 82.

FIG. 84 is a second exemplary depiction of forensic heat maps of FIG. 82. As shown therein, it may be useful to further include an indication, for each metric, of the type or classification of metric being analyzed. Metric types may include, but are not limited to, variability of consumption (variation), latency of consumption, intensity of consumption (quality) or occupancy of the resource (volume).

In at least some embodiments, two dimensions of consumption are used or reflected in a heat map. One ("condition") is the measured degree of the aspect [utilization/consumption], while the other ("impact") is the importance/impact of that measurement to the particular application. As shown in FIG. 83, a separate field or entry for each dimension may be provided for each metric. Alternatively, however, two dimensions may be expressed in one simple graphical representation using any of a variety of techniques including but not limited to shading, color, number of icons, and the like. FIG. 84 illustrates one example of such a heat map. A forensic heat map of the types of FIGS. 83 and 84 can then be reviewed by an organization and/or utilized by other software, such as, for example, a workbench of an infrastructure correlation engine (ICE).

Figure 85:
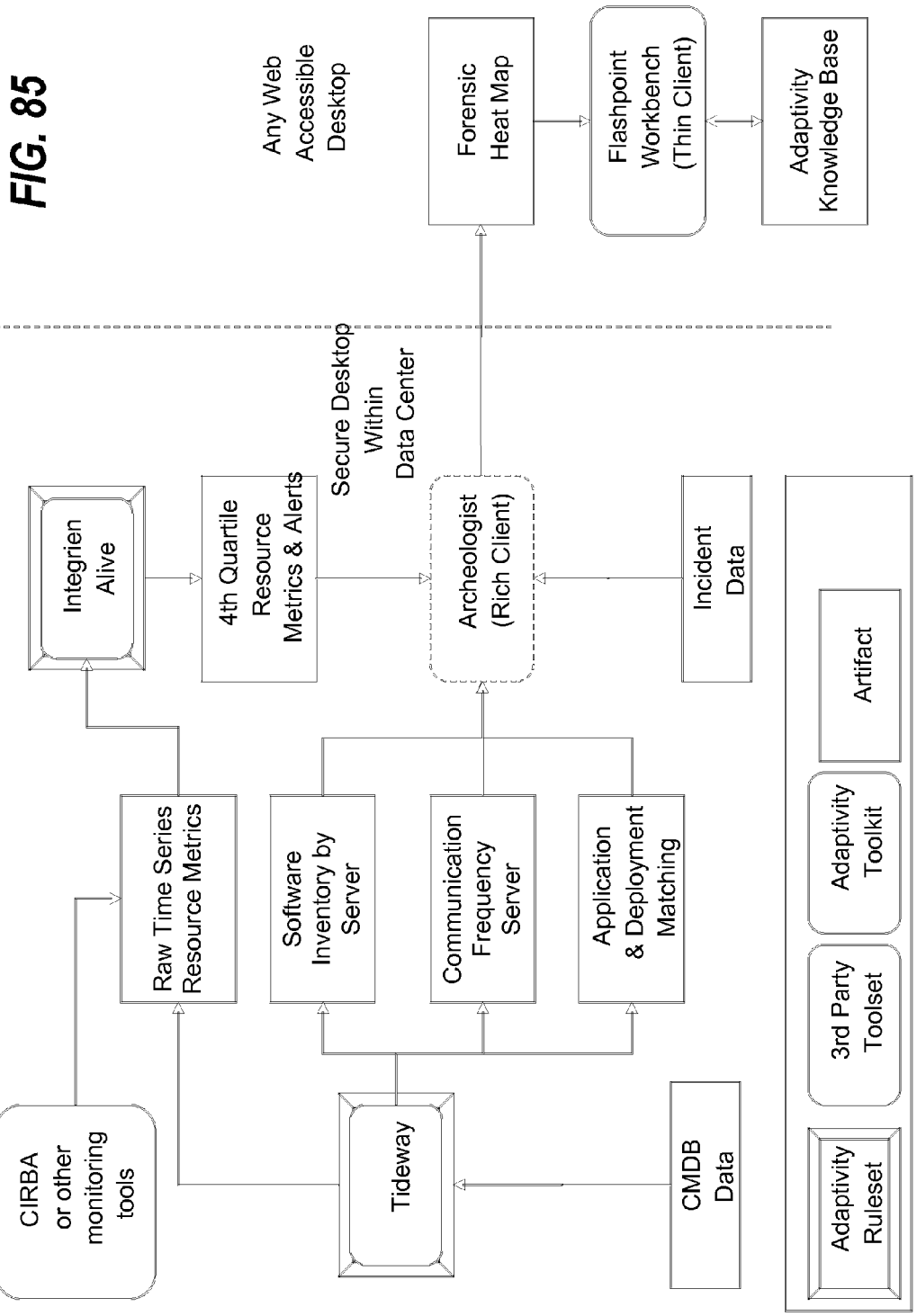
FIG. 85 is a block diagram illustrating architecture for an exemplary system utilizing an archeologist platform.

FIG. 85 is a block diagram illustrating architecture for an exemplary system utilizing an archeologist tool. As illustrated in FIG. 85, the system includes a forensic archeologist platform running in a preferably-secure environment (e.g., within a data center) that provides a forensic heat map to a thin client that might be running in a less secure environment.

Metrics

With respect to resource metrics, the forensic archeologist platform preferably is configured for importing information (e.g., CIRBA information), and adjusting information (e.g., trimming time periods or rescaling metrics), as well as being configured for calculations such counting peaks and duration and filtering fourth quartiles. Such information is preferably obtained from measured time series data with a minimum sampling granularity of fifteen minutes.

Resource metrics are preferably normalized based on resource type and metric type. FIG. 86 illustrates a table detailing exemplary metric types and resource types. The check marks indicate a normalized resource metric based on the associated resource and metric types. FIG. 87 is a table detailing exemplary normalized resource metrics generated from the resource and metric types detailed in the table of FIG. 86.

FIG. 88 illustrates a subset of the metrics of FIGS. 86 and 87. Each metric of this subset is commonly available. Preferably, each should be sampled using as small an interval of time as possible and aggregated to hourly statistics. More preferably still, information is assimilated regarding an absolute value sampled during the hour, first, second, and third quartiles (quartiling can be done, for example, via Integrien) sampled during the hour, an average of the hourly sample, and a standard deviation of the hourly sample.

Preferably, each normalized metric is mapped to the best available measurement from a computer system. For example, CPU occupancy is preferably mapped to "CPU % Total Time" on Windows via perfmon, to "us"+"sy" time on Unix via vmstart, to "% CPU" on Mac OS via activity monitor, and to "% User" ton Linux via systat.

Preferably, a common information model (CIM) schema (e.g., MOF) is utilized by the forensics archaeologist platform because it is an industry accepted de facto standard input format definition. A CIM schema is a baseline mapping of common system metrics that is available on a wide class of systems, software, and storage devices. root/CIM/ComputerSystem/Processor/LoadPercentage is mapped to Win32_PerfFormattedData_PerfOS_ProcessorClass/PercentProcessorTime by WinRM in Windows servers. Many third party toolsets directly support the gathering of CIM data, which makes integration much easier. This invention's incorporation of such a standard, provides a baseline for the integrated analysis that is claimed as an innovation.

Preferably, a simple network management protocol (SNMP) schema is utilized as a standard input mechanism. A SNMP schema is a baseline mapping of network events available on a wide class of network elements.

With respect to a resource context, the forensics archaeologist platform preferably is configured to import software configurations in addition to configuration management database information, incident information, and facilities information. Such configuration information is preferably matched to a business area. Incident information is preferably obtained from incident tracking systems, and includes a frequency of problems reported. Alternatively, predefined knowledge of problematic applications may be utilized.

The forensics archaeologist platform is preferably further configured to characterize information by, inter alia, summarizing incident data, summarizing configuration data, matching deployment patterns, characterizing resource condition, and characterizing resource impact. The forensics archaeologist platform is preferably still further configured to generate software anomaly risk information in addition to forensic heat maps.

Figure 89:
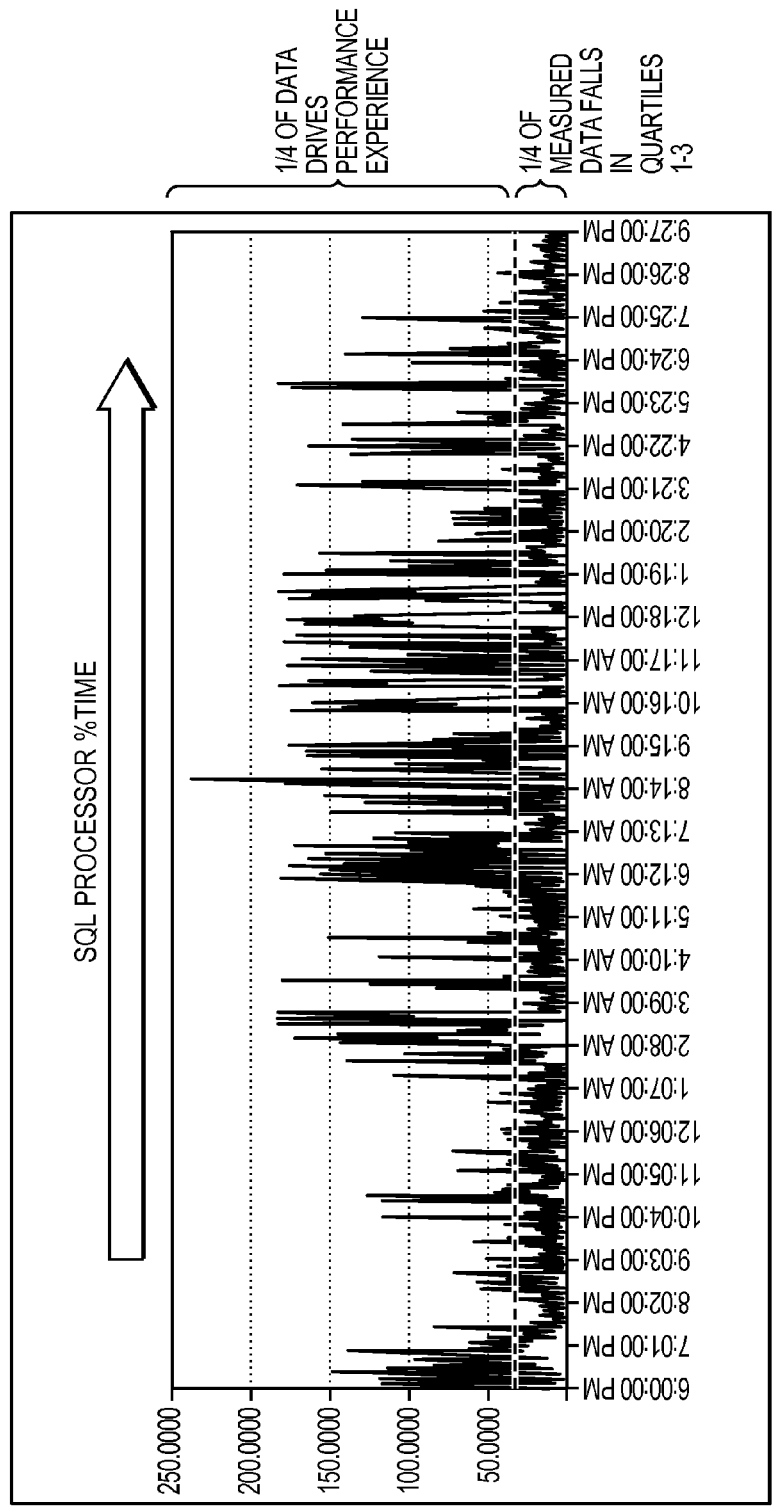
FIG. 89 is a graphical representation of SQL processor percentage time, illustrating the data falling within the first three quartiles as well as the data falling in the fourth quartile.

Resource condition is preferably summarized by using quartile values observed in each hour. For example, in an exemplary process, an entire sample time period is examined, and a comparison made based on a threshold level of seventy five percent of maximum. Preferably, all metrics are converted to a percent of maximum, for example memory usage in MB is divided by total available physical memory and network packets per second is divided by max packets per second. Typically, at over seventy five percent of a maximum, some queuing effect becomes noticeable regardless of the type of metric. FIG. 89 comprises a graph showing SQL processor percentage time, and illustrating the data falling within the first three quartiles as well as the data falling in the fourth quartile.

Figure 90:
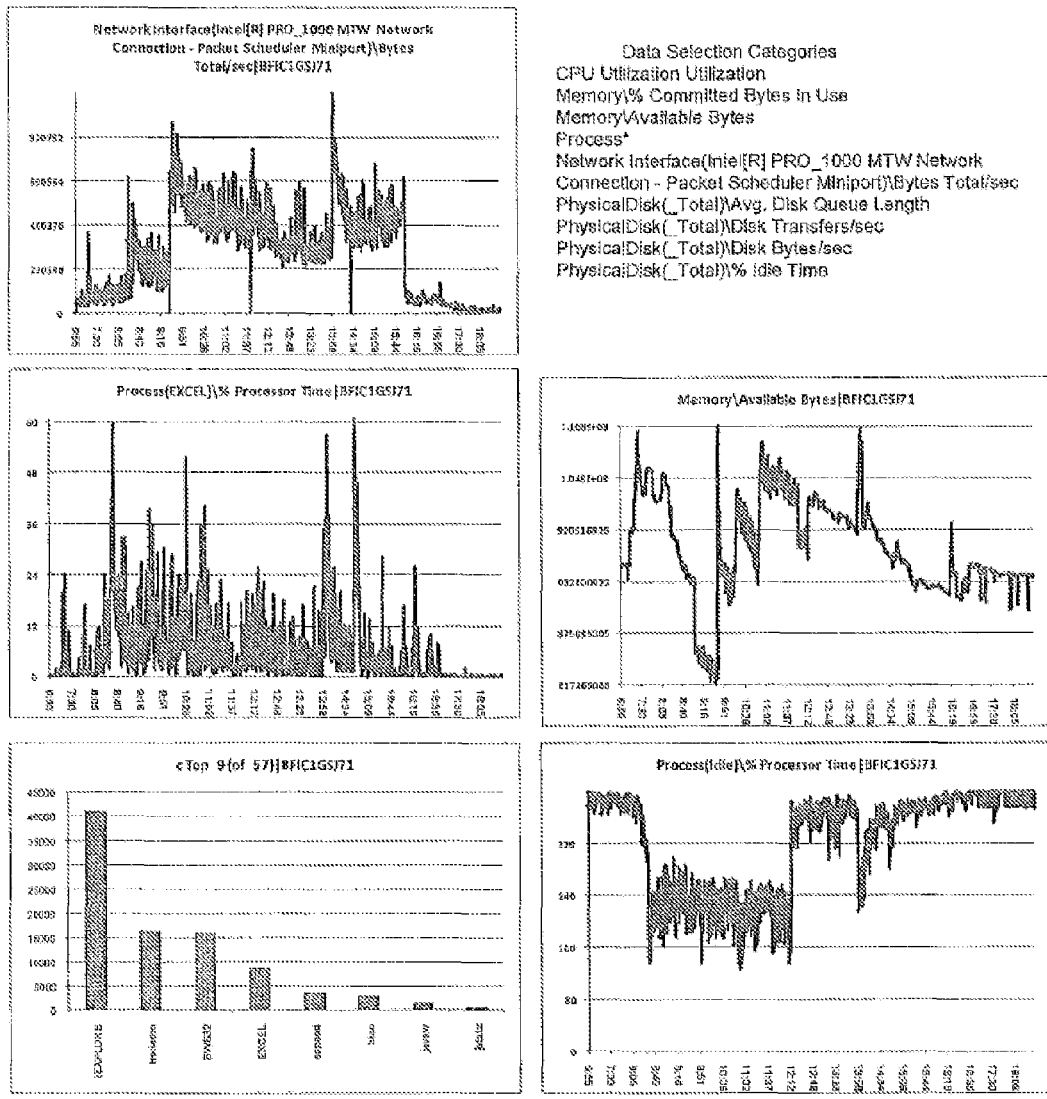
FIG. 90 is a collection of graphical representations of metrics that may be relevant to a specific business application

FIG. 90 is a collection of graphical representations of metrics that may be relevant to a specific business application. Together these representations may provide a detailed visualization of qualities over time. It will be appreciated that this visualization may be presented to a user in addition to or as an alternative to other visualizations. In the images of FIG. 90, the view is not a point in time (or a single summary data point), but is instead of the values of various metrics over time. Such a visualization may most likely be used in the problem resolution, because the actual observed metrics are not reduced. The metrics are preferably scaled to meet the start/end times of the data points, and the minimum and maximum are preferably also automatically scaled to render the best visualization. Using the human visual acuities, operational patterns are observed, and further analysis can be performed.

Figure 91:
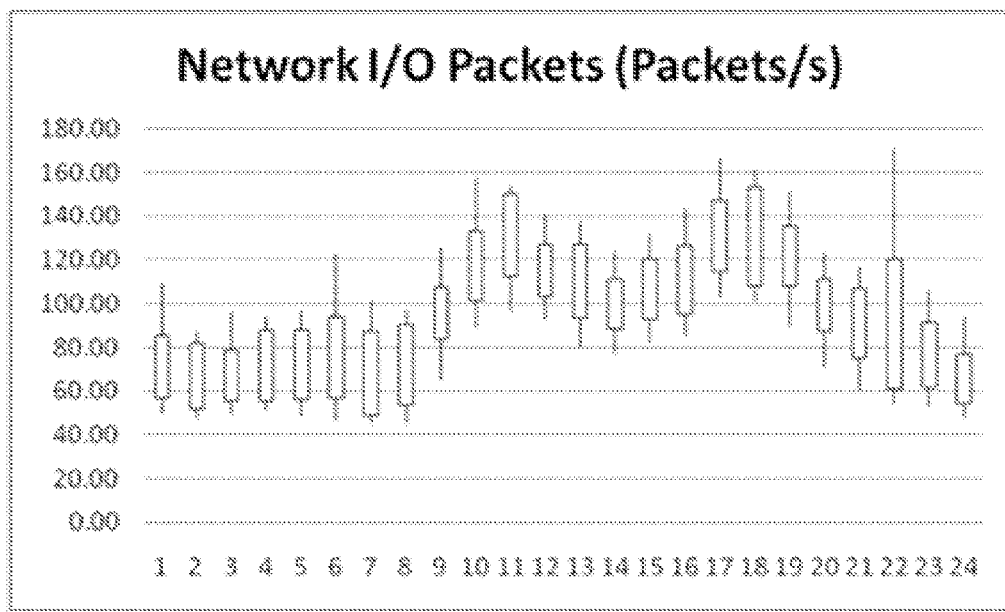
FIG. 91 is a graphical representation of hourly quartile metrics for Network I/O packets.
Figure 93:
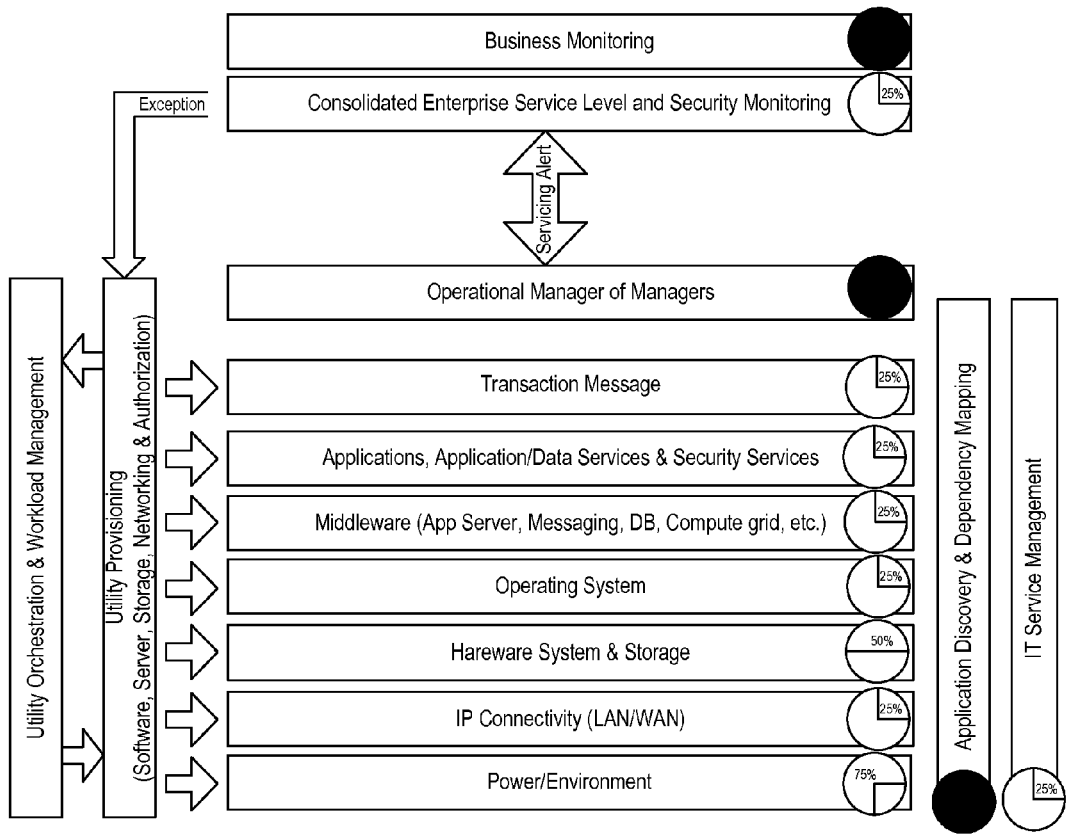
FIG. 93 is an exemplary depiction of a visualization that could express the quality level observed on a business application.

Similarly, FIG. 91 comprises a graph showing hourly quartile metrics for Network I/O packets. In a preferred methodology for calculating maximum offered network capacity in terms of network packets per second, a packet forwarding rate is based on a network interface card, switch, or router specification. If this is unavailable, a packet forwarding rate can be estimated from network bandwidth divided by frame size. A network will only run as fast as the slowest network element, therefore it is necessary to consider the slowest element, and consider whether communications are full or half-duplex, as well as packet loss rates, packet overhead, payload size, and inter-frame padding. Notably, high packet loss rates make it possible to have higher observed packets per second than theoretical maximum since some are lost.

As an example, consider a Full Duplex LAN. Such a network might have an Ethernet max frame size of 1526 bytes (max 1500 B payload+8 B preamble+14 B header+4 B trailer), and a minimum inter-frame gap equal to 12 B inserted after each frame. A max channel utilization could be calculated at 1500/(1526+12)=0.975 or 97.5% in each direction. A 100 Mbit FD LAN would equate to a max throughput of 2×(100×0.975)=195 Mbits per second. This value, divided by an (8×1500) payload size would equate to 65,000 packets per second. If the packet loss rate is 1%, it is possible to measure 65,000×1.01=65,650 packets per second. A Cisco 3550-24 port switch has an aggregate maximum rate of 6 M packets per second (with a 64 Bit minimum packet size), which equates to 6 M/24=250,000 packets per second per port. Thus, the network interface card will be a bottleneck, rather than the switch.

Analysis of impact is preferably a demand side analysis that utilizes incident data. However, if incident data is not available, supply side data might be utilized.

It is possible to examine the frequency that hourly maximums are over pre-set thresholds. Different rating algorithms can be utilized for different datasets in this analysis. These could be threshold based (e.g., a resource condition of "high" if greater than a value x, low if less than value y, and medium otherwise), or comparison based (e.g., x>y). This allows for the combination of inputs from many different types of sources. FIG. 92A depicts a chart showing criteria for resource condition classification as high, medium, or low.

Supply side analysis might consider how often a resource metric is problematic by looking at the frequency of fourth quartile deviations. Specifically, a probability of threshold violations can be calculated based on a number of observed threshold violations divided by a number of hours in the application service day. Such a calculation is preferably done across all systems within an application. The probability of threshold violates can then be converted to a metric of high, medium, or low, for example utilizing a chart such as the one depicted in FIG. 92B.

With reference to FIGS. 77-79, FIG. 93 is an exemplary depiction of a visualization that could express the quality level observed on a business application. In this visualization, the common stack is portrayed, with a quality symbol on the right, which could be used indicate if the target goals were being met or not. In at least one implementation, a customary green-yellow-red color scheme could be utilized to characterize the state of alignment between service and requirements, wherein red being an indication that the defined qualities or constraints are not properly aligned; yellow being an indication that the services are being marginally delivered and improvement is possible; and green being an indication that all conditions are within the agreed to SLA or OLA. This is one possible way that the SLAs could be presented for periodic reviews by the consumers.

Incidents and Cross-System Impacts

Incidents can be classified by problem type, so as to allow for refinement within a database of known problems. Exemplary classifications include performance, configuration, availability, security, and a miscellaneous other classification.

FIG. 94 illustrates exemplary incident data for an investment bank. Preferably, either incident data is obtained for all applications, or else an organization identifies applications that are chronically problematic for analysis. Problematic applications are preferably mapped to systems utilizing configuration data. This allows for the identification of problematic systems. Though an environment may have many discrete problems, it is common to find that a few of the problems account for the majority of incidents. Analyzing incident data facilitates determination of the problematic areas to focus upon, with a greater degree of certainty than what even an experienced practitioner can conclude, because this platform can account for many more variables at once then the most experienced professional can.

Several methods can be utilized to detect cross-system impacts. For example, a correlation of high metrics with other resource metrics on other systems is useful because the more other metrics that are correlated, the greater the impact. For example, Integrien can be utilized to find correlated metrics and systems and a count thereof.

A bottleneck occurs when one system's resources are overloaded, thereby causing underutilization of resources on other systems. The probability that a system has a bottleneck during a given hour can be characterized based on whether the system has high resource usage for a given time period while other systems have low resource usage during the same time period. The greater the difference in resource utilization across the systems, the greater the probability that the resource is a bottleneck. Specifically, the probability that a system is a bottleneck for a resource can be characterized by Pr(R2|R1) where R1 is the system's resource condition, and R2 is a maximum of remaining system resource conditions. If R2 is greater than R1, then R1 cannot be a bottleneck for R2. If R1 is equal to R2, then R1 likely is not a bottleneck for R2. If R1 is low, then R1 is likely not a bottleneck for R2. However, if R1 is much greater than R2, then R1 is highly likely to be a bottleneck for R2. FIG. 95 depicts an exemplary chart containing probability (Pr) values based on a system condition (R1) and other system conditions (R2). So if the resource condition for a system is high, but a resource condition for another system is low, the probability that the system is a bottleneck for the resource could be characterized as ninety five percent, as illustrated. FIG. 96 depicts resource metrics for four systems during first and second hours. As illustrated, during the first hour, a first system's disk I/O throughput is likely a bottleneck. Specifically, Pr(Disk MB) is ninety five percent and Pr(Disk IOPS) is sixty five percent. During the second hour, however, a third system's processing likely represents a bottleneck. Specifically, Pr(CPU) is seventy five percent and Pr(RAM) is sixty five percent.

Data Interchange

Data interchange is preferably accomplished via use of one or more text formats. A first exemplary preferred format is comma separated value (CSV) format, which preferably represents a de facto standard. An exemplary CSV import format is "Application-Name, Deployment Pattern, Deployment-Component, System-Name, Resource-Type, Metric-Type, Condition-Rating, and Impact-Rating".

A second exemplary preferred format is Extensible Markup Language (XML) format in accordance with WS-Management (WS-Man) protocols. This represents an emerging cross platform standard that supports CIM schema in XML. An exemplary XML import format is illustrated in FIG. 97.

Preferably, both formats are supported for importing resource metric summary information and forensic heat maps. A CSV format is preferably the default format for importing all other types of data.

Configuration data is preferably utilized to map applications to systems, systems to applications, systems to systems, systems to networks, systems to storage, and systems to footprints and facilities.

Configuration data might include, for example, a listing of software items and corresponding patch levels for that software item. Preferably, one or more tools, such as, for example, Tideway, are utilized to identify a count of deployed patch levels for a software item. Too many patch levels suggests the possibility of un-patched systems, and thus operational risk.

Configuration data is preferably further utilized for matching to deployment patterns. For example, configuration management database information might be utilized for such matching. Similarly, such matches might be based on observed installed software. Such matching preferably allows for the flagging of potentially mis-configured systems based on comparative configuration correlation and deployment pattern mismatches.

Figure 98:
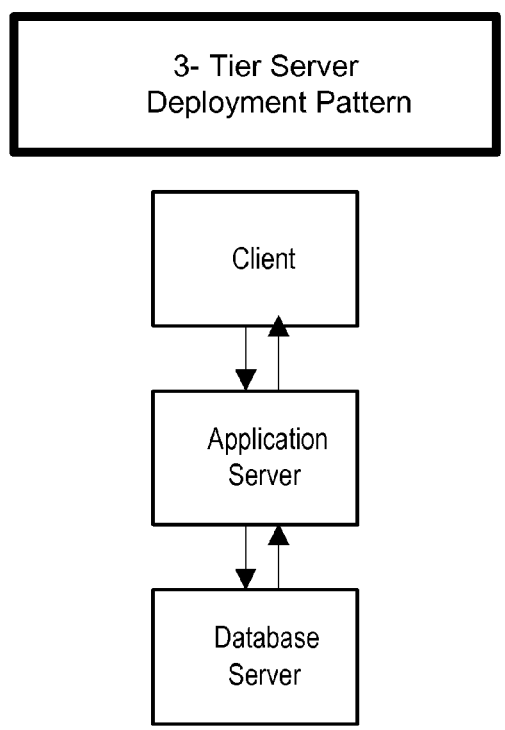
FIG. 98 is a block diagram illustrating a three-tier server deployment pattern.

If information regarding application deployment architecture is unavailable, statistical profiling of typical software items can be utilized for matching to deployment patterns. For example, application servers typically contain any of IIS, Apache, JBOSS, BEA Web Sphere, etc., while database servers typically contain any of SQL Server, MySQL, Oracle, DB2, etc. If a server contains Oracle and the majority of its communication is to a server containing JBOSS, it is likely to be a database server in a three tier deployment pattern. Such a three tier deployment pattern is illustrated in FIG. 98.

Figure 99:
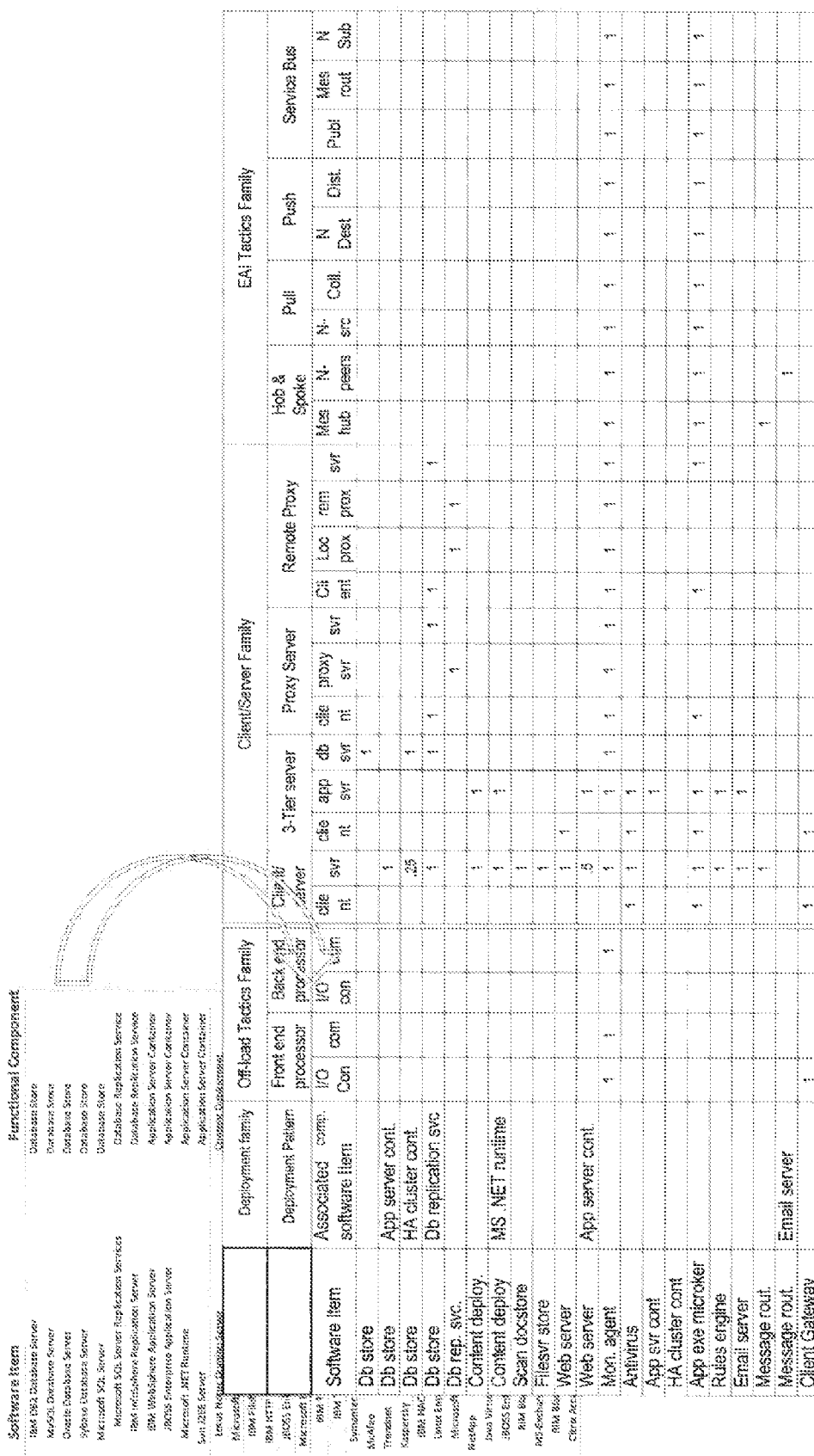
FIG. 99 illustrates a step or process of mapping software items to functional components as part of a deployment matching process.

Deployment matching can generally be accomplished via a three step process. First, software items are mapped to functional components, as illustrated in FIG. 99. Second, functional components are mapped to deployment roles. Third, and last, probabilities are combined to obtain a likelihood that a system containing the software items is in a specific deployment pattern and role.

Once a deployment pattern is identified, potential software item mismatches can be identified. For example, a database server containing Citrix Access Gateway might be flagged as a potential mismatch. Potential mis-configurations represent operational risk that can be mitigated by eliminating these mis-configurations.

Software item combinations that occur infrequently can also be identified. It is possible to compute the affinity between pairs of software items based on the frequency that they occur together. Low affinity results are potential mis-configurations, which can increase operational risk.

An affinity of x to y (Affinity(x,y)) can be calculated as Prob(x|y). The prior probability of x can be calculated as a count of x divided by N, i.e., X/N, and the prior probability of y can be calculated as a count of y divided by N, i.e., Y/N. Thus, Prob(x,y)=(X & Y)/N, and Prob(x|y)=Prob(x,y)/Prob (y). Conversely, Prob(y|x)=(Y/X)×Prob(x|y). If x is greater than y, then Prob(x|y) is greater than Prob(y|x), so it is only necessary to compute one half of an affinity table.

FIG. 100 illustrates an exemplary affinity table so constructed. As illustrated, software item 4 has a low affinity to software items 1 and 3, and software item 5 has a low affinity to software item 2. Each of these low affinity scores represents a potential mis-configuration.

Figure 101:
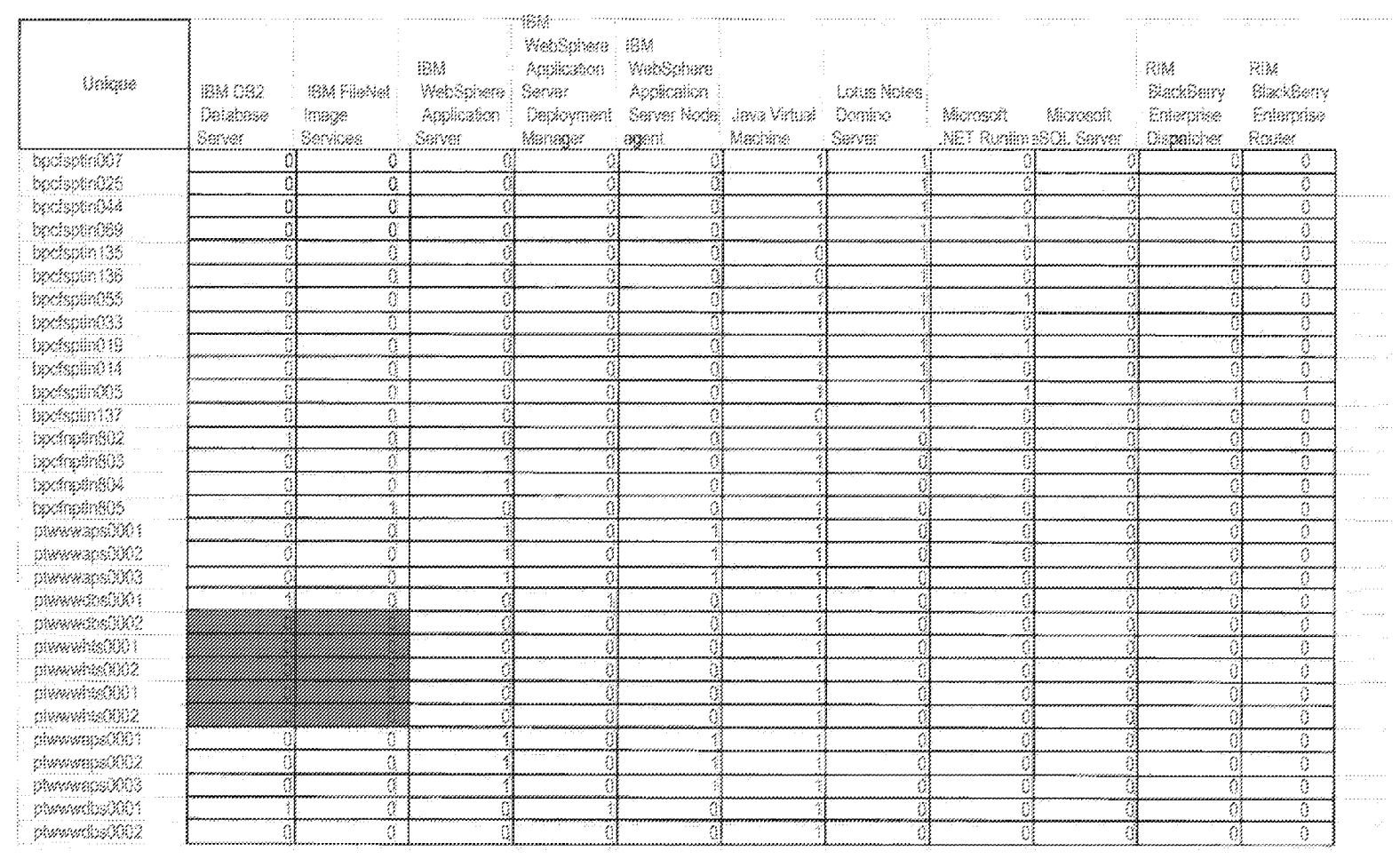

FIG. 101 is an exemplary chart illustrating software items on various servers, and FIG. 102 is a conditional probability table showing conditional probabilities for pairs of software items. As can be seen from FIG. 101, server bpcfsptln005 has both Java and .NET. This is likely a mis-configuration.

With respect to the conditional probability table in FIG. 102, it can be seen that Microsoft .NET Runtime always appears whenever RIM Enterprise Server is configured, but Java Virtual Machine appears with 0.004 conditional probability whenever RIM Enterprise Server is configured. The miniscule occurrence of Java Virtual Machine together with RIM Enterprise Server is likely a result of one or more mis-configurations.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A method for facilitating forensic analysis of operational data for an Information Technology ("IT") infrastructure, comprising the steps of:
    deriving performance data from a plurality of physical systems, network elements and storage devices in the IT infrastructure via a toolset comprising a plurality of IT monitoring and metrics tools, wherein each tool is communicatively interfaced with one or more of the physical systems, network elements and storage devices;
    importing the performance data into an integrated forensics platform;
    aggregating the imported data;
    analyzing the aggregated data to determine resources consumed;
    producing a forensic heat map setting forth a collection of metrics and at least one aspect of resource consumption for each metric includes producing a collection of forensic heat maps, each for a separate application; and
    selectively displaying the collection of forensic heat maps to a user via an archaeologist platform.

2. The method of claim 1, wherein the toolset includes third party tools.

3. The method of claim 2, wherein the third party tools include a plurality of tools from different providers.

4. The method of claim 2, wherein the third party tools include at least a first tool provided by the owner or manager of the IT infrastructure and at least a second tool provided by an entity other than the owner or manager of the IT infrastructure.

5. The method of claim 1, wherein the at least one aspect of resource consumption for each metric includes a current condition of the respective metric.

6. The method of claim 5, wherein the condition of the respective metric is described on a scale having at least three values.

7. The method of claim 6, wherein the condition of the respective metric is described textually.

8. The method of claim 6, wherein the condition of the respective metric is described graphically.

9. The method of claim 1, wherein the at least one aspect of resource consumption for each metric includes a current impact of the respective metric.

10. The method of claim 9, wherein the impact of the respective metric is described on a scale having at least three values.

11. The method of claim 10, wherein the impact of the respective metric is described textually.

12. The method of claim 10, wherein the impact of the respective metric is described graphically.

13. The method of claim 9, wherein the at least one aspect of resource consumption for each metric also includes a current condition of the respective metric.

14. The method of claim 1, wherein a type of resource to which the metric pertains is included in the forensic heat map for each metric.

15. The method of claim 14, wherein the resource types are selected from a group that includes processing, messaging, memory, data and availability.

16. The method of claim 14, wherein the resource types are selected from a group that includes variability of consumption (variation), latency of consumption, intensity of consumption (quality) and occupancy of the resource (volume).

17. The method of claim 1, wherein a metric type is included in the forensic heat map for each metric.

18. The method of claim 1, further comprising a step of generating software anomaly risk information.

\* \* \* \* \*